(12) United States Patent
Sakashita

(10) Patent No.: US 8,343,244 B2
(45) Date of Patent: Jan. 1, 2013

(54) AIR CONDITIONER AND EXTENSION NOZZLE OF CLEANER USED FOR THE SAME

(75) Inventor: Akihiko Sakashita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 194 days.

(21) Appl. No.: 12/671,366

(22) PCT Filed: Jul. 30, 2008

(86) PCT No.: PCT/JP2008/002048
§ 371 (c)(1),
(2), (4) Date: Jan. 29, 2010

(87) PCT Pub. No.: WO2009/016838
PCT Pub. Date: Feb. 5, 2009

(65) Prior Publication Data
US 2010/0199697 A1   Aug. 12, 2010

(30) Foreign Application Priority Data

Jul. 31, 2007  (JP) .................................. 2007-199194
Jan. 11, 2008  (JP) .................................. 2008-004666
Jan. 25, 2008  (JP) .................................. 2008-015625

(51) Int. Cl.
*A23L 3/36*   (2006.01)
*B01D 46/00*   (2006.01)

(52) U.S. Cl. ................. 55/283; 55/289; 55/295; 55/296; 55/428; 55/431; 55/467.1; 55/471

(58) Field of Classification Search ...... 15/246.2–246.4, 15/347–353, 415.1–422.1; 55/283, 285, 55/289, 290, 291, 293, 295, 296, 297, 298, 55/299, 300; 62/303, 259.1–259.4; 165/5, 165/95, 303, DIG. 11, DIG. 85
See application file for complete search history.

(56) References Cited

U.S. PATENT DOCUMENTS

| | | | | |
|---|---|---|---|---|
| 5,163,202 A | * | 11/1992 | Kawakami et al. | 15/319 |
| 5,970,572 A | * | 10/1999 | Thomas | 15/320 |
| 2001/0037356 A1 | * | 11/2001 | White et al. | 709/201 |
| 2007/0060036 A1 | * | 3/2007 | Shibuya et al. | 454/187 |
| 2008/0223062 A1 | * | 9/2008 | Yabu et al. | 62/259.1 |

FOREIGN PATENT DOCUMENTS

JP   56-168047 A   12/1981

(Continued)

*Primary Examiner* — Duane Smith
*Assistant Examiner* — Thomas McKenzie
(74) *Attorney, Agent, or Firm* — Birch, Stewart, Kolasch & Birch, LLP

(57) ABSTRACT

Dust collection structure for collecting the dust removed from an air filter of an indoor unit has been devised to reduce user's labor in collecting the dust as much as possible. An indoor unit includes, in a casing, an indoor heat exchanger, an indoor fan for sucking air from inside of a room, and blowing the air to the inside of the room, and an air filter arranged on an inlet side of the indoor fan. The dust trapped on the air filter is removed by the dust removing means, and is contained in the dust containing part. A nozzle connector for arranging a nozzle of a cleaner at a predetermined position where suction of the contained dust is allowed is provided at a downstream outlet of a dust collection path as a transfer path for transferring the dust in collecting the contained dust.

41 Claims, 40 Drawing Sheets

FOREIGN PATENT DOCUMENTS

| | | |
|---|---|---|
| JP | H04-095212 | 8/1992 |
| JP | H05-090243 | 12/1993 |
| JP | H10-267383 | 10/1998 |
| JP | 2005-83721 A | 3/2005 |
| JP | 2006-071121 A | 3/2006 |
| JP | 2007-071455 | 3/2007 |
| JP | 2007-147141 A | 6/2007 |
| WO | WO 2007060920 A1 * | 5/2007 |

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

AIR CONDITIONER AND EXTENSION NOZZLE OF CLEANER USED FOR THE SAME

TECHNICAL FIELD

The present disclosure relates to a dust collection structure for collecting dust removed from an air filter of an indoor unit of an air conditioner.

BACKGROUND ART

Among indoor units of air conditioners having an air filter at an air inlet, those provided with a dust removing means for removing dust trapped on the air filter have been known. An air conditioner of this type includes a container for containing the dust removed from the air filter. Therefore, in removing the dust in the container, a user has to detach a cover of the unit (a grille, etc.), and to take out the container.

For example, according to Patent Document 1, the container is arranged outside a casing body of the indoor unit so as to allow the user to detach only the container box, and the dust removed from the air filter by the dust removing means is transferred to the container by the flow of air. This structure makes it possible to discharge the dust trapped on the air filter out of the casing body, and keeps the dust in the container, thereby allowing for easy removal of the dust from the container.

CITATION LIST

PATENT DOCUMENT 1: Japanese Patent Publication No. 2005-83721

SUMMARY OF THE INVENTION

Technical Problem

With use of the air conditioner of the above-described structure, the dust trapped on the air filter can be removed and contained in the container without involving users' hands. However, in collecting the dust contained in the container, a worker has to access the container arranged near the air conditioner provided in space above the ceiling to collect the dust from the container.

That is, with the above-described structure, the worker has to climb up to the ceiling to collect the dust removed from the air filter. This is not a very convenient structure.

The present disclosure has been achieved in view of the foregoing. An object of the disclosure is to devise a dust collection structure for collecting the dust removed from the air filter of the indoor unit, thereby saving time and effort of the dust collection.

Solution to the Problem

To achieve the above-described object, an air conditioner (10) of the present disclosure is configured in such a manner that dust removed from an air filter (40) and contained in a dust containing part (60) can be sucked by a cleaner (95). Specifically, a nozzle connector (78) to which a nozzle (95a) of a cleaner (95) is connected is provided at a room-facing outlet of a dust collection path (77) through which the dust passes.

More specifically, according to a first aspect of the disclosure, the disclosure is directed to an air conditioner including an indoor unit (13) including, in a casing (26), an indoor heat exchanger (37), an indoor fan (39) for sucking air from inside of a room, and blowing the air to the inside of the room, and an air filter (40) arranged on an inlet side of the indoor fan (39).

The air conditioner further includes: a dust removing means (50) for removing dust trapped on the air filter (40); a dust containing part (60) for containing the dust removed by the dust removing means (50); and a dust collection path (77) as a transfer path for transferring the dust in collecting the contained dust, wherein a nozzle connector (78) for arranging a nozzle (95a) of a cleaner (95) at a predetermined position where suction of the contained dust is allowed is provided at a downstream outlet of the dust collection path (77).

With this configuration, the dust trapped on the air filter (40) of the indoor unit (13), and is removed by the dust removing means (50) is temporarily contained in the dust containing part (60). The dust contained in the dust containing part (60) is sucked and collected by the cleaner (95) from the inside the room through the dust collection path (77). In this operation, the nozzle connector (78) arranged at the downstream outlet of the dust collection path (77) makes it possible to arrange the nozzle (95a) of the cleaner (95) at a position where the suction of the dust is allowed. This allows for reliable suction and collection of the dust by the cleaner (95).

Thus, the above-described structure makes it possible to easily and reliably collect the dust, and therefore, a user is no longer required to climb up to the ceiling to collect the dust contained in a dust container (60), etc.

In the above-described structure, the nozzle connector (78) is arranged inside the casing (26), and inside a room-facing surface of a room panel (27) arranged on a room-facing side of the casing (26) (a second aspect of the disclosure). With this configuration, the nozzle connector (78) is not exposed on the surface of the room panel (27). Therefore, the nozzle connector (78) becomes almost invisible from the inside of the room, thereby keeping good appearance of a room-facing side of the indoor unit (13).

The nozzle connector (78) is preferably arranged at a corner of the room panel (27) arranged on the room-facing side of the casing (26) (a third aspect of the invention). In general, the room panel (27) arranged on the room-facing side of the casing (26) is larger than the casing (26) when viewed in plan, and four corners thereof are dead space. Therefore, the provision of the nozzle connector (78) at the corner of the room panel (27) as described above makes it possible to efficiently use the space inside the indoor unit (13).

The nozzle connector (78) may be arranged, not at the corner of the room panel (27) as described above, but in an inlet (22) of the casing (26) formed on the inlet side of the indoor fan (39) (a fourth aspect of the disclosure). In the case where the nozzle connector (78) is provided in the relatively large inlet (22) of the casing (26), the space inside the indoor unit (13) can efficiently be used.

In the inlet (22) of the casing (26) formed on the inlet side of the indoor fan (39), a suction grille (29) having a grille portion (29a) formed in a center thereof to allow the air to pass through is arranged. The nozzle connector (151) may be arranged outside the grille portion (29a) of the suction grille (29) (a fifth aspect of the disclosure).

With this configuration, the nozzle (95a) of the cleaner (95) can be brought into contact with the nozzle connector (151) arranged outside the grille portion (29a) of the suction grille (29) without opening the suction grille (29). This allows for easy access to the nozzle connector (151). Thus, the above-described structure makes it possible to easily collect the dust contained in the dust containing part (60), thereby improving workability of the dust collection.

With the above-described configuration, an open/close closure means (28b) is provided in a dust collection path extending from the dust containing part (60) to the room panel (27) arranged on the room-facing side of the casing (26) so as to communicate or discommunicate the dust collection path with the inside of the room (a sixth aspect of the disclosure).

With this configuration, the closure means (28b) is opened only in sucking and collecting the dust by the nozzle (95a) of the cleaner (95) through the nozzle connector (78), and the closure means (28b) can be kept closed while the dust collection is not performed. This can prevent leakage of the dust to the inside of the room. When the closure means (28b) is provided downstream of the nozzle connector (78), the nozzle connector (78) becomes almost invisible from the inside of the room when the air conditioner is operated, etc., thereby keeping good appearance of the room-facing side of the indoor unit (13).

The nozzle connector (78) is preferably arranged at a corner of the room panel (27) arranged on the room-facing side of the casing (26), and a corner cover (28b) is preferably arranged to cover a room-facing side of the nozzle connector (78) as the closure means (a seventh aspect of the disclosure).

With this configuration, the corner of the room panel (27), which is generally dead space, can efficiently be used, and the nozzle connector (78) can be covered with the corner cover (28) arranged at the corner. This can keep good appearance of the room-facing side of the indoor unit (13).

A room-facing side of the air filter (40) may be covered with a suction grille (29), and the nozzle connector (78) may be arranged in the inlet (22) of the casing (26) formed on the inlet side of the indoor fan (39), with the room-facing side thereof being covered with the suction grille (29) as the closure means (an eighth aspect of the disclosure).

With this configuration, the room-facing side of the nozzle connector (78) can be covered with the suction grille (29), thereby eliminating the need for providing an additional closing means on the room-facing side of the nozzle connector (78). This can keep good appearance of the room-facing side of the indoor unit (13). Further, parts count is reduced, thereby reducing the cost for the air conditioner (10).

A sealing member (80) for hermetically closing space inside the nozzle connector (78) is preferably sandwiched between the closure means (28b) in the closed state and the nozzle connector (78) (a ninth aspect of the disclosure).

With this configuration, when the closure means (28b) is closed, i.e., when the dust collection is not performed, the sealing member (80) hermetically seals the space inside the nozzle connector (78) from the inside of the room. This can reliably prevent the dust from leaking from the nozzle connector (78) to the inside of the room.

The closure means (28b) is configured to be rotatable about one end thereof as a rotation center, and is configured to be able to engage with a push lock (79) at the other end thereof; the engagement between the other end and the push lock (79) being released upon application of a pressing force to the closure means (28b) from the inside of the room (a tenth aspect of the disclosure).

With this configuration, the engagement between the other end of the closure means (28b) and the push lock (79) is released by applying a pressing force to the closure means (28b) from the inside of the room. Then, the closure means (28b) is opened as it rotates about the one end as the rotation center. Specifically, the closure means (28b) can be opened by pushing the closure means (28b) from the inside of the room by an end of the nozzle (95a) of the cleaner (95), etc. Therefore, a user no longer has to climb up to the ceiling to open the closure means (28b), thereby improving the workability of the dust collection.

The closure means (101b) may be configured to be rotatable about one end thereof as a rotation center so as to be opened when pushed from the inside of the room (an eleventh aspect of the disclosure). With the closure means (101b) configured to be opened when pushed, the closure means (101b) can easily be opened from the inside of the room by an end of the nozzle (95a) of the cleaner (95), etc. This can improve the workability of the dust collection. In particular, the one end of the closure means (101b) is preferably provided with a biasing means (102) for biasing the closure means (101b) to a closed state (a twelfth aspect of the disclosure). With the provision of the biasing means (102), the closure means (101b) can be kept biased to be in a closed state, and the closure means (101b) can reliably be closed when it is not pushed upward by the nozzle (95a) of the cleaner (95), etc. Therefore, when the dust collection is not performed, the nozzle connector (78) becomes invisible from the inside of the room, and does not affect the appearance of the indoor unit (13). Further, the leakage of the dust to the inside of the room through the nozzle connector (78) can be prevented with more reliability.

The closure means (111b) may be configured to be slidable (a thirteenth aspect of the disclosure). With this configuration, the open/close state of the closure means (111b) can be switched by sliding the closure means (111b). Therefore, when the dust collection is not performed, the closure means (111b) is closed, thereby keeping good appearance of the room-facing side of the indoor unit (13), and preventing the leakage of the dust to the inside of the room.

In the case where the above-described closure means is provided, a drive means (113) for opening and closing the closure means (111b) is preferably provided (a fourteenth aspect of the disclosure). This makes it possible to open/close the closure means (111b) by the drive means (113), and the user no longer has to climb up to the ceiling to directly open and close the closure means (111b). This can improve the workability of the dust collection.

In the first aspect of the disclosure, the air conditioner further includes a dust collection box (90) for accumulating the dust contained in the dust containing part (60), wherein the dust collection path (77) is preferably connected to the dust collection box (90) (a fifteenth aspect of the disclosure). The provision of the dust collection box (90) makes it possible to accumulate a larger amount of dust in the dust collection box (90), thereby reducing the frequency of the dust collection.

In particular, a flexible duct (74, 77) constitutes at least one of the dust collection path and a transfer path extending from the dust containing part (60) to the dust collection box (90) (a sixteenth aspect of the disclosure). In this way, the dust collection path and the transfer path can be arranged more freely, thereby allowing for size reduction of the air conditioner depending on the employed arrangement of the paths. The duct (74, 77) constituting the dust collection path, and the dust transfer path extending from the dust containing part (60) to the dust collection box (90) is preferably detachably connected to the dust collection box (90) (a seventeenth aspect of the disclosure). Thus, the duct (74, 77) can easily be attached to and detached from the dust collection box (90), thereby improving the workability of installation and maintenance of the dust collection box (90).

The dust collection path (77) is preferably directly connected to the dust containing part (60) in the casing (26), and an air vent (60a) is preferably formed in the dust containing part (60) to oppose to a junction with the dust collection path (77) (an eighteenth aspect of the disclosure). In the case where the dust collection path (77) is directly connected to the dust containing part (60), an air inlet is preferably provided for efficient suction of the dust by the cleaner (95), etc., through the dust collection path (77). Therefore, as described above, the air vent (60a) is formed in the dust containing part (60) to oppose the junction with the dust collection path (77). This allows for smooth air flow from the dust containing part (60) to the dust collection path (77), thereby allowing for efficient suction and collection of the dust by the nozzle (95a) of the cleaner (95) through the nozzle connector (78) formed at a room-side outlet of the dust collection path (77).

In particular, a flexible duct (77) constitutes the dust collection path extending from the casing (26) to the nozzle connector (78) (a nineteenth aspect of the disclosure). This makes it possible to arrange the dust collection path more freely, thereby allowing for size reduction of the air conditioner depending on the employed arrangement of the dust collection path. The duct (77) constituting the dust collection path is preferably detachably connected to the casing (26) (a twentieth aspect of the disclosure). This allows for easy attachment and detachment of the duct (77) to and from the casing (26), thereby improving the workability of installation of the indoor unit (13) in the space on the ceiling, and maintenance of the indoor unit (13).

In the above-described configuration, the nozzle connector (78) may be formed with a cross-sectional area of a dust path formed therein increasing toward the inside of the room (a twenty-first aspect of the disclosure). This makes it possible to insert an end of the nozzle (95a) into the nozzle connector (78) so as to reliably bring the end into contact with the nozzle connector (78) irrespective of the size of the nozzle (95a) of the cleaner (95). Thus, the dust can be sucked and collected by any of the cleaners (95) of various nozzle diameters. For example, the nozzle connector (78) with the cross-sectional area increasing toward the inside of the room may be provided by tapering the nozzle connector, or forming a curved portion in an inner surface of the nozzle connector.

The nozzle connector (121a) preferably protrudes toward the inside of the room with a cross-sectional area thereof decreasing toward the inside of the room, and a hole (121b) through which the dust can pass is provided at a protruding end of the nozzle connector (121a) (a twenty-second aspect of the disclosure). This makes it possible to position the nozzle connector (121a) inside the end of the nozzle (95a) irrespective of the size and the cross-sectional shape of the nozzle (95a) of the cleaner (95), thereby reliably bringing the nozzle (95a) into contact with the nozzle connector (121a), and sucking the dust. Thus, the dust collection is not affected by the size and cross-sectional shape of the nozzle (95a) of the cleaner (95), and can efficiently be performed.

In particular, the nozzle connector (121a) is preferably in the shape of a dome protruding toward the inside of the room (a twenty-third aspect of the disclosure). The dome-shaped nozzle connector (121a) makes it possible to position a portion of the nozzle connector (121a) inside the nozzle (95a) so as to reliably bring the nozzle (95a) into contact with the nozzle connector (121a), irrespective of the size and cross-sectional shape of the nozzle (95a) of the cleaner (95), and of the direction of the nozzle (95a) approaching the nozzle connector (121a). Thus, the dust collection by the nozzle (95a) of the cleaner (95) is not affected by the size and cross-sectional shape of the nozzle (95a) of the cleaner (95), and the angle formed between the nozzle (95a) and the nozzle connector (121a), and can efficiently be performed.

The nozzle connector (151) is preferably configured to be slidable in a vertical direction, and a valve (152) for switching communication and discommunication between space inside the nozzle connector (151) and the dust collection path (77) in response to the vertical movement of the nozzle connector (151) is preferably provided upstream of the nozzle connector (151) (a twenty-fourth aspect of the disclosure).

With this configuration, the vertical movement of the nozzle connector (151) allows for switching of communication and discommunication between the space inside the nozzle connector (151) and the dust collection path (77). Therefore, a user is no longer required to open the closure means, etc., in collecting the dust, thereby improving the workability. For example, the nozzle (95a) of the cleaner (95) is brought into contact with the nozzle connector (151) from below, and the nozzle connector (151) is vertically moved, thereby communicating the space inside the nozzle connector (151) and the dust collection path (77) so as to suck and collect the dust. Further, if the valve (152) is configured to discommunicate the space inside the nozzle connector (151) and the dust collection path (77) when the nozzle (95a) is detached from the nozzle connector (151), and the nozzle connector (151) is returned to the original position, the leakage of the dust to the inside of the room can be prevented.

Specifically, the space inside the nozzle connector (151) communicates with the dust collection path (77) through a communication hole (141d), and the valve (152) preferably includes a valve element (154) configured to vertically move together with the nozzle connector (151), thereby closing the communication hole (141d) when the nozzle connector (151) is at a lowermost position on the room-facing side, or opening the communication hole (141d) when the nozzle connector (151) is at a level higher than the lowermost position (twenty-fifth aspect of the disclosure).

With the valve element (154) vertically moving together with the nozzle connector (151), the switching of communication and discommunication between the space inside the nozzle connector (151) and the dust collection path (77) can be performed in response to the position of the nozzle connector (151) in the vertical direction. Further, the valve element (154) closes the communication hole (141d) when the nozzle connector (151) is at the lowermost position on the room-facing side to discommunicate the space inside the nozzle connector (151) and the dust collection path (77), and opens the communication hole (141d) when the nozzle connector (151) is at a level higher than the lowermost position to communicate the space inside the nozzle connector (151) and the dust collection path (77). Therefore, the space inside the nozzle connector (151) and the dust collection path (77) are communicated to allow for the suction and collection of the dust by abutting the nozzle (95a) of the cleaner (95) to the nozzle connector (151) and pushing the nozzle connector (51) upward. When the nozzle (95a) of the cleaner (95) is separated from the nozzle connector (151) to return the nozzle connector (151) to the lowermost position, the space inside the nozzle connector (151) and the dust collection path (77) discommunicate with each other, thereby preventing the leakage of the dust to the inside of the room.

In the above-described configuration, the air conditioner may further include a biasing means (155) for biasing the nozzle connector (151) downward (a twenty-sixth aspect of the disclosure). Thus, when the nozzle (95a) of the cleaner (95) is not pressed against the nozzle connector (151), the nozzle connector (151) is kept at the lower position. This makes it possible to reliably close the valve element (154) for opening/closing the communication hole (141d) between the space inside the nozzle connector (151) and the dust collection path (77). Thus, the leakage of the dust to the inside of the room can reliably be prevented when the dust collection is not performed.

The valve element (186) is preferably configured to open toward the nozzle connector (181) (a twenty-seventh aspect of the disclosure). Thus, in sucking and collecting the dust by the nozzle (95a) of the cleaner (95), the opening of the valve element (186) is not interfered by the dust around the communication hole (176b), thereby reliably keeping the valve element (186) open. Specifically, the dust accumulates upstream of the valve element (186). Therefore, if the valve element (186) is configured to open toward the upstream side, the dust may interfere with the movement of the valve element (186). However, the valve element (186) configured to open toward the nozzle connector (181) downstream of the valve element makes it possible to prevent the dust from interfering the opening of the valve element (186).

The valve element (186) is preferably rotatably supported at an upper portion thereof, and includes a protrusion (186a) protruding toward the nozzle connector (181), and the nozzle connector (181) preferably includes an abutment (181d) abutting the protrusion (186a) from below (a twenty-eighth aspect of the disclosure).

This makes it possible to open/close the valve element (186) by the vertical movement of the nozzle connector (181). Thus, the structure of the twenty-fourth aspect of the disclosure can be achieved.

A guide (178) is preferably arranged to surround the nozzle connector (181) so as to position the nozzle (95a, 191) of the cleaner (95) in the hole (181b) of the nozzle connector (181) (a twenty-ninth aspect of the disclosure). This allows for positioning of the nozzle (95a) of the cleaner (95) in the hole (181b) of the nozzle connector (181), thereby allowing for reliable suction and collection of the dust by the nozzle (95a) of the cleaner (95) through the hole (181b).

The guide (178) includes a plurality of ribbed members arranged to surround the nozzle connector (181) (a thirtieth aspect of the disclosure). This allows for providing the guide (178) of a simple structure, and reducing a material used, such as a resin, etc. Thus, the size and manufacturing cost of the air conditioner can be reduced.

The air conditioner preferably includes a closure means (172) for covering the room-facing side of the nozzle connector (181), wherein the closure means (172) is preferably configured to be rotatable about one end thereof as a rotation center so as to be opened when pushed from the inside of the room, and the guide (178) preferably includes a recess (178a) for receiving the closure means (172) in the open state (a thirty-first aspect of the disclosure).

With the provision of the recess (178a) in the guide (178) for receiving the closure means (172), the nozzle (95a) of the cleaner (95) can be brought into contact with the nozzle connector (181) without interference by the closure means (172), and the closure means (172) can function as part of the guide. This allows for reliable pressing of the nozzle (95a) of the cleaner (95) onto the nozzle connector (181).

According to the eleventh, thirteenth, and thirty-first aspects of the disclosure, a UV coating is preferably applied to a room-facing surface of the closure means (172) (a thirty-second aspect of the disclosure). Thus, in opening the closure means (172) from the inside of the room by an end of the nozzle (95a) of the cleaner (95), the closure means (172) can be protected from soiling and scratches. Specifically, the application of the UV coating which is resistant to soiling and scratches on the room-facing surface of the closure means (172) allows for keeping good appearance of the room-facing side of the closure means (172).

In the above-described configuration, the flexible duct (77) constitutes the dust collection path, and the flexible duct (77) and the nozzle connector (78) are preferably detachably connected (a thirty-third aspect of the disclosure). This allows for easy attachment and detachment of the flexible duct (77) to and from the nozzle connector (78), thereby improving the workability of installation of the indoor unit (13) in the space on the ceiling, and maintenance of the indoor unit (13).

A thirty-fourth aspect of the disclosure is directed to an extension nozzle (191) of a cleaner which is brought into contact with the nozzle connector (181) of the air conditioner (10) of the twenty-fourth aspect of the disclosure. The extension nozzle is attached to an end of the nozzle (95a) of the cleaner (95), and an end (191a) thereof abuts the nozzle connector (181) of the air conditioner (10) of the twenty-fourth aspect of the disclosure. The end (191a) is formed in such a manner that an opening in the end (191a) overlaps with the hole (181b) of the nozzle connector (181) as viewed in plan, when the end (191a) pushes the nozzle connector (181) upward with an outer circumference thereof abutting the guide (178) arranged to surround the nozzle connector (181).

With this configuration, even when the extension nozzle (191) is inserted in a position deviated from the center of the nozzle connector (181) when viewed in plan, and the outer circumference of the extension nozzle (191) abuts the guide (178) arranged to surround the nozzle connector (181), the opening in the end (191a) of the extension nozzle (191) can reliably communicate with the hole (181b) in the nozzle connector (181). Thus, the extension nozzle (191) configured as described above makes it possible to reliably suck and collect the dust through the extension nozzle (191), thereby improving the workability of the dust collection.

The nozzle connector (181) is preferably in the shape of a dome protruding toward the inside of the room, and the opening in the end (191a) abutting the nozzle connector (181) is preferably in the shape of a perfect circle (a thirty-fifth aspect of the disclosure). This makes it possible to reliably bring the end of the extension nozzle (191) into contact with the dome-shaped nozzle connector (181). Thus, the suction of the dust can reliably and efficiently be performed through the extension nozzle (191).

The end (191a') is preferably bent substantially in the shape of L (a thirty-sixth aspect of the disclosure). With this configuration, pressing the extension nozzle (191) to the nozzle connector (181) from immediately below is no longer necessary. Thus, the dust collection by the extension nozzle (191) is easily performed.

A distal end of the end (191a) is preferably configured in such a manner that an extension tube (195) bent substantially in the shape of L can be attached thereto (a thirty-seventh aspect of the disclosure). This makes it possible to lengthen the end (191a), and to obtain the advantages of the thirty-sixth aspect of the disclosure.

A coupling having an outer diameter similar to an inner diameter of a proximal end (201b) is provided at the distal end of the end (201a) (a thirty-eighth aspect of the disclosure). This allows for coupling of the extension nozzles (191), thereby lengthening the nozzle of the cleaner (95) to a further extent. Specifically, the coupling at the distal end of the end (201a) of the extension nozzle (191) is inserted in the proximal end (201b) of another extension nozzle (191), thereby coupling the nozzles, and lengthening the nozzle of the cleaner (95).

The extension nozzle configured as described above further includes a nozzle engagement (196) for attaching the extension nozzle detached from the end of the nozzle (95a) of the cleaner (95) to the nozzle (95a) to be parallel with the nozzle (95a) (a thirty-ninth aspect of the disclosure).

With this configuration, the extension nozzle (191) detached from the end of the nozzle (95a) of the cleaner (95) can be attached to the nozzle (95a) by the nozzle engagement (196) in a parallel manner. This can prevent lost of the extension nozzle (191) when the extension nozzle (191) is not used.

In particular, the nozzle engagement is preferably a tape (196) wound around the nozzle (95a) (a fortieth aspect of the disclosure). With this configuration, the extension nozzle (191) can reliably be engaged with the nozzle (95a) of the cleaner (95). Further, an insertion part (192) through which the tape (196) passes is preferably provided on an outer circumferential surface of the extension nozzle (a forty-first aspect of the disclosure). This can prevent the tape (196) from displacing from the extension nozzle (191), thereby allowing for reliable fixing of the extension nozzle (191) to the nozzle (95a). A portion of the tape (196) passing through the insertion part (192) is preferably narrower than an internal dimension of the insertion part (192), and the other portion of the tape (196) is preferably wider than the internal dimension of the insertion part (192) (a forty-second aspect of the disclosure). This can prevent the tape (196) from slipping from the insertion part (192), thereby preventing the lost of the tape (196).

A second nozzle engagement (197) capable of engaging with an engagement (95b) formed on an outer circumferential surface of the nozzle (95a) is preferably provided on an outer circumferential surface of the extension nozzle (a forty-third aspect of the disclosure). This makes it possible to temporarily fix the extension nozzle to the nozzle (95a) by engaging the second nozzle engagement (197) with the engagement (95b) of the nozzle (95a) before fixing the extension nozzle (191) to the nozzle (95a) of the cleaner (95) by the nozzle engagement (196). Thus, the nozzle engagement (196) allows for easy fixing of the extension nozzle (191) to the nozzle (95a).

A second insertion part (198) is preferably formed on an outer circumferential surface of the extension nozzle, and a ring-shaped member (199) a portion of which passes through the second insertion part (198) is preferably provided (a forty-fourth aspect of the disclosure). This makes it possible to hang the ring-shaped member (191) on a certain protrusion on a wall, thereby allowing for easy storage of the extension nozzle (191).

ADVANTAGES OF THE INVENTION

According to the present disclosure described above, the dust trapped on the air filter (40) of the indoor unit (13) of the air conditioner (10) is removed by the dust removing means (50), and is contained in the dust containing part (60). The contained dust is then sucked and collected by the nozzle (95a) of the cleaner (95) through the nozzle connector (78) provided at the downstream outlet of the dust collection path (77). Therefore, a user is no longer required to approach the dust containing part (60) to collect the dust, thereby improving the workability of the dust collection.

According to the second aspect of the disclosure, the nozzle connector (78) is arranged inside the casing (26), and inside a room-facing surface of a room panel (27) arranged on a room-facing side of the casing (26). Therefore, the nozzle connector (78) becomes almost invisible from the inside of the room, thereby keeping good appearance of the room-facing side of the indoor unit (13).

According to the third aspect of the disclosure, the nozzle connector (78) is arranged at the corner of the room panel (27), i.e., dead space of the indoor unit (13) is efficiently used. Further, the space is efficiently used also in the case where the nozzle connector (78) is arranged in the relatively large inlet (22) of the casing (26) according to the fourth aspect of the disclosure.

According to the fifth aspect of the disclosure, the nozzle connector (151) is arranged outside the grille portion (29a) of the suction grille (29) arranged in the inlet (22) of the casing (26). This allows for efficient dust collection.

According to the sixth aspect of the disclosure, the open/close closure means (28b) for communicating or discommunicating the dust collection path (77) with the inside of the room is provided at least one of upstream and downstream of the nozzle connector (78). Therefore, the closure means (28b) can be opened only when the nozzle (95a) is connected to the nozzle connector (78), and the closure means (28b) can be closed during normal operation. Thus, the closure means (28b) can prevent the leakage of the dust from the nozzle connector (78) to the inside of the room with more reliability.

According to the seventh aspect of the disclosure, the nozzle connector (78) is arranged at the corner of the room panel (27), and the closure means is a corner cover (28b) arranged on the corner. Therefore, the dead space is efficiently used, and the corner cover (28b) can prevent the leakage of the dust to the inside of the room.

According to the eighth aspect of the disclosure, the nozzle connector (78) is arranged in the inlet (22) of the casing (26), and the closure means is the suction grille (29). This eliminates the need for providing additional closure means, and keeps good appearance of the room-facing side of the indoor unit (13). Moreover, as described above, cost of the air conditioner (10) can be reduced because the additional closure means is no longer necessary.

According to the ninth aspect of the disclosure, the sealing member (80) is provided between the closure means (28b) and the nozzle connector (78) for preventing the leakage of the dust when the closure means (28b) is closed. Therefore, the leakage of the dust from the nozzle connector (78) to the inside of the room is reliably prevented during the normal operation in which the dust collection is not performed.

According to the tenth aspect of the disclosure, the closure means (28b) is configured to rotate about one end thereof as a rotation center, and is configured to be able to engage with the push lock (79) at the other end thereof. Therefore, the closure means (28b) can easily be opened by pushing the closure means (28b) by the nozzle (95a) of the cleaner (95), etc., thereby improving the workability of the dust collection.

According to the eleventh aspect of the disclosure, the closure means (101b) is configured to rotate about one end thereof as a rotation center in such a manner that the closure means (101b) is opened when pushed from the inside of the room. Therefore, the closure means (101b) can easily be opened by the nozzle (95a) of the cleaner (95), and the nozzle (95) can easily be brought into contact with the nozzle connector (78). This improves the workability of the dust collection. In particular, with the provision of the biasing means (102) for biasing the closure means (101b) to a closed state at the one end of the closure means (101b) according to the twelfth aspect of the disclosure, the closure means (101b) is kept closed except for the dust collection, thereby allowing for keeping good appearance of the room-facing side of the indoor unit (13), and preventing the leakage of the dust to the inside of the room with more reliability.

According to the thirteenth aspect of the disclosure, the closure means (111b) is configured to be slidable. Also in this configuration, the closure means (111b) can be opened and closed. Therefore, when the dust collection is not performed, the closure means (111b) is closed to keep good appearance of the room-facing side of the indoor unit (13), and to prevent the leakage of the dust to the inside of the room.

According to the fourteenth aspect of the disclosure, the drive means (113) for opening/closing the closure means (111b) is provided. Therefore, the closure means can easily be opened and closed, and a user is no longer required to climb up to the ceiling to collect the dust, thereby improving the workability of the dust collection.

According to the fifteenth aspect of the disclosure, the dust collection box (90) for accumulating the dust contained in the dust containing part (60) is provided, and the dust collection path (77) is connected to the dust collection box (90). This makes it possible to accumulate a larger amount of dust in the dust collection box (90), thereby reducing the frequency of the dust collection, and reducing user's labor in collecting the dust. In particular, according to the sixteenth aspect of the disclosure, the flexible duct (74, 77) constitutes at least one of the dust collection path and the transfer path to the dust collection box (90), thereby reducing the size of the air conditioner. According to the seventeenth aspect of the disclosure, the duct (74, 77) constituting the dust collection path and the transfer path is detachably connected to the dust collection box (90). Thus, the duct (74, 77) can easily be attached or detached in installation and maintenance of the dust collection box (90), thereby improving the workability.

According to the eighteenth aspect of the disclosure, the dust collection path (77) is directly connected to the dust containing part (60), and the air vent (60a) is formed in the dust containing part (60) to oppose to a junction with the dust collection path (77). Therefore, the dust can efficiently be sucked by the cleaner (95) through the dust containing part (60) and the dust collection path (77). In particular, according to the nineteenth aspect of the disclosure, a flexible duct (77) constitutes the dust collection path extending from the casing (26) to the nozzle connector (78), thereby reducing the size of the air conditioner. According to the twentieth aspect of the disclosure, the duct (77) constituting the dust collection path is detachably connected to the casing (26), thereby allowing for easy attachment and detachment of the duct (77) in installation and maintenance of the indoor unit (13), and improving the workability.

According to the twenty-first aspect of the disclosure, the nozzle connector (78) is formed with a cross-sectional area of the dust collection path (77) formed therein increasing toward the inside of the room. Therefore, the nozzle (95a) can be inserted in the nozzle connector (78) to reliably abut thereto irrespective of the size of the nozzle (95a) of the cleaner (95). Thus, the dust can reliably be sucked and collected by any of the cleaners (95) having the nozzles (78) of different sizes.

According to the twenty-second aspect of the disclosure, the nozzle connector (121a) protrudes toward the inside of the room with its cross-sectional area decreasing toward the inside of the room, and a hole (121b) through which the dust can pass is provided at a protruding end of the nozzle connector (121a). Thus, irrespective of the size and cross-sectional area of the nozzle (95a) of the cleaner (95), a portion of the nozzle connector (121a) can be positioned inside the end of the nozzle (95a), thereby reliably bringing the nozzle (95a) into contact with the nozzle connector (121a). Therefore, irrespective of the size and cross-sectional area of the nozzle (95a) of the cleaner (95), the dust can efficiently be sucked and collected by the nozzle (95a) of the cleaner (95) through the nozzle connector (121a).

According to the twenty-third aspect of the disclosure, the nozzle connector (121a) is in the shape of a dome protruding toward the inside of the room. Therefore, the end of the nozzle (95a) can reliably be brought into contact with the nozzle connector (121a), irrespective of the size and cross-sectional area of the nozzle (95a) of the cleaner (95), and part of the nozzle connector (121a) to which the nozzle (95a) abuts. This allows for reliable and efficient dust collection.

According to the twenty-fourth aspect of the disclosure, the valve (152) for switching communication and discommunication between space inside the nozzle connector (151) and the dust collection path (77) in response to the vertical movement of the nozzle connector (151) is provided upstream of the nozzle connector (151). Thus, the flow of the dust to the nozzle connector (151) can be controlled by the vertical movement of the nozzle connector (151) using the nozzle (95a) of the cleaner (95). Therefore, the user is no longer required to open and close the closure means, etc. This improves the workability of the dust collection.

According to the twenty-fifth aspect of the disclosure, the valve (152) includes the valve element (154) configured to vertically move together with the nozzle connector (151), thereby closing the communication hole (141s) when the nozzle connector (151) is at a lowermost position on the room-facing side, or opening the communication hole (141d) when the nozzle connector (151) is at a level higher than the lowermost position. This can achieve the structure of the twenty-fourth aspect of the disclosure, thereby offering the advantages similar to those of the twenty-fourth aspect of the disclosure.

According to the twenty-sixth aspect of the disclosure, the biasing means (155) for biasing the nozzle connector (151) downward is provided. This makes it possible to bias the valve element (154) vertically moving together with the nozzle connector (151) to close the communication hole (141d), thereby reliably preventing the leakage of the dust to the inside of the room when the dust collection is not performed.

According to the twenty-seventh aspect of the disclosure, the valve element (186) is configured to open toward the nozzle connector (181). Thus, the opening of the valve element (186) is not interfered by the dust around the communication hole (176b), thereby reliably keeping the valve element (186) open. Therefore, the suction and collection of the dust can reliably be performed.

According to the twenty-eighth aspect of the disclosure, the valve element (186) is rotatably supported at an upper portion thereof, and includes a protrusion (186a) to which an abutment (181d) of the nozzle connector (181) abuts from below. This can achieve the structure of the twenty-fourth aspect of the disclosure.

According to the twenty-ninth aspect of the disclosure, the guide (178) is provided to surround the nozzle connector (181). This makes it possible to reliably position the nozzle (95a) of the cleaner (95) at the hole (181b) of the nozzle connector (181), and to reliably suck and collect the dust by the nozzle (95a) of the cleaner (95) through the hole (181b). Thus, the dust collection can reliably and efficiently be performed.

According to the thirtieth aspect of the disclosure, the guide (178) includes a plurality of ribbed members arranged to surround the nozzle connector (181). This makes it possible to provide the guide (178) of a simple structure, and to reduce the weight and manufacturing cost of the air conditioner.

According to the thirty-first aspect of the disclosure, the closure means (172) for covering the room-facing side of the nozzle connector (181) is configured to be rotatable about one end thereof as a rotation center so as to be opened when pushed upward from the inside of the room. The guide (178)

includes a recess (178a) for receiving the closure means (172) in the open state. This makes it possible to press the nozzle (95a) of the cleaner (95) onto the nozzle connector (181) with more reliability, thereby allowing for efficient and reliable suction and collection of the dust.

According to the thirty-second aspect of the disclosure, the UV coating is applied to the room-facing surface of the closure means (172). This can protect the closure means (172) from soiling and scratches, thereby keeping good appearance of the room-facing surface of the closure means (172).

According to the thirty-third aspect of the disclosure, the flexible duct (77) constituting the dust collection path and the nozzle connector (78) are detachably connected. This can improve the workability of installation and maintenance of the indoor unit (13).

According to the thirty-fourth aspect of the disclosure directed to an extension nozzle (191) of a cleaner which is brought into contact with the nozzle connector (181) of the air conditioner (10) of the twenty-fourth aspect of the disclosure, the end (191a) is formed in such a manner that an opening in the end (191a) overlaps with the hole (181b) of the nozzle connector (181) as viewed in plan, when the end (191a) pushes the nozzle connector (181) upward with an outer circumference thereof abutting the guide (178) arranged to surround the nozzle connector (181). This makes it possible to position the opening in the end (191a) of the extension nozzle (191) at a position where the opening can reliably communicate with the hole (181b) of the nozzle connector (181). Therefore, the dust can reliably be sucked and collected, thereby improving the workability of the dust collection.

According to the thirty-fifth aspect of the disclosure, the opening in the end (191a) of the extension nozzle (191) abutting the dome-shaped nozzle connector (181) is in the shape of a perfect circle. Therefore, the end (191a) of the extension nozzle (191) can reliably be brought into contact with the nozzle connector (181), thereby allowing for efficient and reliable suction of the dust.

According to the thirty-sixth aspect of the disclosure, the end (191a') is bent substantially in the shape of L. Thus, pressing the extension nozzle (191) to the nozzle connector (181) from immediately below is no longer necessary. Therefore, the dust collection using the extension nozzle (191) can smoothly be performed, and the worker does not have to perform the dust collection in an uncomfortable position.

According to the thirty-seventh aspect of the disclosure, the distal end of the end (191a) is configured in such a manner that an extension tube (195) bent substantially in the shape of L can be attached thereto. This makes it possible to lengthen the nozzle, and the worker does not have to press the extension nozzle (191) to the nozzle connector (181) from immediately below. Thus, the worker can smoothly perform the dust collection in a comfortable position, thereby improving the workability.

According to the thirty-eighth aspect of the disclosure, a coupling having an outer diameter similar to an inner diameter of a proximal end (201b) is provided at the distal end of the end (201a). This allows for coupling of the extension nozzles (191), thereby lengthening the nozzle of the cleaner (95) to a further extent.

According to the thirty-ninth aspect of the disclosure, the extension nozzle (191) includes a nozzle engagement (196) for attaching the extension nozzle detached from the end of the nozzle (95a) of the cleaner (95) to the nozzle (95a) to be parallel with the nozzle (95a). Therefore, when the extension nozzle (191) is not used, lost of the extension nozzle (191) is reliably prevented. In particular, according to the fortieth aspect of the disclosure, the nozzle engagement is a tape (196) wound around the nozzle (95a). This can reliably fix the extension nozzle (191) to the nozzle (95a) of the cleaner (95). Further, according to the forty-first aspect of the disclosure, an insertion part (192) through which the tape (196) passes is provided on an outer circumferential surface of the extension nozzle (191). This can prevent displacement of the tape (196), thereby reliably fixing the extension nozzle (191) to the nozzle (95a) of the cleaner (95). According to the forty-second aspect of the disclosure, a portion of the tape (196) passing through the insertion part (192) is narrower than an internal dimension of the insertion part (192), and the other portion of the tape (196) is wider than the internal dimension of the insertion part (192). This can prevent the tape (196) from slipping from the insertion part (192), thereby preventing the lost of the tape (196).

According to the forty-third aspect of the disclosure, a second nozzle engagement (197) capable of engaging with an engagement (95b) provided on the outer circumferential surface of the nozzle (95a) of the cleaner (95) is provided on an outer circumferential surface of the extension nozzle (191). This makes it possible to temporarily fix the extension nozzle to the nozzle (95a) by engaging the second nozzle engagement (197) with the engagement (95b) of the nozzle (95a) before fixing the extension nozzle (191) to the nozzle (95a) of the cleaner (95) by the nozzle engagement (196). Thus, the nozzle engagement (196) allows for easy fixing of the extension nozzle (191) to the nozzle (95a).

According to the forty-fourth aspect of the disclosure, a second insertion part (198) is formed on the outer circumferential surface of the extension nozzle (191), and a ring-shaped member (199) a portion of which passes through in the second insertion part (198) is provided. This allows for easy storage of the extension nozzle (191).

BRIEF DESCRIPTION OF THE DRAWINGS

FIGS. 11(a) to 11(d) are views illustrating filter cleaning operation of the embodiment of the present disclosure, in which FIG. 11(a) illustrates normal operation, FIG. 11(b) illustrates winding of the filter, FIG. 11(c) illustrates rewinding of the filter, and FIG. 11(d) illustrates dust discharge.

FIGS. 12(a) and 12(b) are partial cross-sectional views taken along the line XII-XII in FIG. 2 illustrating the structure of a cover portion, in which FIG. 12(a) shows the cover portion in a closed state, and FIG. 12(b) shows the cover portion in an open state.

FIGS. 17(a) and 17(b) illustrate an air conditioner of a second embodiment, in which FIG. 17(a) is a partial cross-sectional view of a casing body as viewed from above the ceiling, and FIG. 17(b) is a side view of the air conditioner.

FIGS. 18(a) and 18(b) are enlarged cross-sectional views of a nozzle connector taken along the line XVIII-XVIII in FIG. 17, in which FIG. 17(a) shows a suction grille in a closed state, and FIG. 17(b) shows the suction grille in an open state.

FIGS. 19(a) and 19(b) are enlarged cross-sectional views of a nozzle connector of an air conditioner according to a third embodiment, in which FIG. 19(a) shows lid members in a closed state, and FIG. 19(b) show the lid members in an open state.

FIGS. 21(a) and 21(b) are enlarged cross-sectional views illustrating a nozzle receiver of an air conditioner of a fourth embodiment, in which FIG. 21(a) shows lid members in a closed state, and FIG. 21(b) shows the lid members in an open state.

FIGS. 32(a) to 32(c) show the indoor unit, in which FIG. 32(a) is a lateral cross-sectional view as viewed from the bottom, and FIGS. 32(b) and 32(c) are vertical cross-sectional views as viewed from the side.

FIG. 44 is a cross-sectional view illustrating a junction between a nozzle connector and a duct, in which FIG. 44(a) shows them in a disconnected state, FIG. 44(b) shows them in a connected state.

FIGS. 46(a) and 46(b) are views illustrating the schematic structure of an extension nozzle according to the other embodiment, in which FIG. 46(a) shows a single extension nozzle only, FIG. 46(b) shows two connected extension nozzles.

DESCRIPTION OF EMBODIMENTS

Embodiments of the present disclosure will be described below in detail with reference to the drawings. The following embodiments are merely preferred embodiments in nature, and are not intended to limit the scope, applications, and use of the present disclosure.

First Embodiment

A first embodiment is directed to an air conditioner (10) including a dust collection structure for collecting dust removed from an air filter (40). An indoor unit (13) of the air conditioner (10) is arranged on a ceiling of a room. In the following description, the structure of the air conditioner (10) of the present embodiment will be described first, and then the structure of the indoor unit (13), and the dust collection structure will be sequentially described.

<General Structure>

Figure 1:
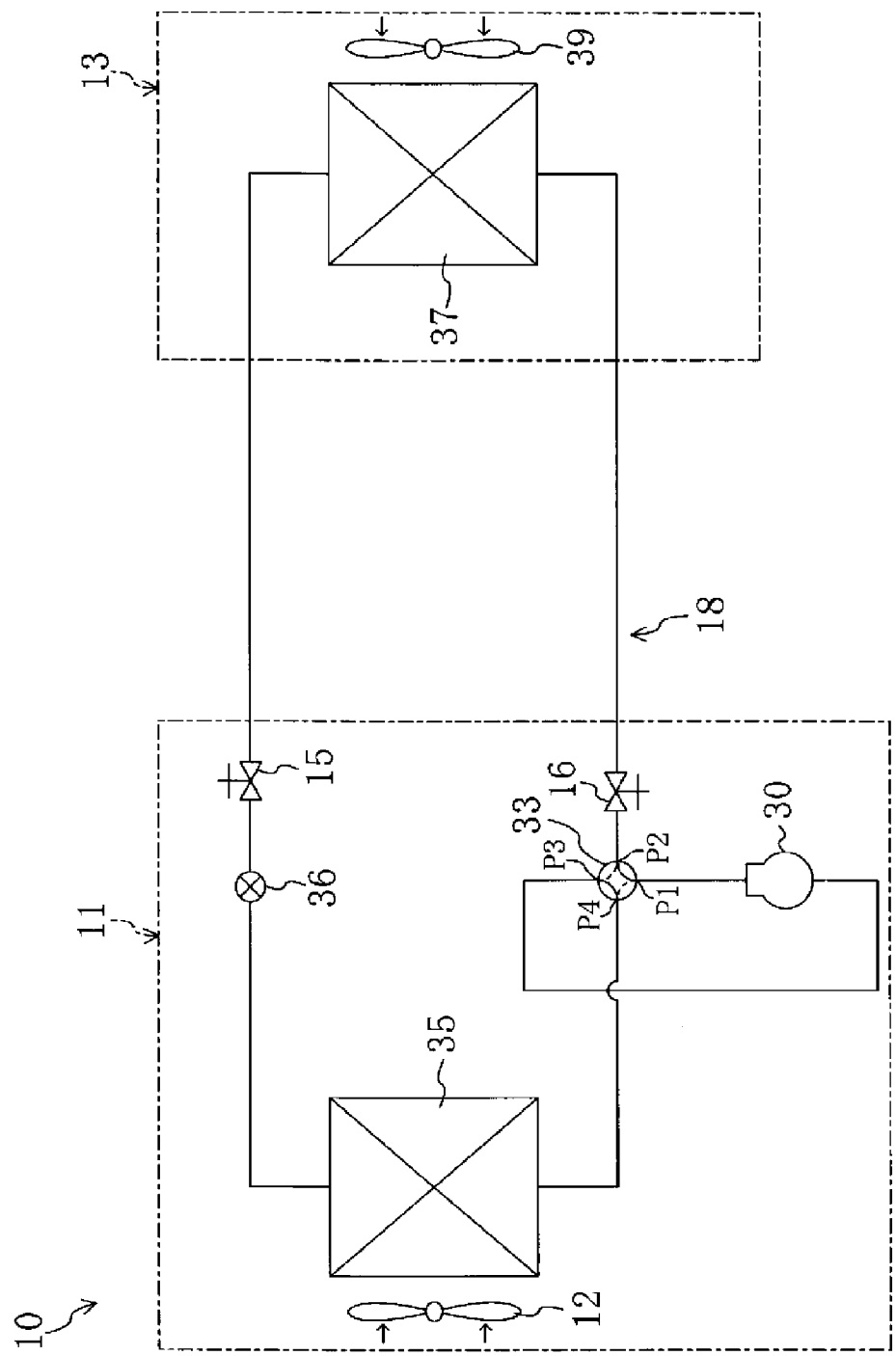
FIG. 1 is a piping diagram illustrating the structure of an air conditioner including a dust collection box according to an embodiment of the present disclosure.

As shown in FIG. 1, the air conditioner (10) includes an outdoor unit (11), and an indoor unit (13). The outdoor unit (11) includes a compressor (30), an outdoor heat exchanger (35), an expansion valve (36), a four way switching valve (33), and an outdoor fan (12). The indoor unit (13) includes an indoor heat exchanger (37) and an indoor fan (39).

In the outdoor unit (11), a discharge side of the compressor (30) is connected to a first port (P1) of the four way switching valve (33). A suction side of the compressor (30) is connected to a third port (P3) of the four-way switching valve (33).

The outdoor heat exchanger (35) is configured as a cross-fin type fin-and-tube heat exchanger. One end of the outdoor heat exchanger (35) is connected to a fourth port (P4) of the four-way switching valve (33). The other end of the outdoor heat exchanger (35) is connected to a liquid stop valve (15).

The outdoor fan (12) is arranged near the outdoor heat exchanger (35). In the outdoor heat exchanger (35), outdoor air sent by the outdoor fan (12) and a refrigerant circulating in the outdoor heat exchanger (35) exchange heat. An expansion valve (36) capable of changing the degree of opening is provided between the outdoor heat exchanger (35) and the liquid stop valve (15). A second port (P2) of the four-way switching valve (33) is connected to a gas stop valve (16).

The four-way switching valve (33) is configured to be able to switch between a first state where the first port (P1) and the second port (P2) communicate with each other, and the third port (P3) and the fourth port (P4) communicate with each other (a state indicated by a solid line in FIG. 1), and a second state where the first port (P1) and the fourth port (P4) communicate with each other, and the second port (P2) and the third port (P3) communicate with each other (a state indicated by a broken line in FIG. 1).

In this air conditioner (10), heating operation is performed when the four-way switching valve (33) is set to the first state, and cooling operation is performed when the four-way switching valve (33) is set to the second state. In the heating operation, a vapor compression refrigeration cycle is performed in which the outdoor heat exchanger (35) and the indoor heat exchanger (37) in a refrigerant circuit (18) function as an evaporator and a condenser, respectively. In the cooling operation, a vapor compression refrigeration cycle is performed in which the outdoor heat exchanger (35) and the indoor heat exchanger (37) in the refrigerant circuit (18) function as a condenser and an evaporator, respectively.

<Structure of Indoor Unit>

Figure 2:
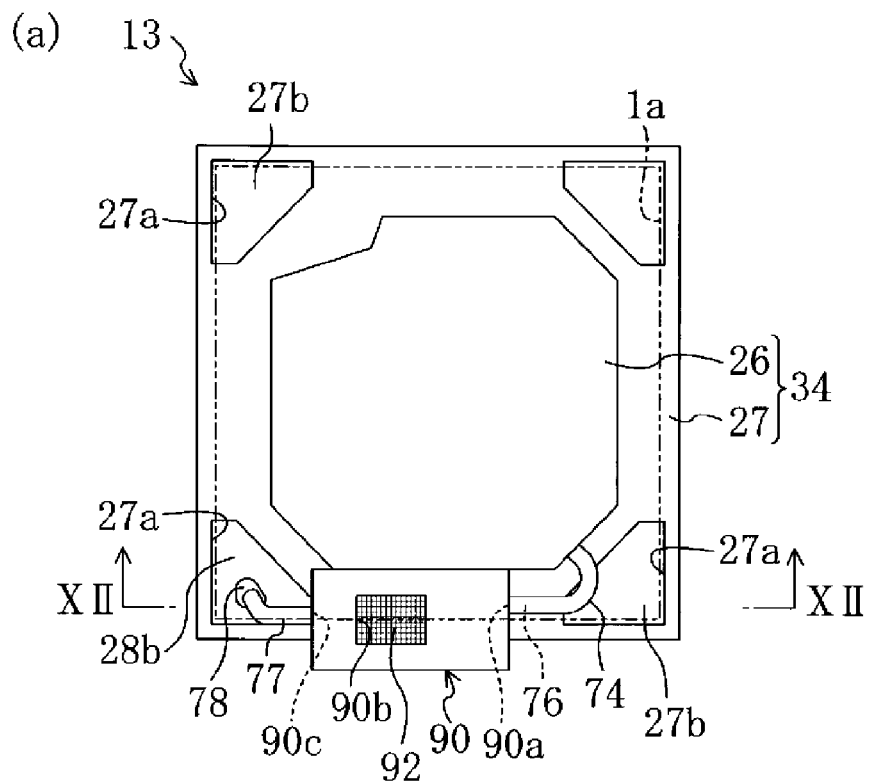
FIG. 2(a) is a plan view of an indoor unit as viewed from above a ceiling.
FIG. 2(b) is a side view of the indoor unit.
Figure 2:
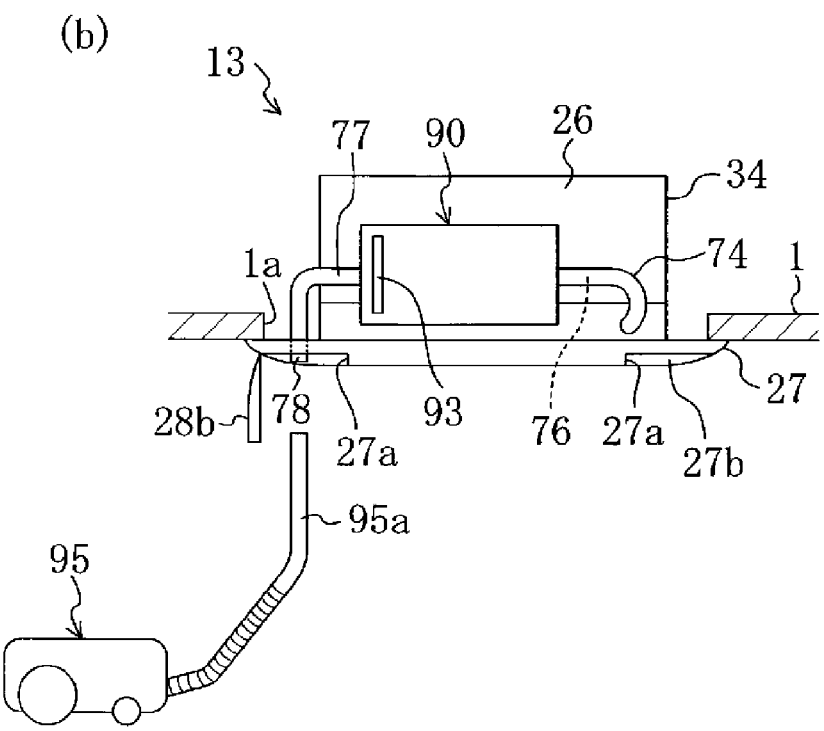
Figure 3:
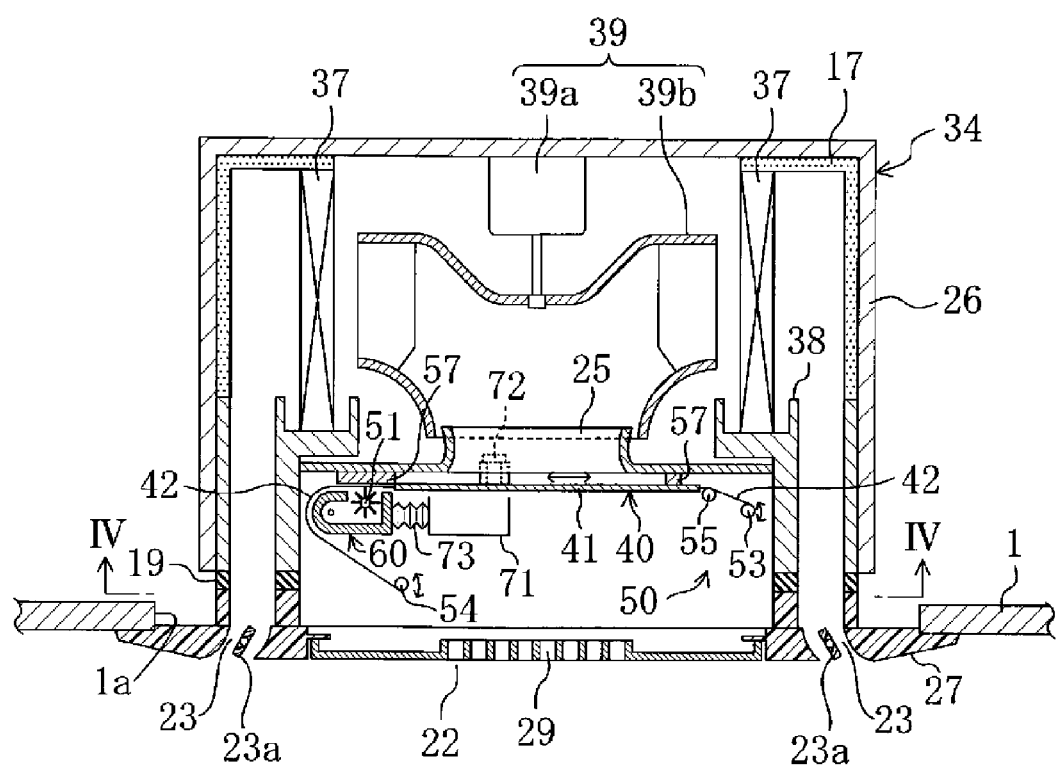
FIG. 3 is a cross-sectional view illustrating the inside of a casing.
Figure 4:
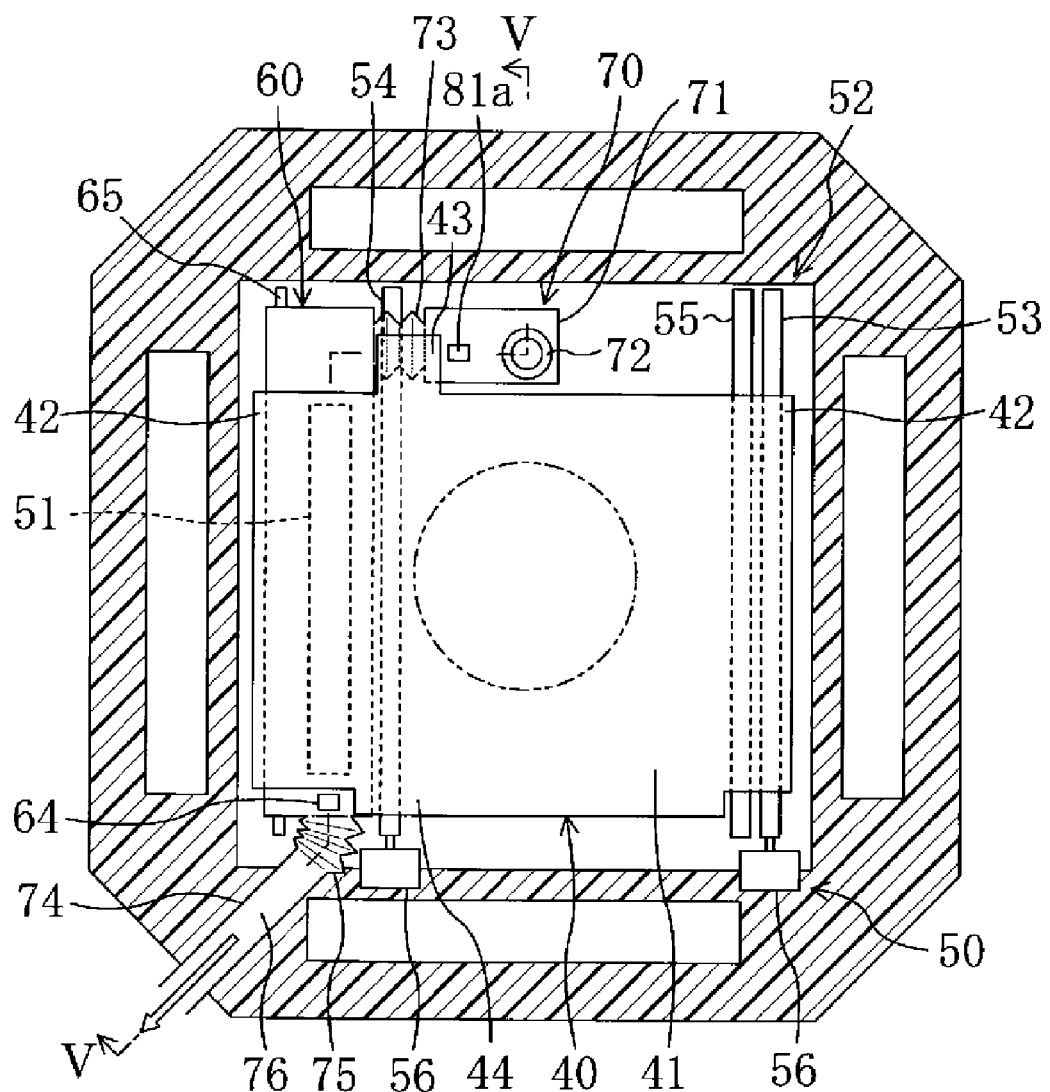
FIG. 4 is a cross-sectional view taken along the line IV-IV in FIG. 3.
Figure 5:
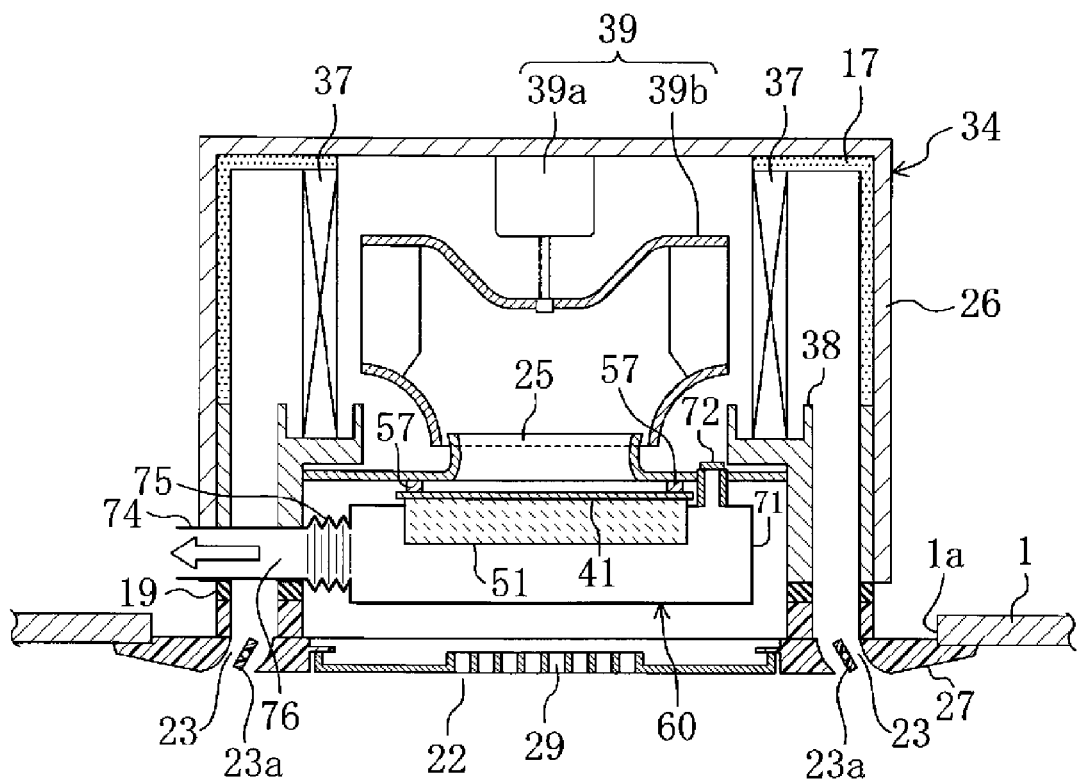
FIG. 5 is a cross-sectional view taken along the line V-V in FIG. 4.

As shown in FIG. 2, the indoor unit (13) includes an indoor casing (34) including a casing body (26) (a casing), and a decorative panel (27). A dust collection box (90) for accumulating dust removed from the air filter (40) in the casing body (26) is arranged outside the casing body (26) as described later. Further, as shown in FIGS. 3 to 5, the indoor casing (34) contains the indoor heat exchanger (37), a drain pan (38), the indoor fan (39), the air filter (40), a dust removing means (50), a dust container (60), and a dust transfer means (70).

The casing body (26) is in the shape of a substantially rectangular parallelepiped box having an open bottom. A heat insulator (17) is laminated on an inner surface of the casing body (26). The casing body (26) is suspended from an upper board in space above a ceiling with its lower portion fitted in an opening (1*a*) in a ceiling board (1).

Figure 6:
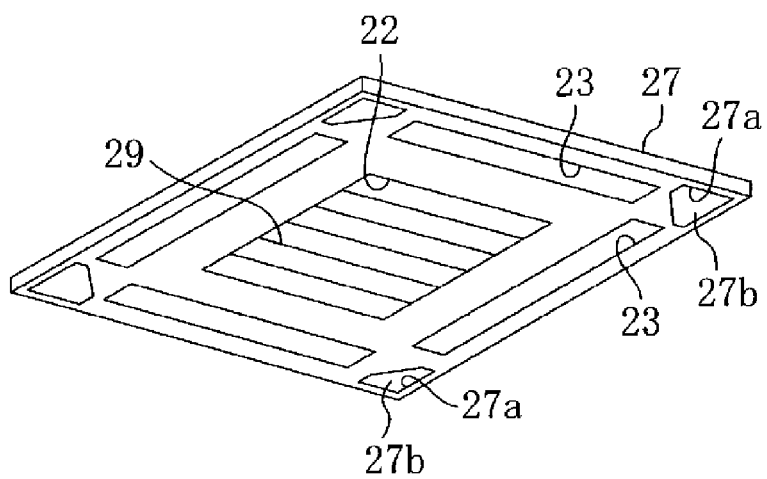
FIG. 6 is a perspective view illustrating a decorative panel as viewed from the bottom.

The decorative panel (27) is in the shape of a rectangular plate (see FIG. 6). When viewed in plan, the decorative panel (27) is slightly larger than the casing body (26). The decorative panel (27) is attached to the casing body (26) to cover a lower portion of the casing body (26) with a sealing member (19) sandwiched therebetween as shown in FIGS. 3 and 5. The decorative panel (27), when attached to the casing body (26), is exposed in the room.

As shown in FIG. 6, the decorative panel (27) is provided with one inlet (22) and four outlets (23). The inlet (22) is rectangular-shaped, and is formed in the center of the decorative panel (27). A suction grille (29) provided with slits is fitted in the inlet (22). Each of the outlets (23) is in the shape of a narrow rectangle, and they are formed along the sides of the decorative panel (27), respectively. An adjuster plate (23*a*) for adjusting the direction of air flow is provided at each of the outlets (23) (see FIG. 3, etc.). The adjuster plate (23*a*) rotates to adjust the direction of air flow (the direction of blowing air).

As shown in FIG. 2, the decorative panel (27) is provided with substantially triangular openings (27*a*, 27*a*, . . . ) arranged at the corners of the panel, respectively. These openings (27*a*, 27*a*, . . . ) are generally used to allow for worker's access to the space above the ceiling for maintenance and inspection of the indoor unit (13). For example, the openings (27*a*) are used to allow for the worker's access in adjusting the level of the casing body (26) suspended from the upper board in the space above the ceiling. Therefore, in general, the openings (27*a*) are covered with detachable covers (27*b*), respectively.

In the present embodiment, as shown in FIG. 2, one end of a collection duct (77) (a dust collection path) extending from a dust collection box (90) described later is arranged in one opening (27*a*) of the four openings (27*a*). As described in detail below, the arrangement of the one end of the collection duct (77) in the opening (27*a*) makes it possible to insert a nozzle (95*a*) of a cleaner (95) from the inside of the room into the opening (27*a*) after opening the cover portion (28*b*) (a closure means, a corner cover) covering the opening (27*a*) (see FIG. 2(*b*)). A path from the dust collection box (90) to a surface of the decorative panel (27) facing the inside of the room corresponds to a dust collection path for collecting the dust. The dust collection path may include every path involved in the dust collection, such as a path from a dust container (60) described later to the surface of the decorative panel (27) facing the inside of the room.

The indoor fan (39) is a so-called turbo fan. As shown in FIGS. 3 and 5, the indoor fan (39) is arranged near the center of the casing body (26) and above the inlet (22). The indoor fan (39) includes a fan motor (39*a*) and an impeller (39*b*). The fan motor (39*a*) is fixed to a top plate of the casing body (26). The impeller (39*b*) is connected to a rotation shaft of the fan motor (39*a*). A bell mouth (25) communicating with the inlet (22) is provided below the indoor fan (39). The bell mouth (25) divides space in the casing body (26) upstream of the indoor heat exchanger (37) into a room near the indoor fan (39) and a room near the suction grille (29). The indoor fan (39) is configured to blow air sucked from below through the bell mouth (25) in a radial direction.

The indoor heat exchanger (37) is configured as a cross-fin type fin-and-tube heat exchanger. When viewed in plan, the indoor heat exchanger (37) is in the shape of a rectangular frame, and is arranged to surround the indoor fan (39). In the indoor heat exchanger (37), indoor air (blowing air) sent by the indoor fan (39) and a refrigerant circulating in the indoor heat exchanger (37) exchange heat.

The drain pan (38) is arranged below the indoor heat exchanger (37). The drain pan (38) receives drainage generated because of condensation of moisture in the air in the indoor heat exchanger (37). The drain pan (38) is provided with a drain pump (not shown) for discharging the drainage. The drain pan (38) is inclined so that the drainage is collected to part of the drain pan at which the drain pump is provided.

Figure 7:
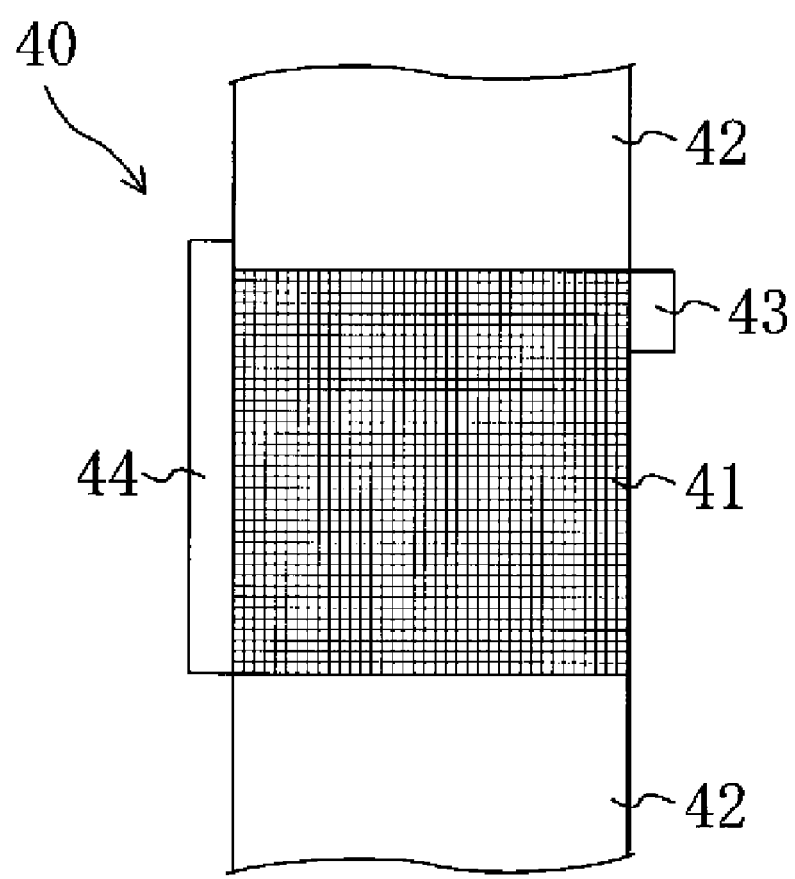
FIG. 7 is a plan view illustrating an air filter.

The air filter (40) is in the shape of a long sheet, and is arranged below the bell mouth (25) (near an inlet of the bell mouth). As shown in FIG. 7, the air filter (40) includes a filter body (41) which is rectangular when viewed in plan, and winding portions (42). The filter body (41) is shaped as large as it can cover the inlet of the bell mouth (25), and traps dust contained in indoor air sucked into the indoor fan (39). The winding portions (42) are connected to a pair of opposing sides of the filter body (41), and are wound around a first winding drum (53) and a second winding drum (54) of a dust removing means (50), respectively, as described later (see FIG. 3). A damper tab (43) and a container tab (44) are formed on another pair of sides of the filter body (41) to which the winding portions (42) are not connected (hereinafter referred to as lateral sides), respectively. The damper tab (43) is formed at an end portion of the filter body (41). The container tab (44) is formed to extend over almost every portion of the lateral side of the filter body (41).

As shown in FIGS. 3 and 4, the dust removing means (50) is provided for removing the dust trapped on the air filter (40). The dust removing means (50) includes a rotating brush (51) as a brush member, and a filter moving means (52).

The filter moving means (52) keeps the air filter (40) at a predetermined position on one hand, and allows the air filter (40) to reciprocate relative to the rotating brush (51) on the other hand. The filter moving means (52) includes a first winding drum (53), a second winding drum (54), and a guide roller (55).

The first winding drum (53) and the second winding drum (54) are arranged below the bell mouth (25) and outside the inlet of the bell mouth. The first winding drum (53) is positioned on the right in FIG. 3 (hereinafter referred to as a rearward side), and the second winding drum (54) is positioned on the left in FIG. 3 (hereinafter referred to a forward side). Each of the winding drums (53, 54) is driven to rotate by a drive motor (56) shown in FIG. 4, so as to wind or unwind the winding portion (42) of the air filter (40). This allows the filter body (41) of the air filter (40) to move forward or rearward. The guide roller (55) is arranged slightly forward of the first winding drum (53). The guide roller (55) supports the winding portion (42) of the air filter (40) from the bottom, and rotates as the air filter (40) moves.

A frame-shaped guide member (57) is attached to a bottom surface of the bell mouth (25) to surround the inlet of the bell mouth (see FIGS. 3 and 5). The guide member (57) guides the movement of the air filter (40) above the air filter (40).

The rotating brush (51) includes a rod-like shaft portion, and a bristle portion formed of a plurality of bristles attached to a circumferential surface of the shaft portion. The rotating brush (51) is arranged in a brush receiving opening (62) of a dust container (60) described later, and is positioned below a forward portion of the air filter (40). The rotating brush (51) is configured to remove the dust as it comes into contact with the moving filter body (41). The rotating brush (51) is arranged to sandwich the filter body (41) between the rotating brush (51) and the guide member (57). Therefore, the filter body (41) is reliably pushed onto the rotating brush (51), thereby improving the efficiency of dust removal.

Figure 8:
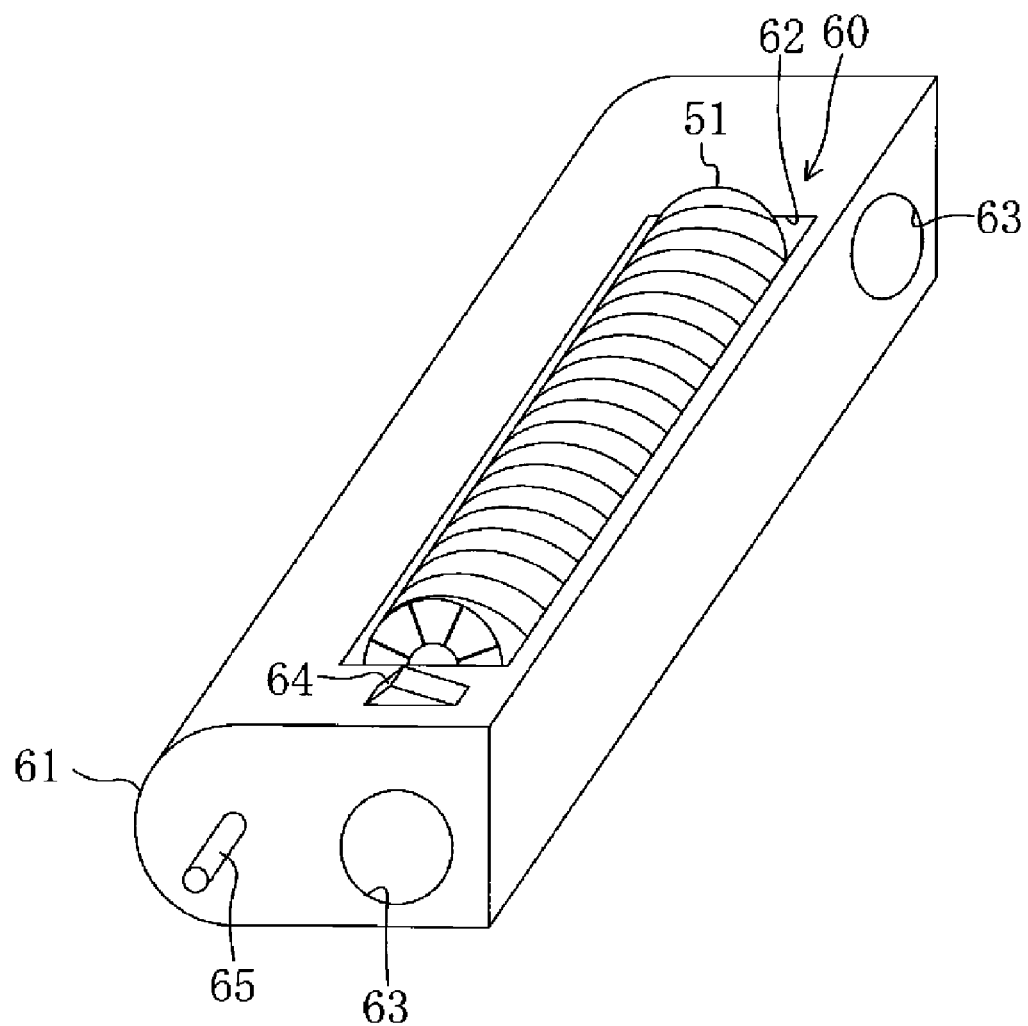
FIG. 8 is a perspective view illustrating a dust container as viewed from the back.

The dust container (60) is provided to contain the dust removed by the rotating brush (51). The dust container (60) is a slightly narrow, rectangular parallelepiped-shaped container as shown in FIG. 8. The dust container (60) is arranged below the forward portion of the air filter (40) to extend laterally across the air filter (40) (see FIGS. 3 and 4). As described above, the rotating brush (51) is arranged in the brush receiving opening (62) formed in an upper surface of the dust container (60).

A forward surface of the dust container (60) is convex-curved to form an arc portion (61). The air filter (40) turns along the arc portion (61), and is wound about the second winding drum (54). Duct connecting openings (63), to each of which a flexible tube (73, 75) of a dust transfer means (70) described later will be connected, are formed in one of the surfaces of the dust container (60) parallel to the lateral direction of the of the dust container (60) (hereinafter referred to as lateral surfaces), and in a rearward surface (hereinafter referred to as a rear surface), respectively.

Figure 9:
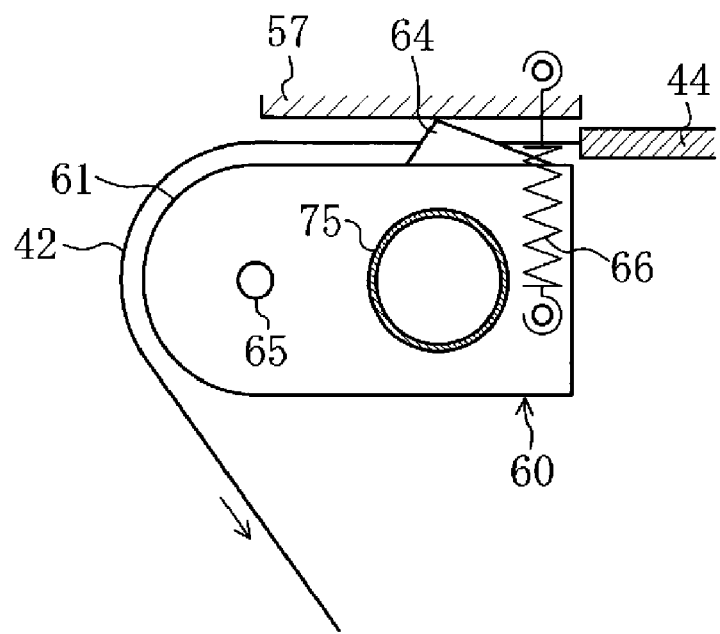
FIG. 9(a) shows a rotation mechanism of the dust container in a non-rotating state.
FIG. 9(b) shows the rotation mechanism in a rotating state.
Figure 9:
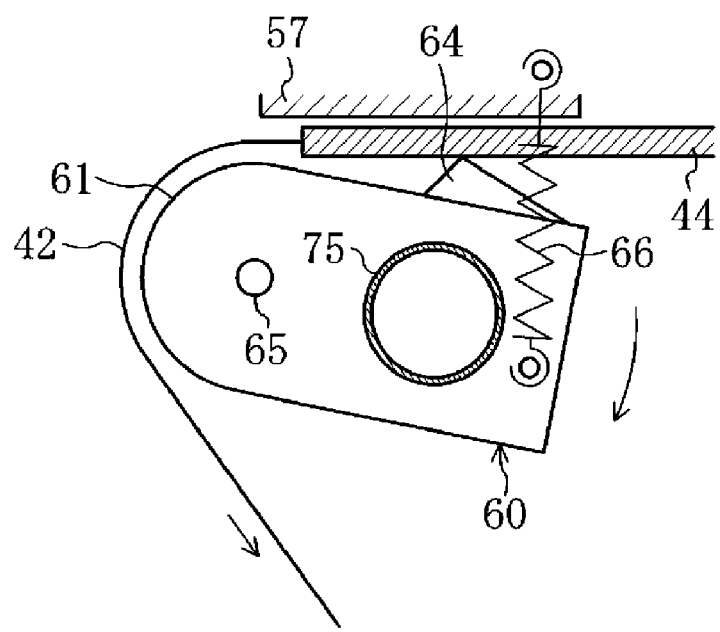

The dust container (60) is configured to rotate as the air filter (40) moves. Specifically, as shown in FIG. 9, the dust container (60) includes a rotation shaft (65) penetrating the dust container in the longitudinal direction, and a filter contact portion (64) projecting from an end of an upper surface of the dust container.

In normal operation, the dust container (60) rotates in such a manner that a rear portion thereof moves upward due to a bias force of a spring (66) (see FIG. 9(a)). In this state, sealed space (not shown) is formed between the rear portion of the dust container (60) and the guide member (57), thereby disconnecting the space inside the dust container (60) and the inlet side of the indoor fan (39).

In cleaning the filter, the dust container (60) rotates to move downward as the air filter (40) moves, and the container tab (44) of the air filter (40) comes into contact with the filter contact portion (64) (see FIG. 9(b)). In this state, the sealed space is opened, thereby allowing the filter body (41) to easily pass through a gap between the dust container (60) and the guide member (57). As described above, the rotation shaft (65), the filter contact portion (64), and the spring (66) constitute a rotation mechanism for rotating the dust container (60) by moving the air filter (40).

The dust transfer means (70) brings the air blowing from the indoor fan (39) into the dust container (60), and transfers (discharges) the dust in the dust container (60) outside the casing body (26) together with the air. The dust transfer means (70) includes a supply duct (71) and a discharge duct (74) as shown in FIGS. 3 to 5. Specifically, the dust transfer means (70) is configured to transfer the dust in the dust container (60) outside the casing using the air blowing from the indoor fan (39).

The supply duct (71) and the discharge duct (74) are arranged in space below the bell mouth (25). An outlet end of the supply duct (71) is connected to the duct connecting opening (63) formed in the rear surface of the dust container (60) through a flexible tube (75). The discharge duct (74) is an easily deformable flexible duct, and an inlet end thereof is connected to the duct connecting opening (63) formed in the lateral surface of the dust container (60) through a flexible tube (75).

Figure 10:
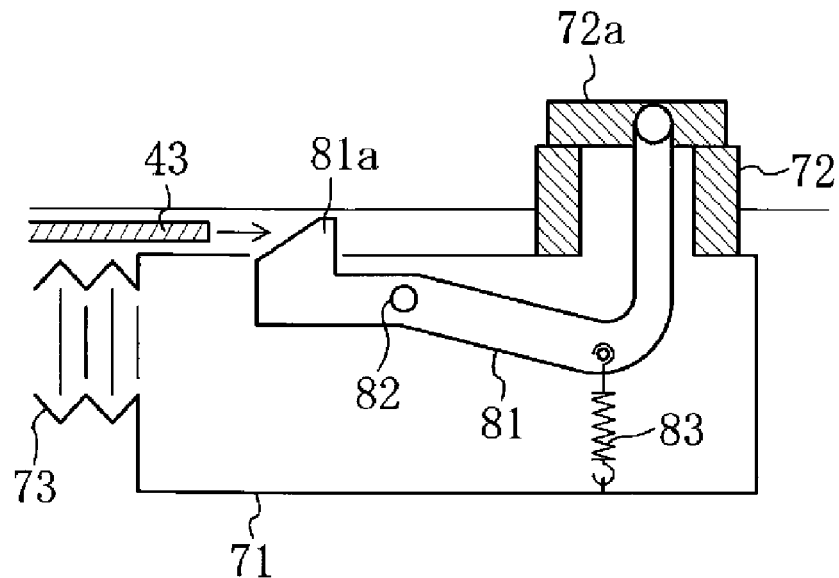
FIG. 10(a) shows a damper opening/closing mechanism of a supply duct in a closed state.
FIG. 10(b) shows the damper opening/closing mechanism in an open state.
Figure 10:
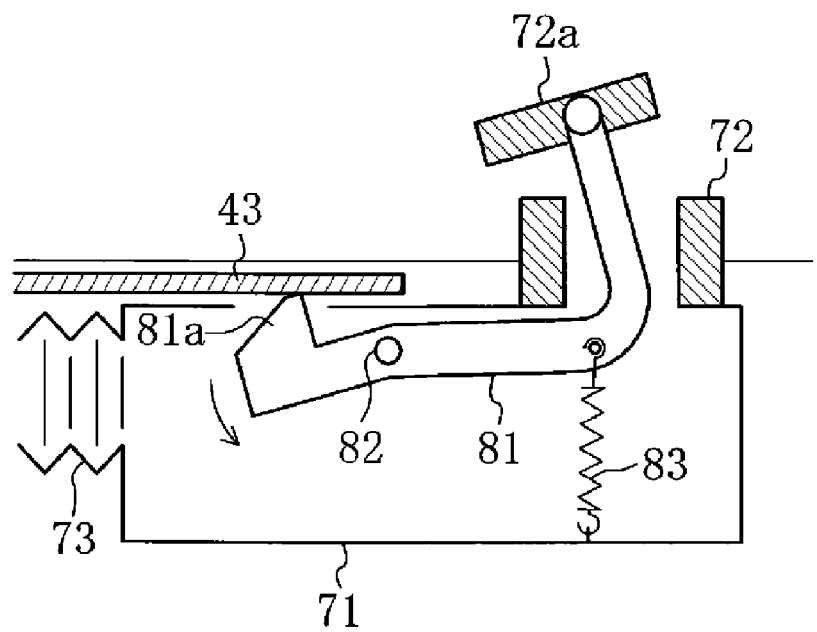

An inlet end of the supply duct (71) is configured to communicate with the space containing the indoor fan (39), and an open/close damper (72) is provided at an opening of the inlet end. Specifically, the inlet end of the supply duct (71) is positioned between the outlet side of the indoor fan (39) and the indoor heat exchanger (37). As shown in FIGS. 4 and 10, the damper (72) is opened or closed by the movement of the air filter (40). Specifically, an open/close lever (81) attached to an open/close lid (72a) of the damper (72) at one end is provided in the supply duct (71). The open/close lever (81) has a rotation shaft (82) in the middle thereof, and rotates about the rotation shaft (82). The other end of the open/close lever (81) functions as a filter contact portion (81a) entering and exiting from an opening formed in an upper surface of the supply duct (71).

Specifically, the inlet end of the supply duct (71) forms an inlet port into which the air blowing from the indoor fan (39) and before passing through the indoor heat exchanger (37) enters. The damper (72) forms an open/close means for opening/closing the inlet port of the dust transfer means (70).

With the damper (72) configured in this manner, one end (an end close to the damper (72)) of the open/close lever (81) is biased downward by the spring (83) in normal operation, thereby closing the open/close lid (72a) (see FIG. 10(a)). Therefore, the air blowing from the indoor fan (39) does not flow into the supply duct (71). In this state, the filter contact portion (81a) of the open/close lever (81) protrudes from the opening in the upper surface of the supply duct (71).

In cleaning the filter, the damper tab (43) of the air filter (40) comes into contact with the filter contact portion (81a) as the air filter (40) moves, thereby retracting the filter contact portion (81a) into the supply duct (71) (see FIG. 10(b)). In this state, the one end of the open/close lever (81) rotates upward to open the open/close lid (72a) of the damper (72). As a result, the air blowing from the indoor fan (39) flows into the supply duct (71) through the damper (72), and is supplied to the dust container (60).

As shown in FIG. 2, the discharge duct (74) extends to penetrate a side wall of the casing body (26), with an outlet end thereof reaching the dust collection box (90) attached to the side surface of the casing body (26). Specifically, the discharge duct (74) is configured to transfer (discharge) the dust contained in the dust container (60) to the dust collection box (90) outside the casing together with the air from the supply duct (71). That is, a transfer path (76) is provided in the discharge duct (74).

The dust collection box (90) is a substantially rectangular parallelepiped metallic member, and is arranged in such a manner that a portion thereof protrude outward from the decorative panel (27) as viewed in plan (as seen from the inside of the room). With the dust collection box (90) arranged to protrude outward from the decorative panel (27) when viewed in plan, the volume of the dust collection box can be increased without any limitation by the size of the decorative panel (27). This makes it possible to accumulate a larger amount of dust, thereby reducing the frequency of dust collection from the dust collection box (90), and improving the efficiency of the dust collection. Moreover, since the dust collection box (90) is attached to the side surface of the casing body (26), operation for suspending the dust collection box (90) in the space above the ceiling is no longer necessary, thereby reducing time and effort for installation. In this embodiment, the dust collection box (90) is sized in such a manner that a portion thereof protrudes outward from the decorative panel (27). However, the size of the dust collection box is not limited thereto. The dust collection box may be sized in such a manner that a portion thereof is positioned outside the opening (1a) in the ceiling board (1).

A duct connecting opening (90a) (an inlet port) to be connected to the other end of the discharge duct (74) is formed in a rear surface of the dust collection box (90) (a surface on the right in FIG. 2). In an upper surface of the dust collection box (90), a discharge port (90b) for discharging the air blowing from the indoor fan (39), and entering the dust collection box (90) through the supply duct (71) and the discharge duct (74) to the space above the ceiling is formed. In this embodiment, the duct connecting opening (90a) and the discharge port (90b) are formed in the rear surface and the upper surface of the dust collection box (90), respectively. However, their positions are not limited to those described above. For example, the duct connecting opening (90a) may be formed in a surface except for the rear surface, and the discharge port (90b) may be formed in a surface except for the upper surface.

An opening area of the discharge port (90b) is larger than that of the duct connecting opening (90a), and a mesh (92) is arranged on the discharge port (90b) to prevent entrance of insects and dirt in the dust collection box (90). An inspection window (93) made of a transparent member (e.g., a glass plate, an acrylic plate, etc.) is provided on a lower part of the side surface of the dust collection box (90), and an antimicrobial agent and a moth repellent are provided in the dust collection box (90). The entire part of the dust collection box (90), or at least one surface thereof may be formed of a transparent material, or a door may be formed instead of the inspection window (93) so as to check the amount of dust accumulated in the box by opening the door.

The dust collection box (90) has a collection duct opening (90c) to which the collection duct (77) comprised of an easily deformable flexible duct is formed in a surface opposite the surface provided with the duct connecting opening (90a). In this embodiment, the collection duct opening (90c) is formed in the surface opposite the surface provided with the duct connecting opening (90a). However, the position of the collection duct opening is not limited to that described above. The collection duct opening may be arranged in any surface as long as the dust can efficiently be sucked and collected from the inside of the dust collection box (90) using the cleaner (95).

<Dust Collection Structure>

The structure for collecting the dust accumulated in the dust collection box (90) will be described below.

Figure 12:
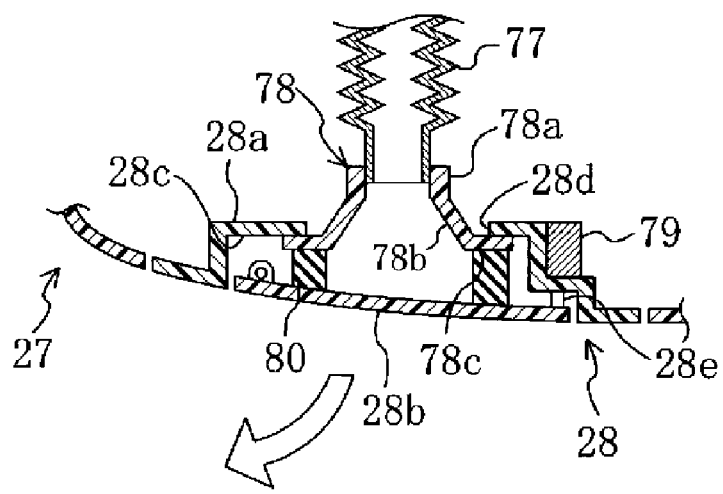
Figure 12:
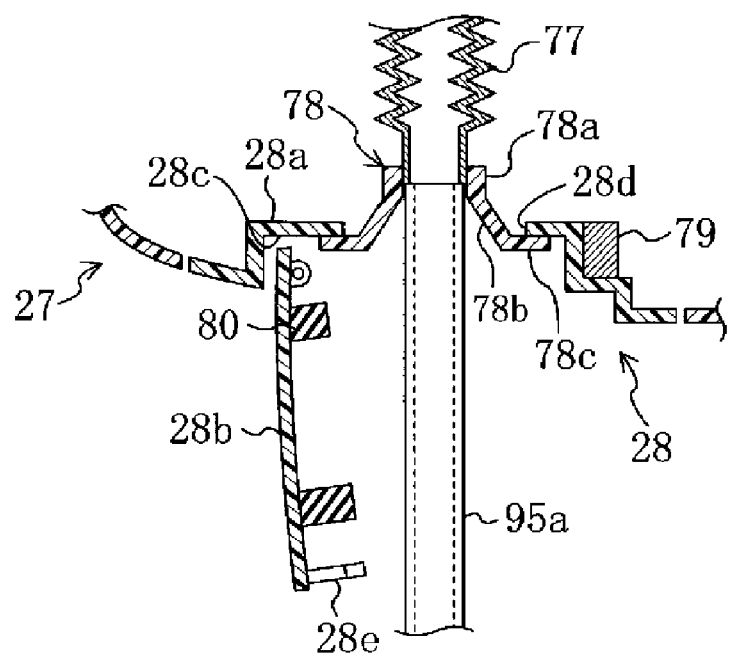

With the one end of the collection duct (77) connected to the collection duct opening (90c) of the dust collection box (90), the collection duct (77) extends to the corner of the decorative panel (27), and is bent downward with the other end positioned in the opening (27a) (see FIG. 2). The opening (27a) is provided with a nozzle connector (78) to which the other end of the collection duct (77) is connected as shown in FIG. 12. The nozzle connector (78) is a cone-shaped tube having a tapered portion whose inner diameter gradually increases downward (toward the inside of the room), and the other end of the collection duct (77) is connected and fixed to an upper portion (78a) thereof having the smallest diameter. A flange portion (78c) extending radially outward from a tapered lower portion (78b) of the nozzle connector (78) is connected and fixed to a base portion (28a) of a cover (28) arranged on the opening (27a) of the decorative panel (27) as described later.

The nozzle connector (78) is configured in such a manner that an end of the nozzle (95a) of the cleaner (95) is inserted into the upper portion (78a) or the lower portion (78b). Specifically, with the tapered lower portion (78b) having the inner diameter gradually increasing downward, the end of the nozzle (95a) of any size can reliably be brought into contact with the lower portion (78b). With the end of the nozzle (95a) of the cleaner (95) kept in contact with the nozzle connector (78), the cleaner (95) is operated, thereby sucking and collecting the dust from the inside of the dust collection box (90) communicating with the inside of the nozzle connector (78) through the collection duct (77). With the provision of the above-described nozzle connector (78), the end of the nozzle (95a) of the cleaner (95) can be brought into contact with the nozzle connector (78), irrespective of the size of the nozzle (95a). Thus, the dust can be sucked and collected through the nozzle connector (78).

The cover (28) is fixed to an inner edge of the opening (27a) of the decorative panel (27), and includes a base portion (28a) having a recess (28c) substantially in the center thereof when viewed in plan, and a cover portion (28b) for covering the recess of the base portion (28a) (a closure means, a corner cover). The base portion (28a) is attached to the decorative panel (27) with an opening of the recess (28c) facing the inside of the room. The base portion (28a) has a round hole (28d) substantially in the center of the recess (28c) when viewed in plan, and the flange portion (78c) of the nozzle connector (78) is connected and fixed to the hole (28d).

Thus, the nozzle connector (78) connected to the other end of the collection duct (77) is positioned above the surface of the decorative panel (27) facing the inside of the room. With the nozzle connector (78) positioned above the room-facing surface of the decorative panel (27), the nozzle connector (78) becomes almost invisible from the inside of the room, and does not greatly affect the appearance of the room-facing side of the indoor unit (13).

One end of the cover portion (28b) is rotatably supported by a sidewall of the recess (28c) of the base portion (28a).

Therefore, as shown in FIG. 12(b), the cover portion (28b) is opened by rotating the other end of the cover portion (28b) downward, thereby exposing the nozzle connector (78) to the inside of the room. When the other end of the cover portion (28b) is rotated upward, the cover portion (28b) is closed as shown in FIG. 12(a), thereby concealing the room-facing side of the nozzle connector (78).

In this way, the room-facing side of the nozzle connector (78) is concealed by the cover portion (28b). This does not allow the nozzle connector (78) to affect the appearance of the room-facing side of the indoor unit (13), and prevents leakage of the dust from the nozzle connector (78) connected to the dust collection box (90) while the dust collection is not performed. Further, since the nozzle connector (78) is arranged above the room-facing surface of the decorative panel (27), the room-facing side of the nozzle connector (78) can be covered with the cover portion (28b) arranged almost flush with the decorative panel (27). This improves the appearance of the room-facing side of the indoor unit (13) with the cover portion (28b) closed.

The base portion (28a) of the cover (28) fixed to the decorative panel (27) has a push lock (79) capable of engaging/disengaging with the other end of the cover portion (28b). Although not described in detail, the push lock (79) is a general lock member which is engaged when an engagement portion is inserted in a hole (not shown), and is disengaged when the engagement portion is pushed again. An engagement portion (28e) is provided on the other end of the cover portion (28b) to correspond to the push lock (79), and to engage with the push lock (79).

With the other end of the cover portion (28b) configured to be engageable with the push lock (79) as described above, the cover portion (28b) can easily be opened by releasing the engagement with the push lock (79) by pushing the cover portion (28b) upward using the nozzle (95a) of the cleaner (95), etc. Thus, the nozzle connector (78) covered with the cover portion (28b) can easily be exposed to the inside of the room.

On a rear surface (a top surface) of the cover portion (28b), a cylindrical sealing member (80) for sealing the inside of the nozzle connector (78) is sandwiched between the nozzle connector (78) and the cover portion (28b) in the closed state. The sealing member (80) is arranged to abut the flange portion (78c) extending radially outward from the lower portion (78b) of the nozzle connector (78) when the cover portion (28b) is closed. The provision of the sealing member (80) allows for hermetic sealing of the space inside the nozzle connector (78) from the inside of the room when the cover portion (28b) is closed, thereby reliably preventing the leakage of the dust to the inside the room through the nozzle connector (78).

<Filter Cleaning Operation>

The air conditioner (10) of the present embodiment is capable of switchably performing normal operation of cooling/heating the room, and filter cleaning operation of cleaning the air filter (40).

First, in the normal operation, the compressor (30), the outdoor fan (12), and the indoor fan (39) are driven. Indoor air is sucked into the indoor unit (13) through the inlet (22), passes through the bell mouth (25), and blows from the indoor fan (39). The air blowing from the indoor fan is cooled or heated because of heat exchange with a refrigerant in the indoor heat exchanger (37), and is supplied to the room through the outlets (23).

As shown in FIG. 11(a), in the normal operation described above, the air filter (40) is arranged at a predetermined position to cover the bell mouth (25). Therefore, the indoor air sucked through the inlet (22) passes through the air filter (40) before entering the bell mouth (25). As the air passes through the air filter, the dust is trapped thereon. Since the damper (72) of the supply duct (71) is closed, the air blowing from the indoor fan (39) does not enter the supply duct (71). Therefore, the air blowing from the indoor fan (39) is all supplied to the indoor heat exchanger (37), thereby preventing decrease in operation efficiency of the fan (39).

The filter cleaning operation will be described below with reference to FIGS. 11(b) to 11(d). In the filter cleaning operation, dust removal operation of removing the dust trapped on the air filter (40), and dust transfer operation of transferring the removed dust outside the casing body (26) are performed.

First, in the filter cleaning operation, the indoor fan (39) is stopped, and two drive motors (56) of the dust removing means (50) are driven to perform the dust removal operation. In this state, as shown in FIG. 11(b), the air filter (40) moves as it is wound about the second winding drum (54). Then, the container tab (44) of the air filter (40) comes into contact with the filter contact portion (64) of the dust container (60), thereby rotating the dust container (60) downward. As a result, a gap is formed between the rear portion of the dust container (60) and the guide member (57), thereby allowing the filter body (41) to travel through the gap between the rotating brush (51) and the guide member (57) without particularly interfering with the dust container (60). Since the supply duct (71) and the discharge duct (74) are connected to the dust container (60) through the flexible tubes (73, 75), they are not disconnected by the rotation of the dust container (60).

When the filter body (41) passes through the gap between the dust container (60) and the guide member (57), the dust is removed by the rotating brush (51). The removed dust is contained in the dust container (60). In this state, the damper (72) remains closed. After every part of the filter body (41) passes over the rotating brush (51), the drive motors (56) are automatically driven to rotate in a reverse direction, thereby rewinding the air filter (40) (see FIG. 11(c)). Thus, the air filter (40) is wound about the first winding drum (53). Since the container tab (44) of the air filter (40) remains in contact with the filter contact portion (64), the dust container (60) remains rotated downward until the direction of rotation of the drive motors (56) changes.

When the air filter (40) is rewound and returns to a predetermined position, the container tab (44) of the air filter (40) separates from the filter contact portion (64), and the dust container (60) rotates upward to return to the original state. That is, the gap between the rear portion of the dust container (60) and the guide member (57) is sealed. When the air filter (40) returns to the predetermined position, the indoor fan (39) is driven again, and the dust transfer operation is performed.

Figure 11:
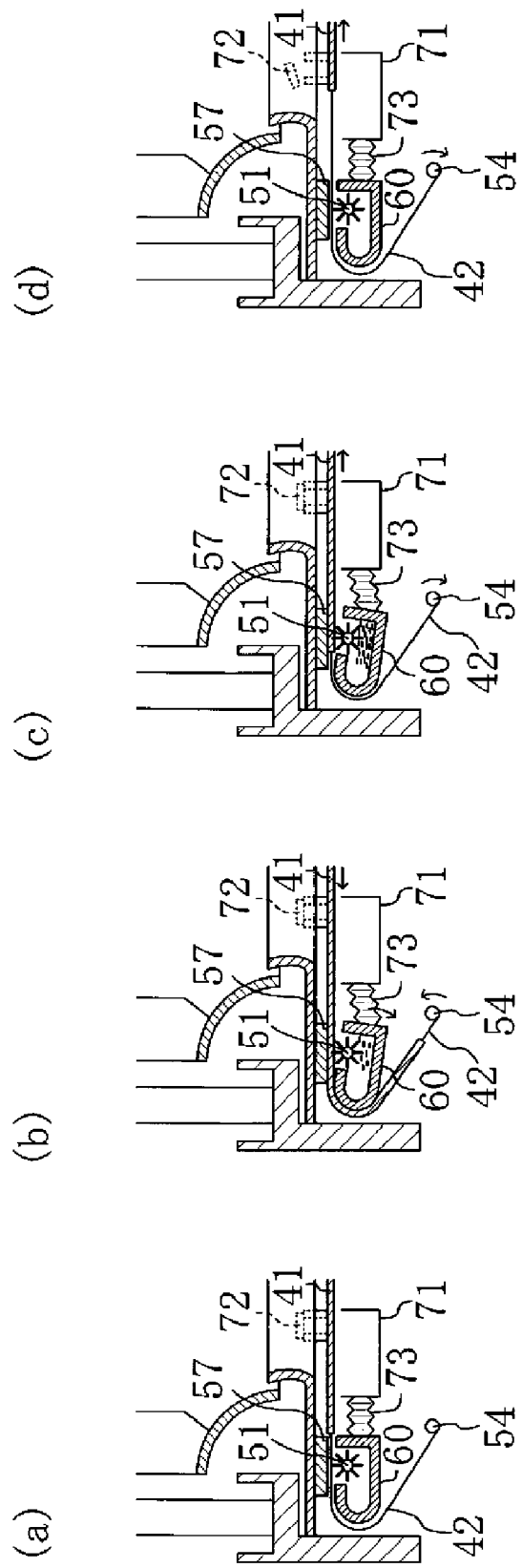

When the indoor fan (39) is driven again, the air filter (40) is further wound about the first winding drum (53). Specifically, in FIG. 11, the air filter (40) moves to the right from the predetermined position. As the air filter (40) moves, the damper tab (43) of the air filter (40) comes into contact with the filter contact portion (81a) of the supply duct (71). Then, as shown in FIG. 11(d), the open/close lever (81) of the supply duct (71) rotates to open the open/close lid (72a) of the damper (72). In this state, the drive motor (56) is stopped.

Once the damper (72) is opened, a portion of the air blowing from the indoor fan (39) enters the supply duct (71), and is supplied to the dust container (60). The air entered the dust container (60) flows into the discharge duct (73) together with the dust, and is discharged into the dust collection box (90) outside the casing body (26). In this case, only the dust accumulates in the dust collection box (90), and the air blowing from the indoor fan (38) is discharged to the space above the ceiling through the discharge port (90*b*) formed in the dust collection box (90). Since the gap between the dust container (60) and the guide member (57) is sealed, the air supplied to the dust container (60) will not flow out of the brush receiving opening (62). After the discharge operation is performed for a predetermined period of time, the drive motors (56) are driven again, thereby returning the air filter (40) to the predetermined position. This separates the damper tab (43) of the air filter (40) from the filter contact portion (81*a*) of the open/close lever (81), thereby closing the damper (72). Then, the filter cleaning operation is finished.

In the filter cleaning operation, when to rotate the drive motors (56) in the reverse direction, or when to drive or stop them may be determined in response to the number of rotations of the drive motors (56). Further, a limit switch may be arranged at a predetermined position, and the air filter (40) may be provided with a striker corresponding to the limit switch so as to determine when to drive or stop the drive motors (56).

The dust transfer operation is not necessarily performed in every filter cleaning operation. For example, a dust amount detection means may be provided, and the dust transfer operation may be performed only when the detecting means detects that the amount of dust exceeds a predetermined amount.

The dust accumulated in the dust collection box (90) is sucked and collected through the nozzle (95*a*) of the cleaner (95) inserted in the nozzle connector (78) provided at the corner of the decorative panel (27). Specifically, in collecting the dust in the dust collection box (90), the cover portion (28*b*) covering the opening (27*a*) at the corner of the decorative panel (27) is pushed upward by the nozzle (95*a*) of the cleaner (95), etc., to release the push lock (79), and the cover portion (28*b*) is rotated downward to open. Then, the end of the nozzle (95*a*) of the cleaner (95) is inserted in the nozzle connector (78) in the opening (27*a*), and the cleaner (95) is operated with the nozzle connector (78) and the nozzle (95*a*) kept in contact with each other. Thus, the dust accumulated in the dust collection box (90) is sucked and collected by the cleaner (95) through the collection duct (77) connected to the collection duct opening (90*c*) of the dust collection box (90), and the nozzle connector (78).

Advantages of First Embodiment

In this embodiment described above, with the one end of the collection duct (77) connected to the collection duct opening (90*c*) of the dust collection box (90) in which the dust removed from the air filter (40) accumulates, the other end of the collection duct (77) extends to the corner of the decorative panel (27), and is arranged in the opening (28*a*) at the corner to be connected to the nozzle connector (78) in which the nozzle (95*a*) of the cleaner (95) is inserted. Therefore, the dust accumulated in the dust collection box (90) can be sucked and collected by the cleaner (95).

The nozzle connector (78) is constituted of a cone-shaped tube, and the lower portion (78*b*) is tapered in such a manner that the inner diameter thereof gradually increasing downward (toward the inside of the room). Therefore, even if the size of the nozzle (95*a*) of the cleaner (95) varies, the end of the nozzle (95*a*) can reliably be brought into contact with the lower portion (78*b*), thereby sucking the dust. With the above-described structure, the dust can be sucked and collected by the cleaner (95) irrespective of the size of the nozzle (95*a*) of the cleaner (95).

With the nozzle connector (78) arranged above the room-facing surface of the decorative panel (27), the nozzle connector (78) becomes almost invisible from the inside of the room, thereby maintaining good appearance of the room-facing side of the indoor unit (13). Further, the room-facing side of the nozzle connector (78) covered with the cover portion (28*b*) almost flush with the decorative panel (27) improves the appearance of the room-facing side of the indoor unit (13), and prevents the leakage of the dust in the dust collection box (90) to the inside of the room through the nozzle connector (78).

Since the one end of the cover portion (28*b*) is configured to be rotatable, and the other end is engaged with the push lock (79) provided on the base portion (28*a*) of the cover (28), the engagement with the push lock (79) can easily be released by pushing the cover portion (28*b*) upward. Therefore, for example, the cover portion (28*b*) can easily be opened by the nozzle (95*a*) of the cleaner (95), etc., thereby improving the workability of the dust collection.

Further, the cylindrical sealing member (80) for sealing the inside of the nozzle connector (78) from the inside of the room is arranged on the rear surface (the surface facing the space above the ceiling) of the cover portion (28*b*) to be sandwiched between the cover portion (28*b*) in the closed state and the nozzle connector (78). This reliably prevents the leakage of the dust to the inside of the room through the nozzle connector (78).

First Modified Example of First Embodiment

Figure 13:
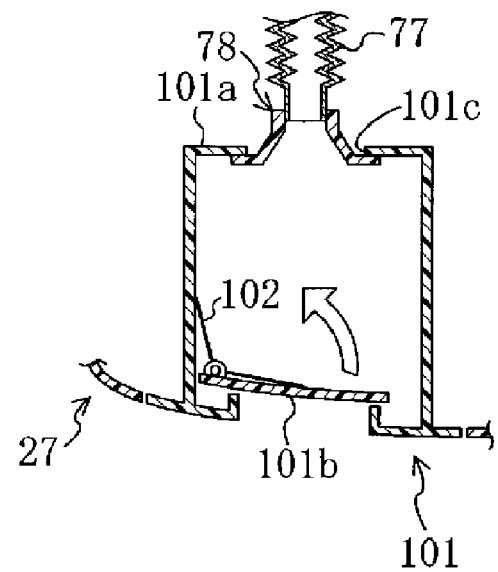
FIG. 13 is a view corresponding to FIG. 12 illustrating an air conditioner of a first modified example of the first embodiment.
Figure 13:
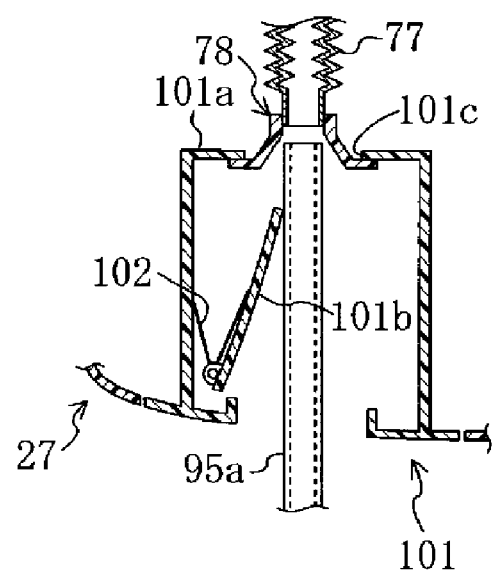

A first modified example is different from the first embodiment in the structure of a cover (101) arranged in the opening (27*a*) at the corner of the decorative panel (27) as shown in FIG. 13.

Specifically, the cover (101) includes a base portion (101*a*) in the shape of a cylinder with a closed bottom fixed to an inner edge of the opening (27*a*), and a cover portion (101*b*) (a closure means) for covering an opening of the base portion (101*a*) from the inside of the base portion (101*a*). The base portion (101*a*) is arranged in the opening (27*a*) with an opening thereof facing the inside of the room, and a bottom surface thereof facing upward is provided with a hole (101*c*) to which the nozzle connector (78) connected to the other end of the collection duct (77) is attached. The edge of the opening of the base portion (101*a*) is bent inward, and the bent portion abuts the cover portion (101*b*). The hole (101*c*) to which the nozzle connector (78) is attached is formed to correspond to the opening of the base portion (101*a*) in such a manner that the nozzle (95*a*) of the cleaner (95) inserted in the opening is easily inserted in the nozzle connector (78) (see FIG. 13(*b*)).

The cover portion (101*b*) is rotatably arranged in the base portion (101*a*) to be able to open and close the opening of the base portion (101*a*). Specifically, one end of the cover portion (101*b*) is rotatably supported by an inner surface of the base portion (101*a*). A spring (102) (a biasing means) is provided between the one end of the cover portion (101*b*) and the inner surface of the base portion (101*a*), and the spring (102) biases the cover portion (101*b*) to close the opening of the base portion (101*a*). Space inside the base portion (101*a*) is sized not to interfere the opening/closing of the cover portion (101*b*).

Thus, in collecting the dust, the cover portion (101*b*) is pushed upward by the end of the nozzle (95*a*) of the cleaner (95), etc., thereby opening the cover portion (101*b*), and inserting the nozzle (95*a*) into the nozzle connector (78) as shown in FIG. 13(*b*). Therefore, a user can easily open the cover portion (101*b*) to perform the dust collection without climbing up to the ceiling to open the cover portion (101*b*).

Since the cover portion (101b) is biased by the spring (102) to close the opening, it is biased to close the opening of the base portion (101a) when the nozzle (95a) of the cleaner (95) is separated from the cover portion (101b). This can reliably prevent the leakage of the dust to the inside of the room.

Second Modified Example of First Embodiment

Figure 14:
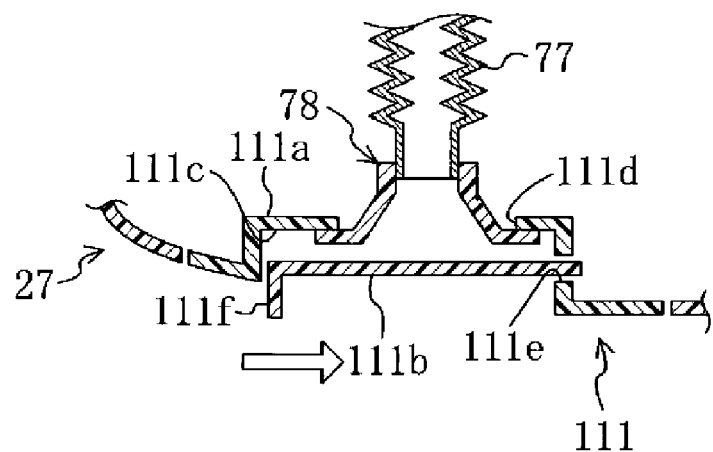
FIG. 14 is a view corresponding to FIG. 12 illustrating an air conditioner of a second modified example of the first embodiment.
Figure 14:
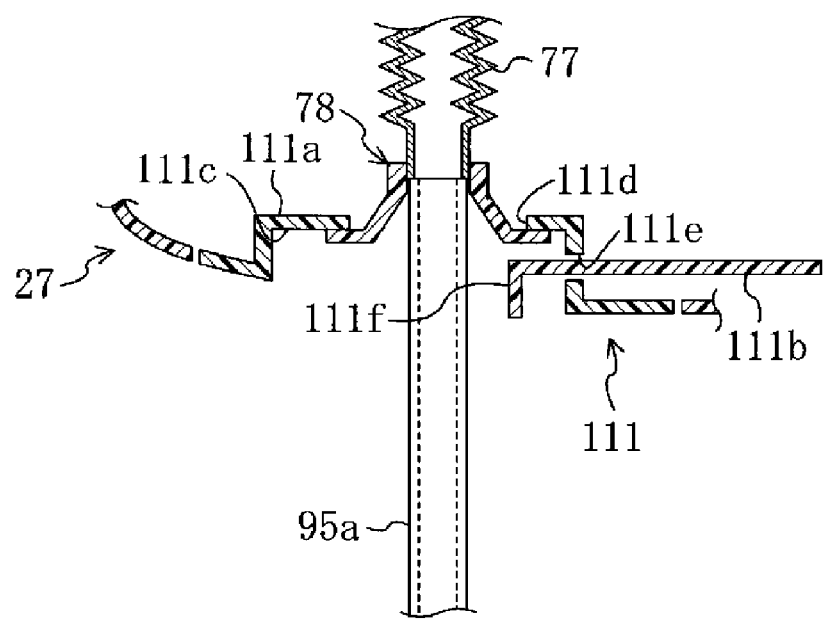

A second modified example is different from the first embodiment in that a cover portion (111b) (a closure means) is configured to be slidable as shown in FIG. 14.

Specifically, as shown in FIG. 14, a cover (111) is fixed to an inner edge of the opening (27a) at the corner of the decorative panel (27), and includes a base portion (111a) having a recess (111c) formed substantially in the center thereof when viewed in plan, and a cover portion (111b) for covering a room-facing side of the recess (111c) of the base portion (111a). Like the first embodiment, the base portion (111a) is attached to the decorative panel (27) with an opening of the recess (111c) facing the inside of the room. The base portion (111a) has a hole (111d) formed in a bottom surface thereof facing upward to which the nozzle connector (78) is attached. The base portion (111a) further includes a slit (111e) formed in a side surface of the recess (111c) in which the cover portion (111b) is inserted.

The cover portion (111b) is a substantially flat member. One end thereof is bent toward the inside of the room to form a grip (111f), and the other end is inserted in the slit (111e) formed in the side surface of the recess (111c) of the base portion (111b). Thus, the cover portion (111b) is allowed to slide by pushing the grip (111f) of the cover portion (111b) so as to put the cover portion (111b) in and out of the slit (111e). In this way, the cover portion (111b) can be opened/closed, and the nozzle connector (78) can be exposed to the inside of the room only in collecting the dust.

The grip (111f) of the cover portion (111b) is preferably in the shape that allows for opening/closing the cover portion (111b) by hanging the end of the nozzle (95a) of the cleaner (95) on the grip (111f).

Third Modified Example of First Embodiment

Figure 15:
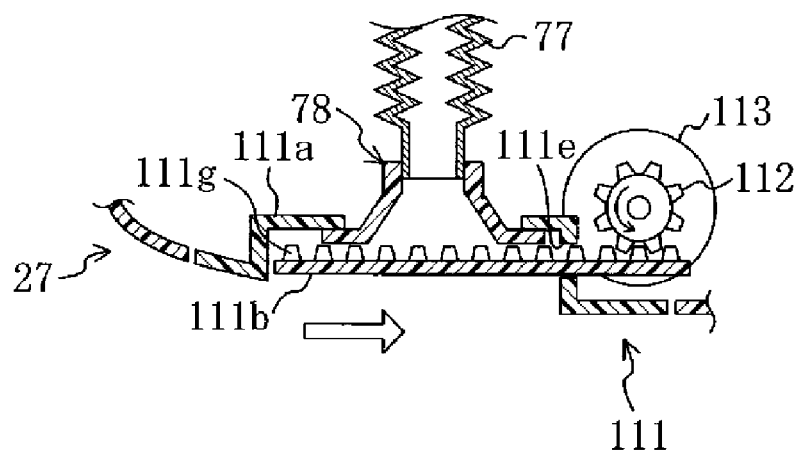
FIG. 15 is a view corresponding to FIG. 12 illustrating an air conditioner of a third modified example of the first embodiment.
Figure 15:
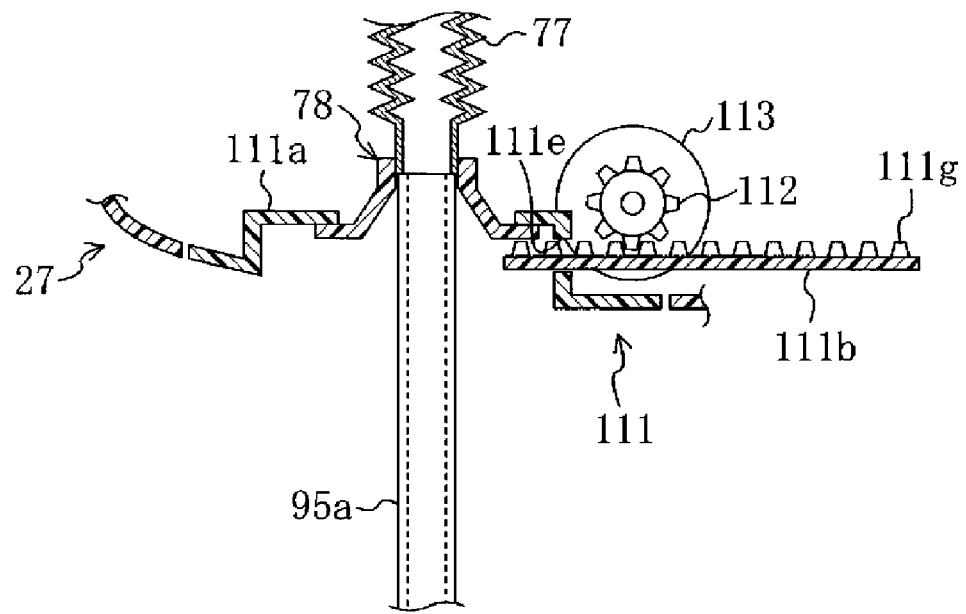

A third modified example is different from the second modified example in that a motor (113) (a drive means) allows the cover portion (111b) of the second modified example to slide as shown in FIG. 15.

Specifically, as shown in FIG. 15, a rack (111g) having a plurality of teeth is provided on an upper surface (a surface facing the space above the ceiling) of the cover portion (111b). On the surface of the decorative panel (27) facing the space above the ceiling, a gear (112) engaging with the rack (111g), and a motor (113) for driving the gear (112) to rotate are provided. Thus, the rotation of the motor (113) is converted to reciprocating movement of the rack (111g) through the gear (112), thereby allowing the cover portion (111b) to slide. Specifically, when the motor (113) is rotated counterclockwise in FIG. 15, the rack (111g) moves to the right relative to the gear (112) to open the cover portion (111b). When the motor (113) is rotated clockwise, the rack (111g) moves to the left relative to the gear (112) to close the cover portion (111b). ON/OFF switching, and change of the direction of the rotation of the motor (113) can be performed by switching operation.

In this way, the cover portion (111b) can be opened by the driving force of the motor (113), and the user does not have to open the cover portion (111b).

As described above, since the rack (111g) is provided on the upper surface of the cover portion (111b), the slit (111e) of the base portion (111a) is formed with a height that allows the rack (111g) to pass through it. Further, the third modified example does not require the grip (111f) provided on the one end of the cover portion (111b) in the second modified example. Therefore, the cover portion (111b) is shaped flat.

In this modified example where the cover portion (111b) is slidable as described above, the cover portion (111b) is driven by the motor (113) and the gear (112). However, the driving is not limited thereto. For example, the cover portion of the first embodiment or the first modified example which is opened/closed as it rotates may be driven by the motor.

Fourth Modified Example of First Embodiment

Figure 16:
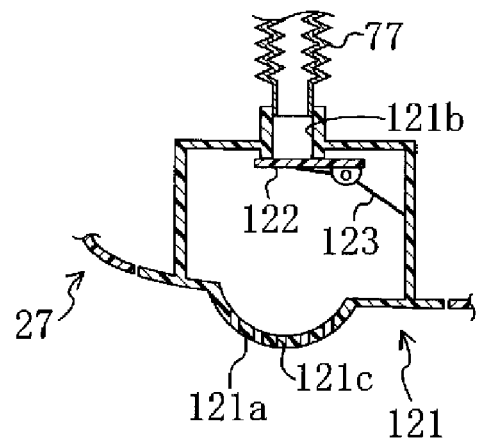
FIG. 16 is a view corresponding to FIG. 12 illustrating an air conditioner of a fourth modified example of the first embodiment.
Figure 16:
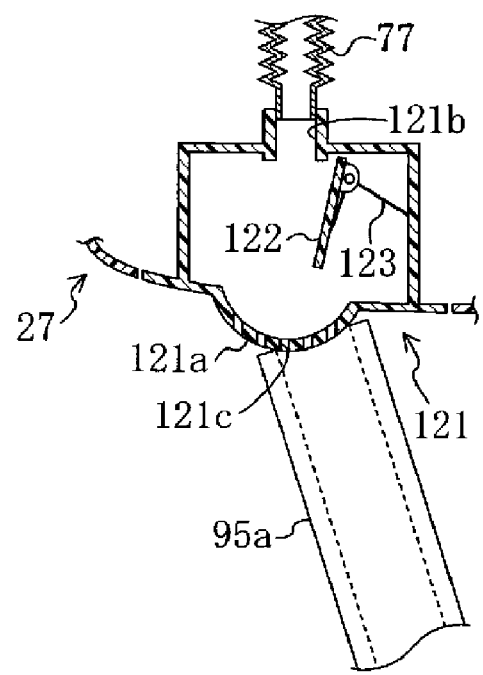

A fourth modified example is different from the first embodiment in that a nozzle abutment (121a) (a nozzle connector) to which the nozzle (95a) of the cleaner (95) abuts is formed on the room-facing side, and a cover (122) (a closure means) for preventing the leakage of the dust is provided upstream of the nozzle abutment (121a) as shown in FIG. 16.

Specifically, as shown in FIG. 16, a cover (121) arranged at the opening (27a) of the decorative panel (27) is in the shape of a hollow box, and includes a dome-shaped nozzle abutment (121a) protruding toward the inside of the room from a surface of the cover facing the inside of the room, and a hole (121b) formed in a surface of the cover opposite the nozzle abutment (121a) to which the collection duct (77) is connected.

The nozzle abutment (121a) is dome-shaped so as to reliably bring the end of the nozzle (95a) of various sizes and cross-sectional shapes into contact with any position of the nozzle abutment. A plurality of through holes (121c, 121c, ...) are provided in the nozzle abutment (121a) to allow the dust to pass through. The through holes (121c) are preferably provided around a protruding end of the dome-shaped nozzle abutment (121a).

In the cover (121), a dust cover (122) (a closure means) covering the hole (121b) from the inside of the cover is provided. The dust cover (122) is arranged rotatably in the cover (121) so as to switchably open/close the hole (121b). The dust cover (122) is connected to an inner wall surface of the cover (121) through a spring (123), and is biased by the spring (123) to close the hole (121b).

When the cleaner (95) is operated with the end of the nozzle (95a) of the cleaner (95) abutting the nozzle abutment (121a), the dust cover (122) provided in this manner is opened by suction power of the cleaner against the biasing power of the spring (123), thereby allowing for suction and collection of the dust from the dust collection box (90) through the collection duct (77) connected to the hole (121b) of the cover (121) (see FIG. 16(b)). In the absence of the suction power of the cleaner (95), the dust cover (122) is biased by the spring (123) to close the hole (121b) (see FIG. 16(a)). This can prevent the leakage of the dust to the inside of the room through the hole (121b).

With the above-described structure, the nozzle (95a) and the nozzle abutment (121a) can reliably be brought into contact with each other irrespective of the cross-sectional shape and size of the nozzle (95a) of the cleaner (95), and of the direction of approach of the nozzle (95a) to the nozzle abutment (121a). This allows for suction and collection of the dust by the suction power of the cleaner (95) with reliability. Further, when the dust collection is not performed, the dust cover (122) can prevent the leakage of the dust to the inside of the room. In collecting the dust, the opening of the dust cover (123) and the suction of the dust can sequentially be performed by the suction power of the cleaner (95). Therefore, unlike the first embodiment and the above-described modified examples, operation of opening the cover is no longer necessary. This can improve the workability of the dust collection.

Second Embodiment

Figure 17:
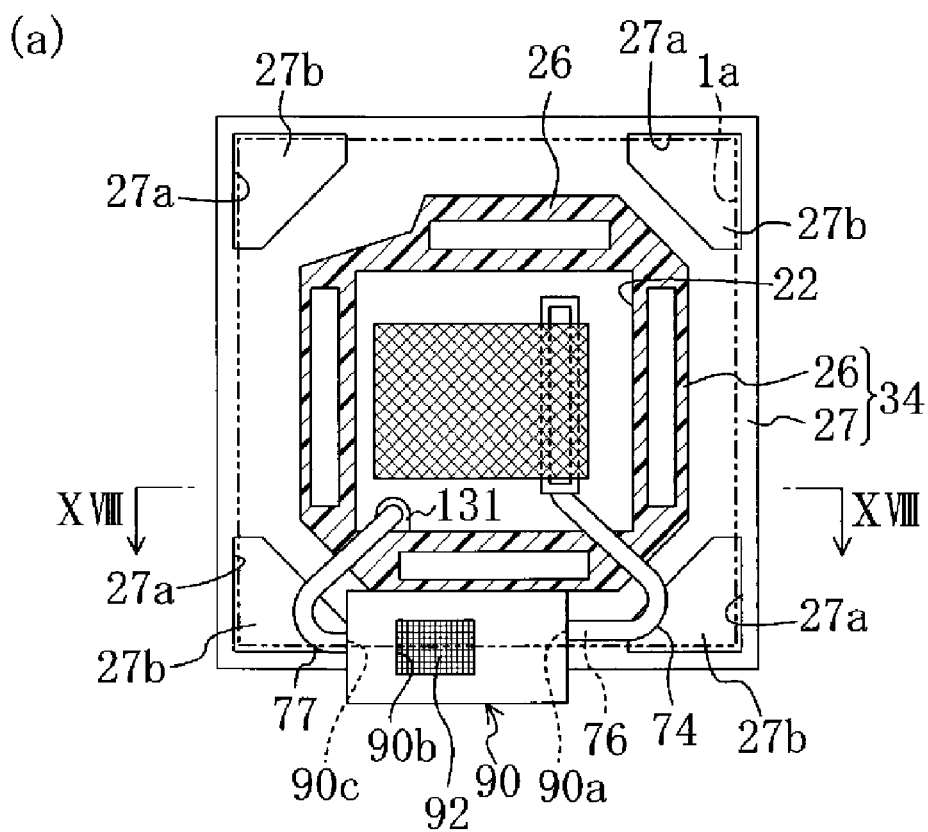
Figure 17:
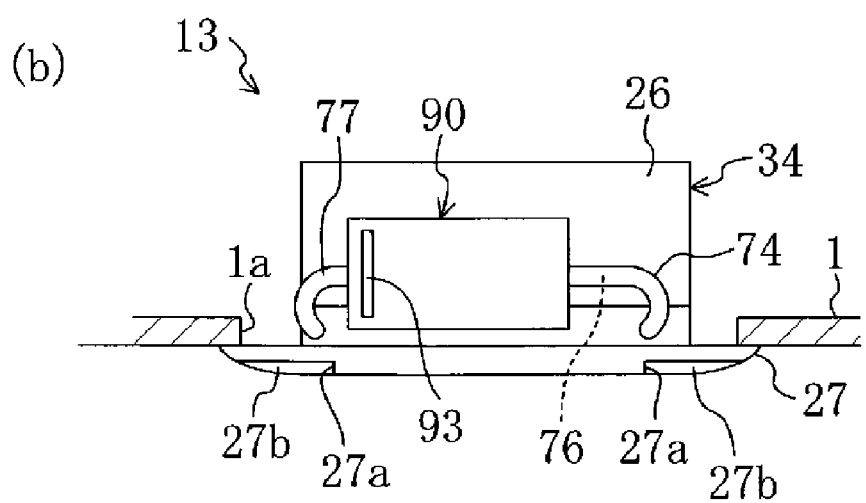
Figure 18:
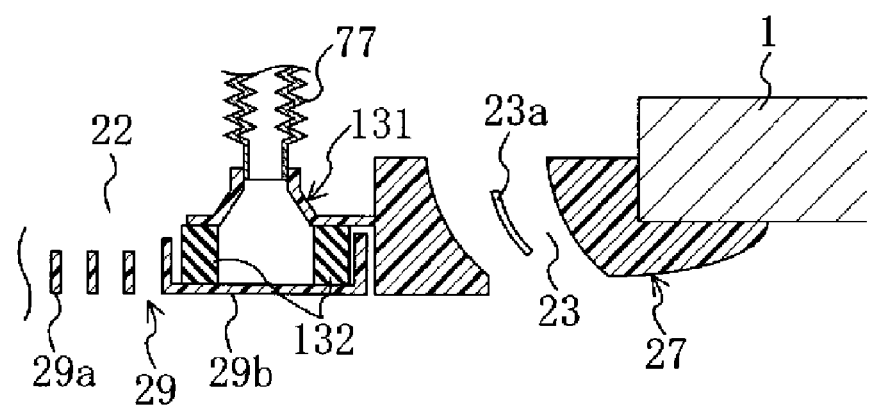
Figure 18:
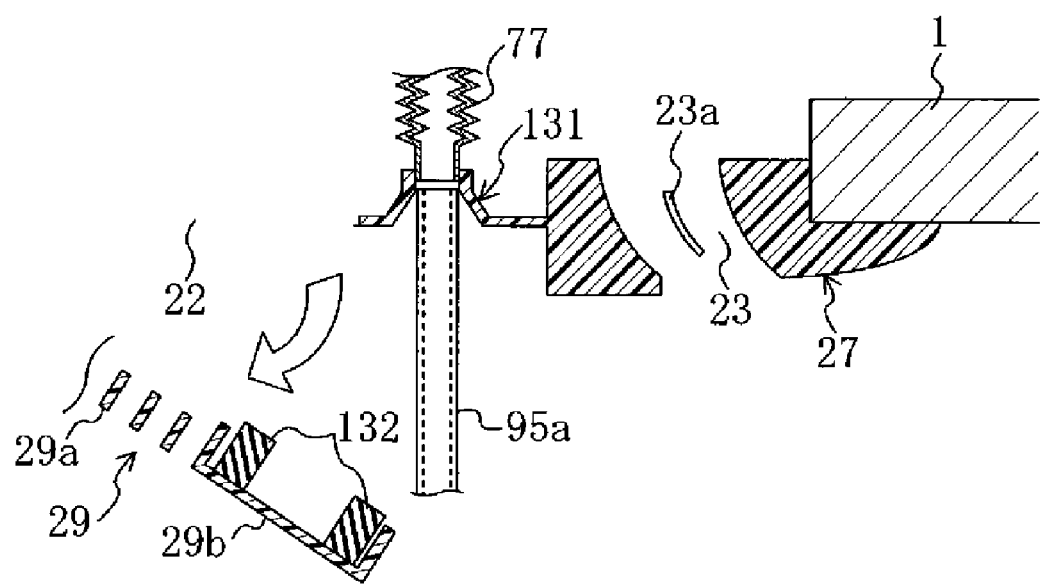

A second embodiment of the present disclosure will be described with reference to FIGS. 17 and 18. As shown in FIGS. 17 and 18, this embodiment is different from the first embodiment only in that the other end of the collection duct (77) is positioned on the suction side of the indoor fan (39), and the room-facing side of the nozzle connector (131) connected to the other end of the collection duct (77) is covered with a suction grille (29). Therefore, like components are indicated by like characters, and the difference will be described below.

Specifically, as shown in FIG. 17, the collection duct (77) is arranged in such a manner that one end thereof is connected to the collection duct opening (90c) of the dust collection box (90), and the other end thereof is positioned in the inlet (22) in the casing body (26).

A nozzle connector (31) of the same structure as the nozzle connector (78) of the first embodiment is connected to the other end of the collection duct (77). In this embodiment, a flange portion of the nozzle connector (131) extending radially outward from a lower portion of the nozzle connector is integrated with an inner circumferential surface of the inlet (22) of the decorative panel (27). Specifically, the nozzle connector (131) in which the end of the nozzle (95a) of the cleaner (95) is inserted is provided in the inlet (22), and is covered with a suction grille (29) covering the room-facing side of the inlet (22).

The suction grille (29) has a grille portion (29a) only in the center thereof, and an outer periphery portion surrounding the grill portion (29a) serves as a cover portion (29b). The cover portion (29b) covers the room-facing side of the nozzle connector (131). The cover portion (29b) is substantially U-shaped when viewed in section, and a cylindrical sealing member (132) is arranged inside the cover portion to seal the space inside the nozzle connector (131).

Advantages of Second Embodiment

In this embodiment, with the one end of the collection duct (77) connected to the dust collection box (90), the other end of the collection duct (77) is arranged in the inlet (22). Therefore, the room-facing side of the nozzle connector (131) connected to the other end of the collection duct (77) can be covered with the cover portion (29b) of the suction grille (29) covering the inlet (22). This can visually simplify the room-facing side of the indoor unit (13). Further, the cover (28, 101, 111, 121) employed in the first embodiment is no longer required, thereby reducing the parts count and cost.

The room-facing side of the nozzle connector (131) is covered with the cover portion (29b) of the suction grille (29). This can prevent the leakage of the dust to the inside of the room through the nozzle connector (131). Further, since the cover portion (29b) is provided with the sealing member (132) for sealing the space inside the nozzle connector (131), the leakage of the dust to the inside of the room can be prevented with more reliability.

Third Embodiment

Figure 19:
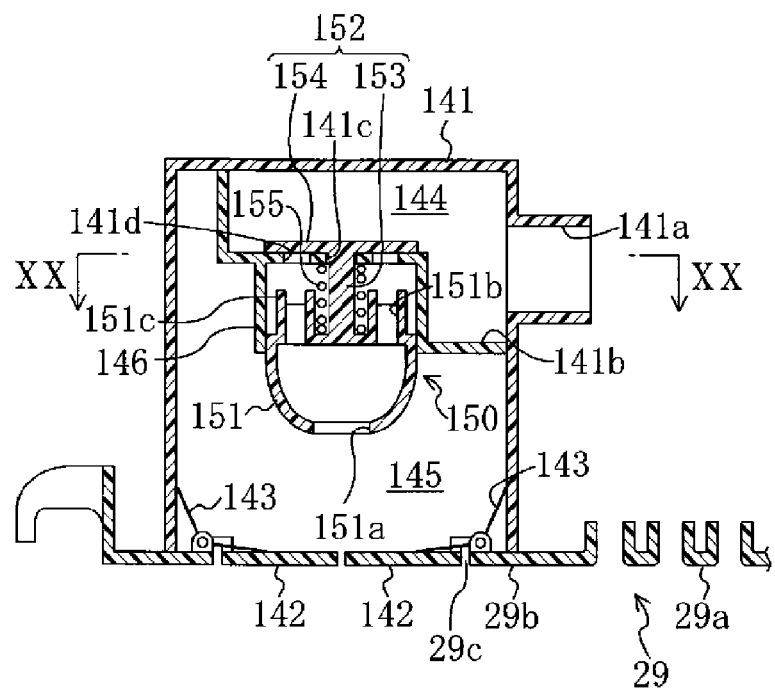
Figure 19:
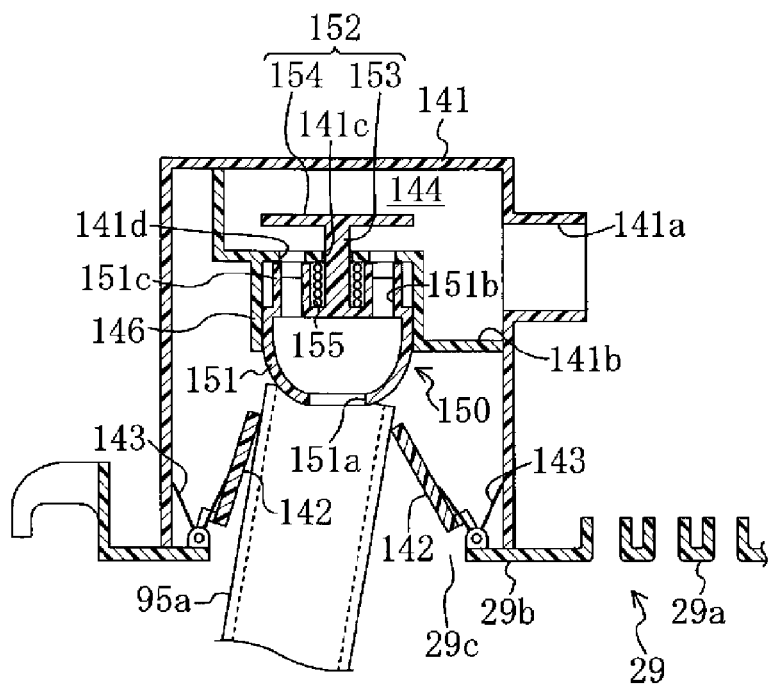

A third embodiment of the present disclosure will be described with reference to FIG. 19. This embodiment is different from the second embodiment only in that a nozzle connector (151), etc., is formed on the suction grille (29), and in the structure of the nozzle connector (151) as shown in FIG. 19. Therefore, like components are indicated by like characters, and the difference will be described below.

Specifically, like the second embodiment, the collection duct (77) is arranged in such a manner that one end thereof is connected to the collection duct opening (90c) of the dust collection box (90), and the other end thereof is positioned in the inlet (22) in the casing body (26) in this embodiment. The nozzle connector (151) connected to the other end of the collection duct (77) is provided above the suction grille (29) covering the room-facing side of the inlet (22) as shown in FIG. 19.

More specifically, a box-shaped cover (141) is provided on a rear surface of the cover portion (29b) (on a surface facing the space above the ceiling) outside the grille portion (29a) of the suction grille (29). A duct connecting opening (141a) is formed in an upper portion of a side surface of the cover portion (141), to which the other end of the collection duct (77) (not shown) is connected.

An opening (29c) is formed in the cover portion (29b) of the suction grille (29) to correspond to the cover (141). Two flat lid members (142, 142) (a closure means) are arranged in the opening (29c), and are connected to the inner surface of the cover portion (29b) so as to rotate upward about portions of an inner edge of the opening (29c) facing each other. Specifically, the lid members (142) are provided in the opening (29c) as a double door which opens upward. A spring (143) is provided between an end of each of the lid members (142) close to the rotation center and the inner surface of the cover (141), thereby biasing each of the lid members (142) to close the opening (29c). Thus, as shown in FIG. 19(a), with the nozzle (95a) of the cleaner (95) not inserted, the lid members (142) can be kept closed, thereby making the inside of the cover (141) almost invisible from the room, and preventing the leakage of the dust to the inside of the room.

Figure 20:
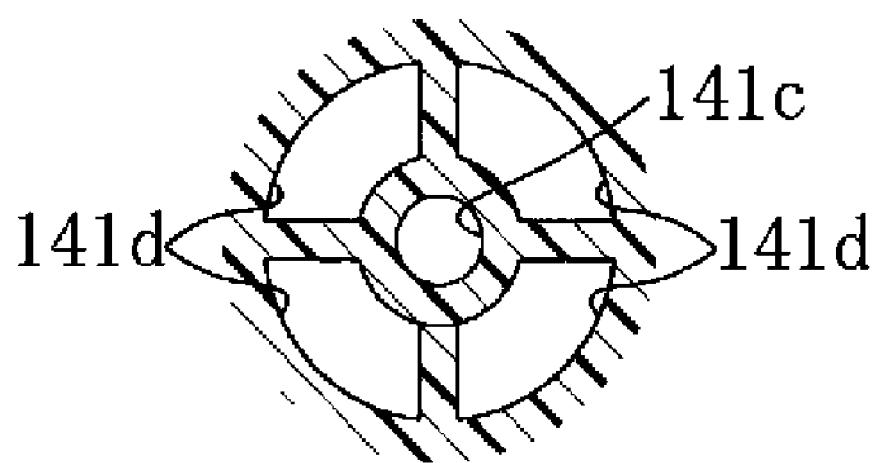
FIG. 20 is a partially enlarged cross-sectional view taken along the line XX-XX of FIG. 19, particularly illustrating a through hole and the vicinity.

Space inside the cover (141) is divided by a partition wall (141b) in the shape of a staircase when viewed in section into a first room (144) communicating with the duct connecting opening (141a), and a second room (145) communicating with the opening (29c). Specifically, the space inside the cover (141) is vertically divided by the partition wall (141b). The partition wall (141b) includes, as shown in FIG. 20, a through hole (141c) formed substantially in the center thereof when viewed in plan, and four fan-shaped communication holes (141d, 141d, . . . ) surrounding the through hole (141c). A shaft (153) of a piston (150) described later is inserted in the through hole (141c), and the dust is transferred from the first room (144) to the second room (145) through the communication holes (141d, 141d, . . . ).

As shown in FIG. 19, a guide (146) for receiving a nozzle connector (151) of a piston (150) described later, and guiding the sliding of the nozzle connector (151) is formed on the partition wall (141b) in the second room (145). The guide (146) is comprised of part of the partition wall (141b) in the shape of a staircase when viewed in plan, and a vertical wall formed to face the part of the partition wall (141b). With the provision of the guide (146), the nozzle connector (151), i.e., the piston (150), can smoothly move up and down.

The piston (150) includes the nozzle connector (151) to which the nozzle (95a) of the cleaner (95) abuts, and a valve (152) arranged on an upper portion of the nozzle connector (151) to be integrated with the nozzle connector (151). The nozzle connector (151) is in the shape of a dome protruding toward the inside of the room in the same manner as described in the fourth modified example of the first embodiment, and a hole (151a) is formed in the protruding end thereof. This makes it possible to reliably bring the nozzle (95a) of the cleaner (95) of various cross-sectional areas and sizes into contact with the nozzle connector (151), thereby allowing for suction and collection of the dust through the hole (151a).

The nozzle connector (151) is a hollow member, and includes through holes (151b, 151b, . . . ) formed in a proximal end thereof (an upper portion) to correspond to the communication holes (141d, 141d, . . . ) formed in the partition wall (141b). The through holes (151b, 151b, . . . ) are substantially in the same shape as the communication holes (141d, 141d, . . . ) (in the shape of fan). Specifically, as described below, the space inside the nozzle connector (151) communicates with the collection duct (77) through the through holes (151b, 151b, . . . ) and the communication holes (141d, 141d, . . . ). The proximal end of the nozzle connector (151) is provided with a communication wall (151c) extending upward to surround the through holes (151b, 151b, . . . ). The communication wall (151c) provided in this manner forms a communication path in which the dust passes, thereby reliably guiding the dust into the through holes (151b, 151b, . . . ).

The valve (152) includes a shaft (153) extending upward from the proximal end (the upper portion) of the nozzle connector (151) and passing through the through hole (141c) formed in the partition wall (141b) of the cover (141), and a flat valve element (154) integrated with the end of the shaft (153), and is arranged opposite the nozzle connector (151) with the partition wall (141b) interposed therebetween. The valve element (154) is sized to cover the through holes (141d, 141d, . . . ) formed in the partition wall (141b), and is arranged to cover the communication holes (141d, 141d, . . . ) of the partition wall (141b) from the first room (144).

As the shaft (153) moves in the through hole (141c) of the partition wall (141b), the valve element (154) moves up and down relative to the partition wall (141b) in the first room (144). Thus, the valve (152) closes the communication holes (141d, 141d, . . . ) when the valve element (154) is brought into close contact with the partition wall (141b) (is at a lowermost position on the room-facing side), and opens the communication holes (141d, 141d, . . . ) when the valve element (154) is at a level higher than the lowermost position. Specifically, when the nozzle (95a) of the cleaner (95) is pressed onto the nozzle connector (151) in the second room (145) of the cover (141) so as to move the nozzle connector (151) upward, the valve element (154) of the valve (152) moves upward together with the shaft (153), thereby opening the communication holes (141d, 141d, . . . ) formed in the partition wall (141b).

As described above, since the communication wall (151c) extending upward to surround the through holes (151b, 151b, . . . ) formed in the nozzle connector (151) is provided on the proximal end of the nozzle connector (151). Therefore, when the nozzle connector (151) moves upward, the communication wall (151c) abuts a lower surface of the partition wall (141b), thereby reliably communicating the communication holes (141d, 141d, . . . ) formed in the partition wall (141b) and the through holes (151b, 151b, . . . ) of the nozzle connector (151) via the communication path in the communication wall (151c) as shown in FIG. 19(b).

In this way, the upward movement of the nozzle connector (151) allows the space inside the nozzle connector (151) to communicate with the inside of the dust collection box (90) through the through holes (151b, 151b, . . . ) formed in the nozzle connector (151), the communication holes (141d, 141d, . . . ) formed in the partition wall (141b), the first room (144) in the cover (141), and the collection duct (77). When the cleaner (95) is operated in this state, the dust contained in the dust collection box (90) is sucked by the nozzle (95a) of the cleaner (95) by the suction power through the collection duct (77), the first room (144) in the cover (141), the communication holes (141d, 141d, . . . ) in the partition wall (141b), and the nozzle connector (151).

The valve (152) is provided with a spring (155) arranged to surround the outer circumference of the shaft (153). The spring (155) is sandwiched between the partition wall (141b) and the proximal end of the nozzle connector (151), and is configured to bias the nozzle connector (151) downward. Specifically, with the spring (155) provided in this manner, and in the absence of force exerted on the nozzle connector (151) from below, the nozzle connector (151) is at the lowest position, i.e., the valve element (154) of the valve (152) is at the lowest position, thereby covering the communication holes (141d, 141d, . . . ) formed in the partition wall (141b) with the valve element (154).

In the example shown in FIG. 19, the duct connecting opening (141a) connected to the collection duct (77) is formed to open toward the grille portion (29a) of the suction grille (29). However, the direction of the duct connecting opening is not limited thereto, and the duct connecting opening may be formed to open toward a plane of the sheet of FIG. 19.

Advantages of Third Embodiment

In this embodiment, the valve element (154) for opening/closing the communication holes (141d, 141d, . . . ) which communicates the inside of the nozzle connector (151) with the inside of the collection duct (77) moves up and down as the nozzle connector (151) moves up and down. Thus, the dust in the dust collection box (90) can be collected through the collection duct (77) by pressing the nozzle (95a) of the cleaner (95), etc., onto the nozzle connector (151). When the nozzle connector (151) is at the lower position, the valve element (154) closes the communication holes (141d, 141d, . . . ), thereby preventing the leakage of the dust in the dust collection box (90) to the inside of the room through the nozzle connector (151).

Since the nozzle connector (151) is biased downward by the spring (155) at any time, the nozzle connector (151) and the valve element (154) move upward only when the nozzle (95a) of the cleaner (95) is pressed onto the nozzle connector (151), thereby collecting the dust through the communication holes (141d, 141d, . . . ). In the other states, the nozzle connector (151) and the valve element (154) are reliably kept at the lower position, thereby reliably closing the communication holes (141d, 141d, . . . ) by the valve element (154). This can reliably prevent the leakage of the dust in the dust collection box (90) to the inside of the room when the dust collection operation is not performed.

The room-facing side of the nozzle connector (151) is covered with the lid members (142) arranged to be almost flush with the suction grille (29), thereby improving the appearance of the room-facing side of the indoor unit (13). Since the lid members (142) function as a double door, and are biased by the springs (143) to be closed, the lid members (142) are opened only when the nozzle (95a) of the cleaner (95) is inserted, and are reliably closed in the other states. Thus, the nozzle connector (151) becomes almost invisible from the inside of the room, thereby reliably maintaining good appearance of the room-facing side of the indoor unit (13). The provision of the lid members (142) can reliably prevent the leakage of the dust to the inside of the room.

Fourth Embodiment

Figure 21:
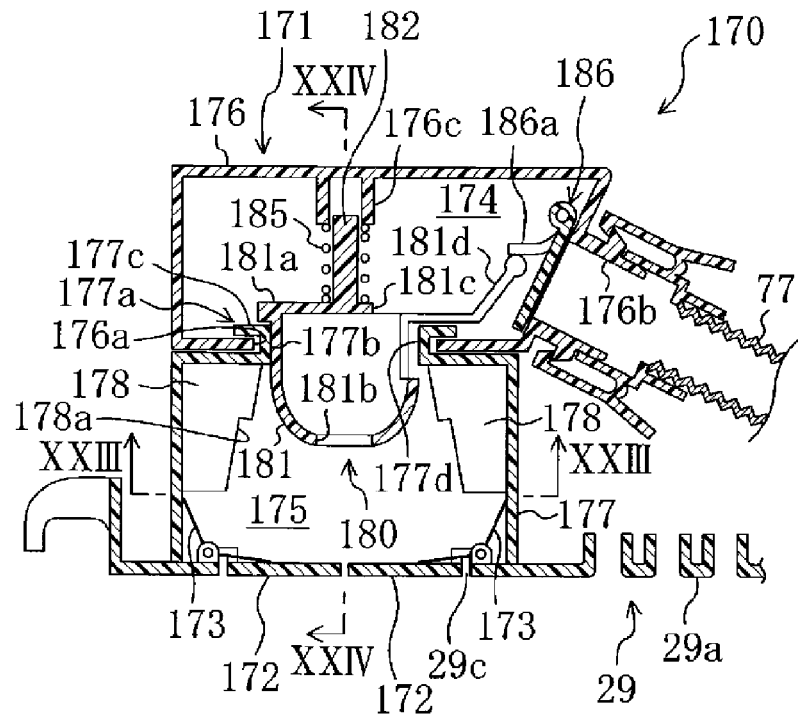
Figure 21:
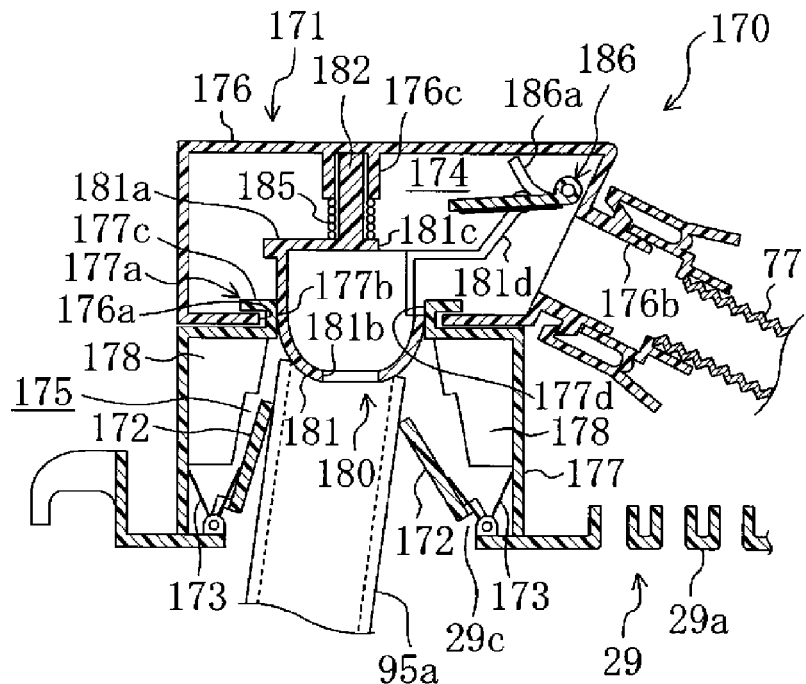

A fourth embodiment of the present disclosure will be described with reference to FIGS. 21 to 24. The present embodiment is different from the third embodiment only in that an upper cover (176) and a lower cover (177) of a cover (171) are configured to be rotatable, and the structure of a nozzle connector (181) as shown in FIG. 21. Therefore, like components are indicated by like characters, and the difference will be described below.

Specifically, a nozzle receiver (170) to which the collection duct (77) is connected is arranged outside the grille portion (29a) of the suction grille (29). As shown in FIG. 21, the nozzle receiver (170) includes a box-shaped cover (171) arranged on a surface of the suction grille (29) facing the space above the ceiling. The cover (171) includes a rectangular parallelepiped-shaped upper cover (176), and a box-shaped lower cover (177) having an open bottom which are vertically connected to each other. The upper cover (176) forms a first room (174) therein, and the lower cover (177) forms a second room (175) therein.

The upper cover (176) is connected to the lower cover (177) to be rotatable with respect to the lower cover (177). Specifically, a round opening (176a) is formed in a lower surface of the upper cover (176), and an engagement portion (177a) capable of engaging with the lip of the opening (176a) is formed on an upper surface of the lower cover (177). The upper cover (176) is configured to be rotatable relative to the lower cover (177) with the lip of the opening (176a) engaged with the engagement portion (177a). The engagement portion (177a) of the lower cover (177) includes a cylindrical body (177b) protruding upward from the upper surface of the lower cover (177) to correspond to the opening (176a) of the upper cover (176), and a flange portion (177c) protruding radially outward from a protruding end of the cylindrical body. As shown in FIG. 21, the lip of the opening (176a) formed in the lower surface of the upper cover (176) is sandwiched between the flange portion (177c) and the upper surface of the lower cover (177), thereby engaging the upper cover (176) with the lower cover (177) to be rotatable relative to the lower cover (177). Although not shown, the upper cover (176) is divided in two in the width direction (in the direction of a plane of a sheet of FIG. 21). Therefore, in attaching the upper cover (176) to the lower cover (177), the engagement portion (177a) of the lower cover (177) can be sandwiched between the two pieces of the upper cover (176).

One of the side surfaces of the upper cover (176) is formed to be tapered outwardly toward the top of the upper cover (176). On this side surface, a duct connecting opening (176b) is formed to open obliquely downward as a communication hole, and the other end of the collection duct (77) is detachably connected to the duct connecting opening (176b). The collection duct (77) and the duct connecting opening (176b) are connected in the same manner as an example shown in FIGS. 44 and 45 described later. The duct connecting opening (176b) is covered with a valve element (186) arranged inside of the upper cover (176). The valve element (186) has an upper end (an upper portion) rotatably supported by the upper cover (176), and a protrusion (186a) protruding from the upper end of the valve element (186) toward the inside of the upper cover (176). As described in detail below, the protrusion (186a) is in contact with a portion of a piston (180), and the valve element (186) is configured to open/close as the piston (180) moves up and down.

The suction grille (29) is provided with an opening (29c) corresponding to the lower cover (177). Two flat lid members (172, 172) (a closure means) are arranged in the opening (29c), and are connected to the rear surface of the suction grille (29) in such a manner that the lid members (172,172) rotate upward about portions of an inner edge of the opening (29c) facing each other. Specifically, the lid members (172) are provided in the opening (29c) as a double door which opens upward. A spring (173) is provided between an end of each of the lid members (172) as a rotation center and the inner surface of the cover (171), thereby biasing each of the lid members (172) to close the opening (29c). Thus, as shown in FIG. 21(a), with the nozzle (95a) of the cleaner (95) not inserted, the lid members (172) can be kept closed, thereby making the inside of the nozzle receiver (170) almost invisible from the room, and preventing the leakage of the dust to the inside of the room.

A UV coating is applied to a surface of each of the lid members (172, 172) facing the inside of the room. Specifically, a UV curable coating is applied to the room-facing surfaces of the lid members (172, 172), and is cured by applying UV light thereto. This can make the surfaces resistant to scratches and soiling. Thus, in opening the lid members (172) from the inside of the room using the nozzle (95a) of the cleaner (95) as shown in FIG. 21(b), the room-facing surfaces of the lid members (172) are protected from scratches and soiling, thereby maintaining good appearance of the room-facing sides of the lid members (172).

Inside the cylindrical body (177b) of the engagement portion (177a) of the lower cover (177) constitutes an insertion hole (177d) in which a nozzle connector (181) of a piston (180) described later is inserted. Specifically, the body (177b) of the engagement portion (177a) functions as a guide for guiding slide movement of the nozzle connector (181). This allows for smooth vertical movement of the nozzle connector (181), i.e., the piston (180).

The piston (180) includes a nozzle connector (181) to which the nozzle (95a) of the cleaner (95) abuts, and a shaft (182) integrally formed on an upper portion of the nozzle connector (181). The nozzle connector (181) is in the shape of a dome protruding toward the inside of the room, and the upper portion thereof is covered with a flat portion (181a). A hole (181b) is formed in a protruding end of the nozzle connector (181). This makes it possible to bring the nozzle (95a) of the cleaner of various cross-sectional shapes and sizes into contact with the nozzle connector (181), thereby allowing for reliable suction and collection of the dust through the hole (181b).

Figure 22:
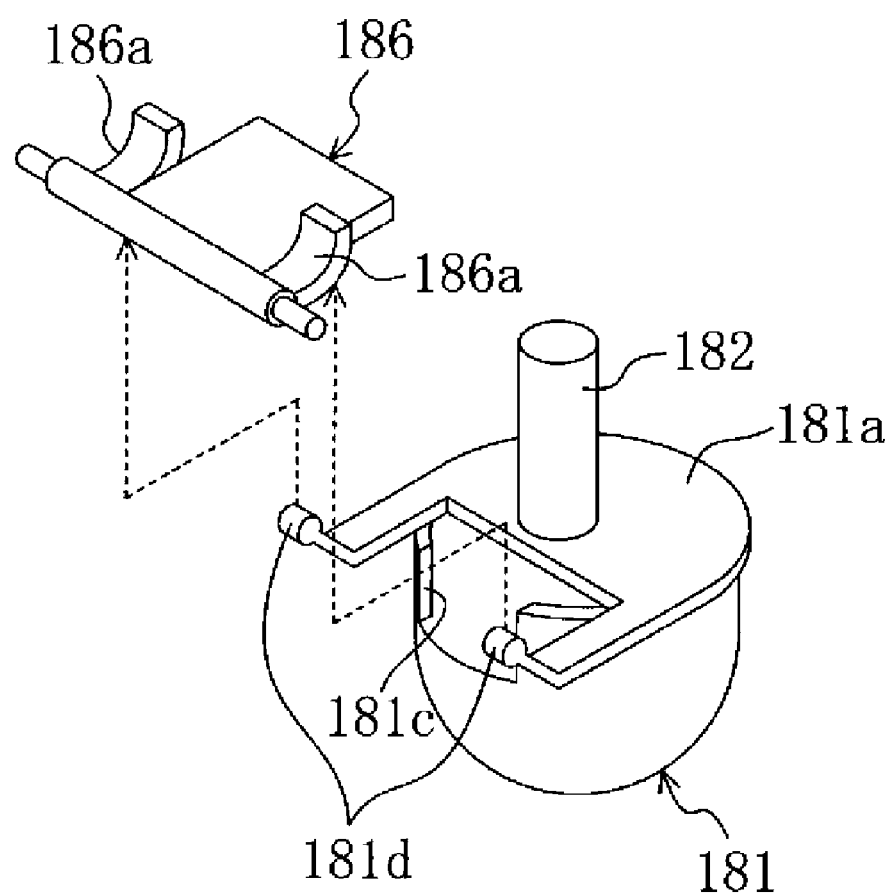
FIG. 22 is a perspective view of a nozzle connector.

As shown in FIG. 22, the nozzle connector (181) is a hollow member, and has an opening (181c) formed in a portion of a proximal end thereof (an upper portion in FIG. 22). The opening (181c) is formed across the proximal end of the dome-shaped nozzle connector (181) and part of the flat portion (181a) to open obliquely upward. Abutments (181d) extending obliquely upward from the flat portion (181a) are formed on the lateral sides of the opening (181c), respectively. Each of the abutments (181d) is formed to abut the corresponding projection (186a) formed on the valve element (186) covering the duct connecting opening (176b) of the upper cover (176) from the inside of the upper cover (176). Specifically, the protrusion (186a) of the valve element (186) is formed on each of the widthwise ends of the valve element (186), and is curved upward. Therefore, when the nozzle connector (181) moves upward, the protrusions (186a) are pushed upward by the abutments (181d) of the nozzle connector (181). This opens the valve element (186) as shown in FIG. 21(b).

The shaft (182) is integrated with the nozzle connector (181), and extends upward from the flat portion (181a) of the nozzle connector (181). An upper end of the shaft (182) is arranged in a cylindrical guide (176c) formed inside the upper surface of the upper cover (176), thereby allowing for smooth vertical movement of the nozzle connector (181). A spring (185) is provided around the outer circumference of the shaft (182) so as to be sandwiched between a lower end of the guide (176c) and the flat portion (181a) of the nozzle connector (181). The spring (185) biases the nozzle connector (181) downward (at the lowermost position), and permits the upward movement of the nozzle connector (181) when the nozzle (95a) of the cleaner (95) is pressed onto the bottom of the nozzle connector (181). With the nozzle connector (181) biased downward by the spring (185), the outer circumference of the flat portion (181a) of the nozzle connector (181) abuts the flange portion (177c) of the engagement portion (177a) of the lower cover (177).

With the above-described configuration, when the nozzle (95a) of the cleaner is pressed onto the bottom of the nozzle connector (181) from below, the nozzle connector (181) moves upward against the biasing force of the spring (185), and the opening (181c) formed in the nozzle connector (181) is completely opened in the first room of the upper cover (176). As the nozzle connector (181) moves upward, the abutments (181d) provided on the lateral sides of the opening (181c) of the nozzle connector (181) push the protrusions (186a) of the valve element (186) covering the duct connecting opening (176b) of the upper cover (176) upward, thereby opening the valve element (186). Thus, the collection duct (77) and the space inside the nozzle connector (181) communicate with each other through the duct connecting opening (176b).

Specifically, when the nozzle connector (181) moves upward, the space inside the nozzle connector (181) communicates with the space inside the dust collection box (90) through the opening (181c) formed in the nozzle connector (181), the first room (174) in the upper cover (176), and the collection duct (77). When the cleaner is operated in this state, the dust contained in the dust collection box (90) is sucked into the nozzle (95a) of the cleaner by the suction power of the cleaner through the collection duct (77), the first room (174) in the upper cover (176), and the nozzle connector (181).

When the nozzle connector (181) is not pushed upward by the nozzle (95a) of the cleaner, the nozzle connector (181) is biased downward by the spring (185). Thus, as shown in FIG. 21(a), the valve element (186) of the duct connecting opening (176b) is not lifted by the abutments (181d) of the nozzle connector (181), thereby closing the duct connecting opening (176b). Therefore, the nozzle connector (181) and the collection duct (77) discommunicate with each other, thereby preventing the dust from flowing into the room.

Nozzle guides (178) are provided on an inner side surface and an inner upper surface of the lower cover (177) to reliably bring the nozzle (95a) of the cleaner (95) into contact with the nozzle connector (181). The nozzle guide (178) is a flat member formed across the inner side surface and the inner upper surface of the lower cover (177). Two nozzle guides (178) are formed on each of the sides of the upper surface of the rectangular parallelepiped-shaped lower cover (177).

Figure 23:
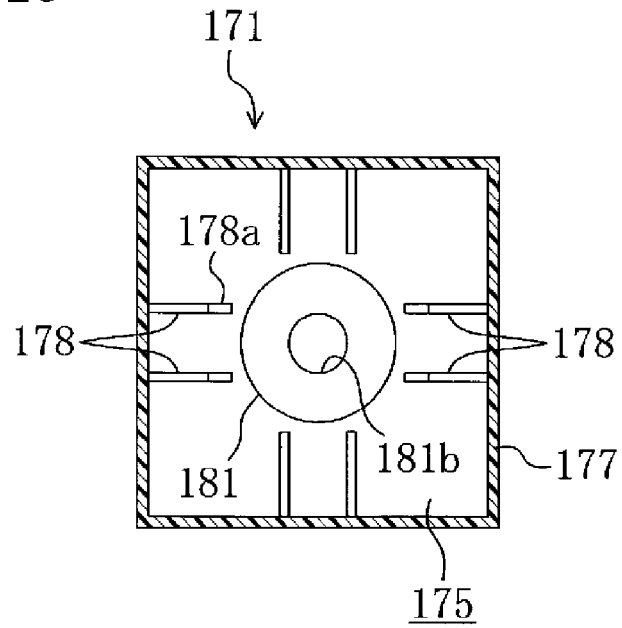
FIG. 23 is a cross-sectional view taken along the line XXIII-XXIII in FIG. 21.
Figure 24:
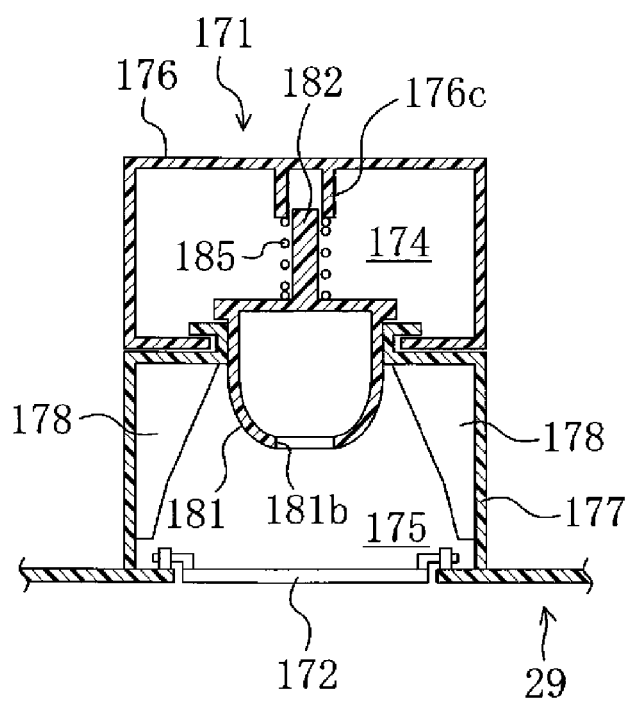
FIG. 24 is a cross-sectional view taken along the line XXIV-XXIV in FIG. 21.

Specifically, as shown in FIGS. 23 and 24, the nozzle guide (178) is a ribbed member whose lateral dimension is gradually increasing toward the top of the lower cover (177). Two nozzle guides (178) are arranged on each of the inner side surfaces of the lower cover (177) to surround the nozzle connector (181). With use of the ribbed members as the nozzle guides (178), the guiding mechanism is provided with reduced material, thereby reducing weight and manufacturing cost of the suction grille (29). Further, with the lateral dimension of each of the nozzle guides (178) gradually increasing upward, the nozzle (95a) of the cleaner can reliably be positioned at the hole (181b) of the nozzle connector (181).

The nozzle guide (178) includes, as shown in FIGS. 21 and 23, a recess (178a) capable of receiving the lid members (172) in the opened state. With the provision of the recess (178a), the lid members (172) can be received by the recess (178a) when the lid member (172) are opened by the end of the nozzle (95a) of the cleaner (95), thereby preventing the lid members (172) from disturbing the insertion of the nozzle (95a).

The recess (178a) is configured in such a manner that the lid member (172) received therein functions as a guide for guiding the insertion of the nozzle (95a). This allows for smoother insertion of the nozzle (95a), and reliable pressing of the nozzle (95a) onto the nozzle connector (181). The recess (178a) is provided only in the nozzle guides (178) with which the lid members (172) in the opened state are brought into contact (in this embodiment, the recess is formed in four opposing nozzle guides (178) only).

Figure 25:
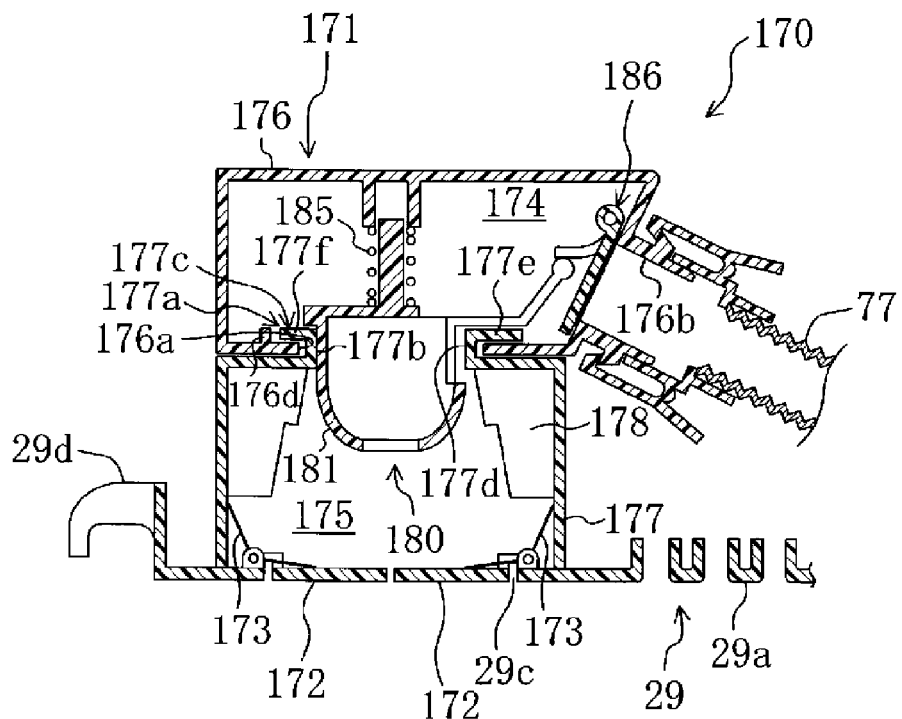
FIG. 25 is an enlarged cross-sectional view of a nozzle receiver illustrating together with a pin of an upper cover, and a flange portion of a lower cover.
Figure 26:
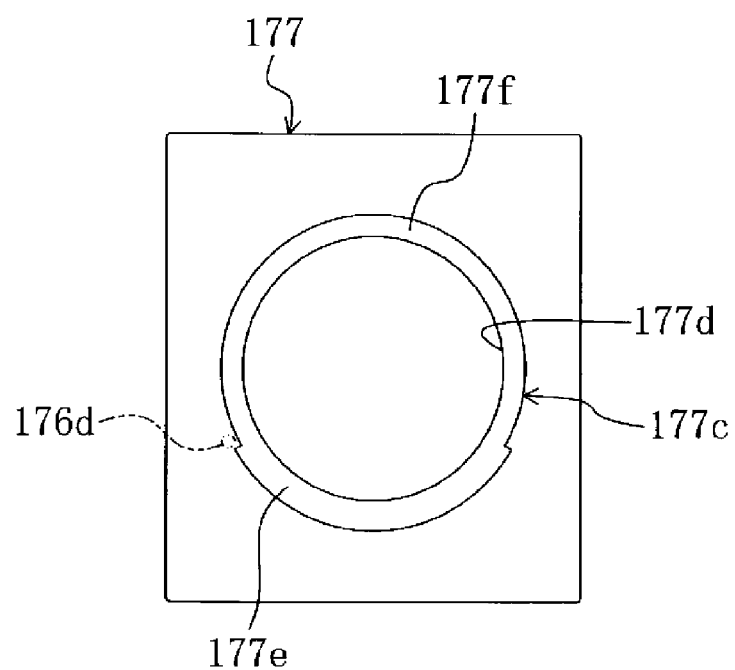
FIG. 26 is a plan view of the lower cover.

As shown in FIGS. 25 and 26, part of the flange portion (177c) of the lower cover (177) of the nozzle receiver (170) in the range of a predetermined angle has a larger diameter. Specifically, the flange portion (177c) includes a large diameter portion (177e) having a larger diameter, and a small diameter portion (177f) having a smaller diameter (see FIG. 26). On an inner lower surface of the upper cover (176), a pin (176d) is arranged inside the large diameter portion (177e) of the flange portion (177c), and outside the small diameter portion (177f) relative to the rotation center of the upper cover (176) when the upper cover (176) is combined with the lower cover (177). When the upper cover (176) rotates relative to the lower cover (177), the pin (176d) of the upper cover (176) abuts a stepped portion between the small diameter portion (177f) and the large diameter portion (177e) of the lower cover (177), thereby controlling the rotation of the upper cover (176) (see FIG. 26). Specifically, when the pin (176d) of the upper cover (176) is positioned on the outer circumference of the small diameter portion (177f) of the flange portion (177c) forming the engagement portion (177a) of the lower cover (177), the upper cover (176) can rotate. When the pin (176d) abuts the stepped portion between the small diameter portion (177f) and the large diameter portion (177e) of the flange portion (177c) forming the engagement portion (177a) of the lower cover (177), the rotation of the upper cover (176) is stopped.

With the above-described configuration, the upper cover (176) of the nozzle receiver (170) is prevented from rotating by a larger angle than the predetermined angle. This can prevent bending of the collection duct (77) connected to the upper cover (176). Specifically, since the nozzle receiver (170) is arranged on the suction grille (29), the collection duct (77) connected to the upper cover (176) may be bent inside the suction grille (29) when the suction grille (29) is closed, depending on the rotation angle of the upper cover (176) of the nozzle receiver (170). Then, the flow of the air and the dust in the collection duct (77) may greatly be inhibited, and the collection duct (77) may be damaged. On the other hand, the bending of the collection duct (77) can be prevented by controlling the range of rotation of the upper cover (176) so as not to bend the collection duct (77) even when the suction grille (29) is closed.

In the configuration shown in FIG. 25, the nozzle receiver (170) is arranged near a hinge (29d) of the suction grille (29).

Therefore, the upper cover (176) is allowed to rotate by an angle obtained by subtracting from 360 degrees an angle of 60 degrees to −60 degrees relative to a position at which the duct connecting opening (176b) of the upper cover (176) is the closest to the one of the sides of the suction grille (29) provided with the hinge (29d). Specifically, the upper cover (176) can rotate by an angle of 180 degrees opposite the side of the suction grille (29) where the hinge (29d) is provided, plus an angle of 30 degrees in both rotating directions. Thus, the upper cover (176) is allowed to rotate in the angular range of 180 degrees or higher. This makes it possible to tuck the collection duct (77) connected to the upper cover (176) into the casing (26), depending on the angle of the upper cover (176). Therefore, the suction grille (29) can easily be closed without interference by the collection duct (77).

In the example shown in FIGS. 21 and 25, the upper cover (176) is positioned relative to the lower cover (177) in such a manner that the collection duct (77) is positioned above the grille portion (29a) of the suction grille (29). However, in the actual air conditioner, the upper cover (176) is arranged in such a manner that the collection duct (77) extends toward the plane of the sheet of FIGS. 21 and 25.

—Extension Nozzle of Cleaner—

Figure 28:
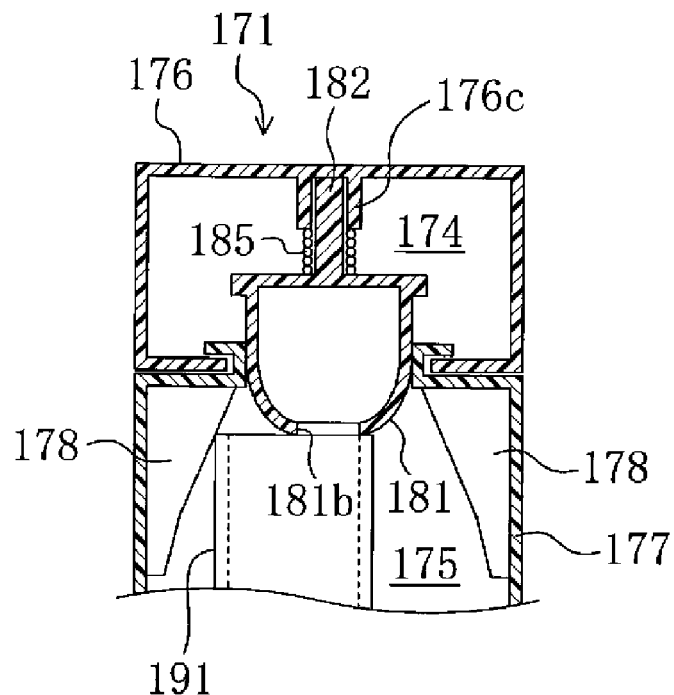
FIG. 28 is a view corresponding to FIG. 24 illustrating the extension nozzle being inserted.
Figure 29:
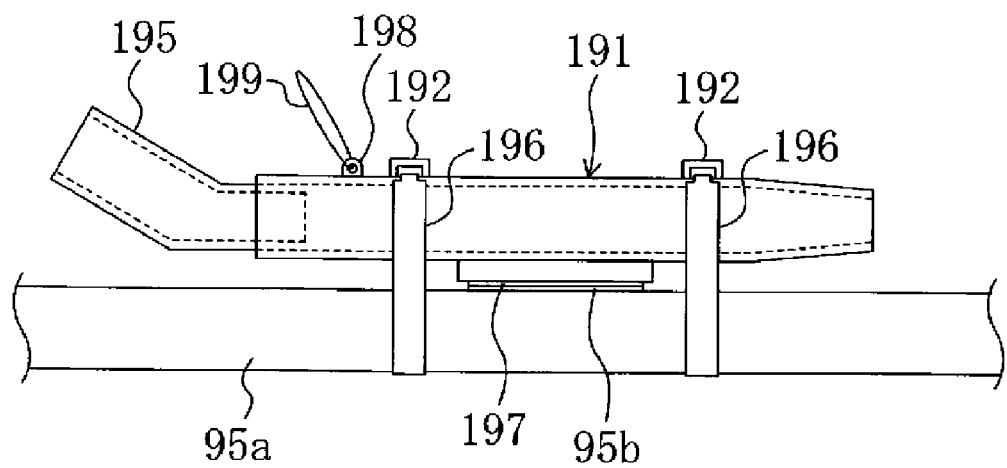
FIG. 29 shows the extension nozzle fixed to a nozzle of a cleaner.

The structure of an extension nozzle (191) of a cleaner attached to the end of the nozzle (95a) of the cleaner (95), and is pressed onto the nozzle connector (181) of the above-described structure will be described with reference to FIGS. 27 to 29. In pressing the nozzle (95a) onto the nozzle connector (181) of the indoor unit (13) arranged on the ceiling, the cleaner has to be lifted up, or the nozzle (95a) may be too large to insert in the opening (29c) depending on the type of the cleaner. In such a case, the extension nozzle (191) is used as an extension member attached to the end of the nozzle (95a) of the cleaner (95).

Figure 27:
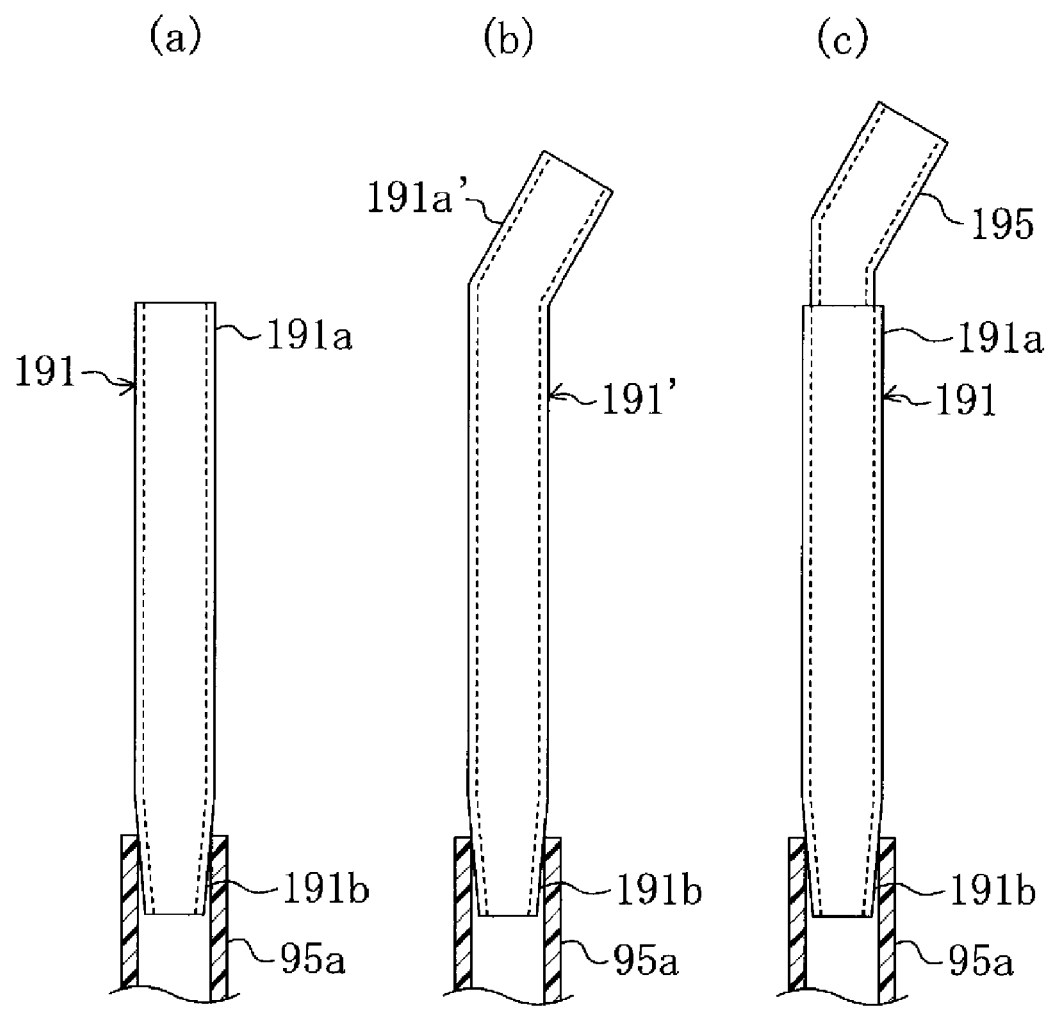
FIGS. 27(a) to 27(c) show examples of an extension nozzle, respectively.

Specifically, as shown in FIG. 27, the extension nozzle (191) has a proximal end (191b) tapered toward an edge thereof, and a distal end (191a) sized to be able to contact with the nozzle connector (181) without forming a large gap between an edge thereof and the nozzle connector. More specifically, as shown in FIG. 28, with the nozzle (191) inserted in the first room (174) in the nozzle receiver (170) to push the nozzle connector (181) upward, the outer circumference of the distal end (191a) of the extension nozzle (191) abuts the nozzle guides (178), and an opening at the distal end (191a) communicates with the hole (181b) of the nozzle connector (181). That is, the extension nozzle (191) is configured in such a manner that the opening at the distal end (191a) overlaps with the hole (181b) of the nozzle connector (181) as viewed in plan view, when the distal end (191a) pushes the nozzle connector (181) upward, and the outer circumference abuts the nozzle guides (178) arranged to surround the nozzle connector (181).

Therefore, when the extension nozzle (191) is pressed onto the nozzle connector (181), the opening at the distal end (191a) of the extension nozzle (191) reliably communicates with the hole (181b) of the nozzle connector (181), thereby allowing for reliable and efficient suction of the dust through the hole (181b).

With the proximal end (191b) of the extension nozzle (191) tapered, the extension nozzle (191) can be attached to the nozzle (95a) of the cleaner of any size.

As shown in FIG. 27(b), an extension nozzle (191') of the cleaner may have a distal end (191a') bent substantially in the shape of letter L. With the distal end (191a') bent in this manner, a worker does not have to press the extension nozzle (191) onto the nozzle connector (181) immediately below the nozzle connector (181). This allows the worker to perform the suction and collection of the dust in an easier position, thereby improving the working efficiency of the dust collection.

As shown in FIG. 27(c), the extension nozzle (191) may be configured to be able to connect another extension tube (195) at the end thereof. This can lengthen the nozzle, and the end of the nozzle can be pressed onto the nozzle connector (181) with more reliability. Further, as shown in FIG. 27(c), if the extension tube (195) is bent substantially in the shape of L, the worker does not have to perform the dust collection immediately below the nozzle connector. This improves the working efficiency.

The extension nozzle (191), when detached from the nozzle (95a) of the cleaner, can be fixed to the nozzle (95a) by a tape (196) (a nozzle engagement). Specifically, two insertion parts (192) protruding substantially in the shape of U are arranged on an outer circumferential surface of the extension nozzle (191) at predetermined intervals from each other in the axial direction of the extension nozzle, and the tape (196) is inserted in each of the insertion parts (192). The tape (196) is provided with fastener tapes at both lengthwise ends thereof so as to engage the ends with each other. As shown in FIG. 29, the tape (196) is enough long to bind and fix the extension nozzle (191) and the nozzle (95a) of the cleaner with the nozzles kept parallel with each other. Except for a portion passing the insertion part (192), the tape (196) is wider than the inner dimension of the insertion part (192). This can prevent the tape (196) from slipping from the insertion part, thereby preventing lost of the tape (196).

The extension nozzle (191) has an extension nozzle engagement (197) (a second nozzle engagement), and the nozzle (95a) of the cleaner has a body engagement (95b) (an engagement). Both of the engagements are capable of engaging with each other. The engagements (197, 95b) may be, e.g., fastener tapes, and are sized to be able to engage with each other. The engagements (197, 95b) are used as temporary fasteners before fixing the extension nozzle (191) to the nozzle (95a) by the tape (196). Thus, the extension nozzle engagement (197) is arranged on the outer circumferential surface of the extension nozzle (191) 180 degrees opposite the insertion parts (192). The provision of the engagement (197, 95b) on the extension nozzle (191) and the nozzle (95a) of the cleaner (95) as temporary fasteners allows for easy and reliable fixing of the extension nozzle (191) and the nozzle (95a) of the cleaner (95) by the tape (196).

The extension nozzle (191) further includes a ring-shaped string (199) (a ring member) which is drawn through a string insertion part (198) (a second insertion part). The ring-shaped string (199) makes it possible to hang the extension nozzle (191) on a certain protrusion on a wall, for example, thereby allowing for easy storage of the extension nozzle (191). In the present embodiment, the string (199) is ring-shaped. However, the string may be a ring member made of metal or resin.

Advantages of Fourth Embodiment

According to the present embodiment, the valve element (186) is arranged to cover the duct connecting opening (176b) in the cover (171) from the inside of the cover (171) containing the nozzle connector (181), and the valve element (186) is configured to open toward the nozzle connector (181). Therefore, even if the dust remains upstream of the duct connecting opening (176b), the valve element (186) can reliably be opened. This allows for reliable suction and collection of the dust through the duct connecting opening (176b).

The valve element (186) is configured to open and close as the abutments (181d) of the nozzle connector (181) come into contact with the protrusions (186a, 186a) arranged at the widthwise ends of the valve element (186). Therefore, the valve element (186) can be opened and closed by pressing the nozzle of the cleaner onto the nozzle connector (181), thereby allowing for suction and the collection of the dust from the inside of the room only when required.

The nozzle guides (178) arranged to surround the nozzle connector (181) make it possible to reliably position the nozzle of the cleaner at the hole (181c) of the nozzle connector (181), thereby allowing for reliable and efficient suction and collection of the dust by the nozzle. In particular, some of the nozzle guides (178) with which the lid members (172) covering the room-facing side of the nozzle connector (181) come into contact are provided with recesses (178a), respectively. Thus, the lid members (172) can fit into the recesses (178a). Therefore, the lid members (172) do not interfere with the insertion of the nozzle of the cleaner, and the lid members (172) can function as part of the guide. This makes it possible to press the nozzle of the cleaner onto the nozzle connector (181) with reliability.

A UV coating is applied to the room-facing surfaces of the lid members (172). This can protect the room facing surfaces of the lid members (172) from scratches and soiling when the lid members (172) are opened by the nozzle of the cleaner, and can maintain good appearance of the room-facing side of the lid members (172).

The proximal end (191b) of the extension nozzle (191) attached to the end of the nozzle (95a) of the cleaner is tapered. Therefore, the extension nozzle (191) can be attached to the nozzle (95a) of the cleaner of any size.

The distal end (191a) of the extension nozzle (191) is configured in such a manner that an opening at the distal end overlaps with the hole (181b) of the nozzle connector (181) as viewed in plan, when the distal end pushes the nozzle connector (181) upward, and the outer circumference of the distal end abuts the nozzle guides (178). Therefore, the inside of the extension nozzle (191) and the inside of the hole (181b) of the nozzle connector (181) communicate with reliability, thereby allowing for more reliable suction and collection of the dust by the extension nozzle (191).

The distal end (191a') of the extension nozzle (191, 191') is bent, or the extension tube (195) is attached to the distal end (191a). These configurations make it possible to bring the extension nozzle (191) into close contact with the nozzle connector (181) even if the extension nozzle (191) is not pressed onto the nozzle connector (181) from immediately below the nozzle connector. This can improve the workability of the dust collection.

The extension nozzle (191) is provided with the tape (196) for fixing the extension nozzle detached from the end of the nozzle (95a) of the cleaner to the nozzle (95a). This can reliably prevent lost of the extension nozzle (191) when it is not used. Further, the insertion parts (192) in which the tape (196) is inserted is formed on the outer circumferential surface of the extension nozzle (191), and a portion of the tape (196) not passing the insertion parts (192) is wider than the inner dimension of the insertion part (192). This can prevent the tape (196) from slipping from the insertion part, thereby preventing the lost of the tape (196).

The body engagement (95b) is formed on the outer circumferential surface of the nozzle (95a) of the cleaner, and the extension nozzle engagement (197) corresponding to the body engagement (95b) is formed on the outer circumferential surface of the extension nozzle (191). This allows for temporarily fixing the extension nozzle (191) to the nozzle (95a) before fixing them by the tape (196), thereby allowing for reliable fixing of the extension nozzle (191) to the nozzle (95a) by the tape (196).

Further, the string insertion part (198) is formed on the extension nozzle (191), and the ring-shaped string (199) is drawn through the string insertion part (198) so as to hang the string (199) on a protrusion on a wall, etc. This allows for easy storage of the extension nozzle (191).

Fifth Embodiment

A fifth embodiment of the present disclosure will be described with reference to FIGS. 30 to 39. This embodiment is directed to a so-called ceiling-suspended indoor unit as shown in FIG. 30, and is different from the first embodiment directed to the so-called in-ceiling indoor unit.

Figure 30:
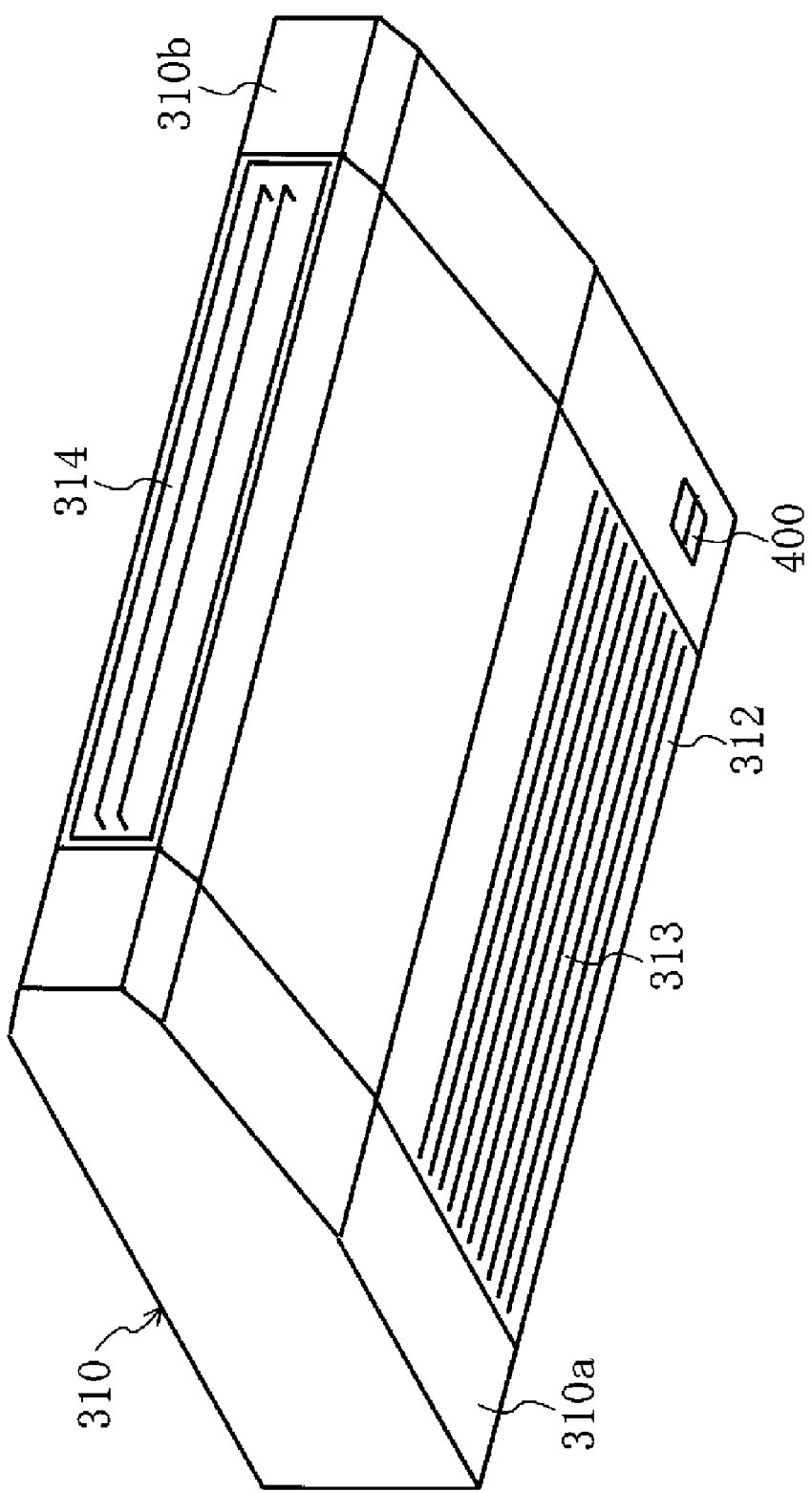
FIG. 30 is a perspective view illustrating an indoor unit of a fifth embodiment as viewed from the bottom.

As shown in FIG. 30, the indoor unit of the present embodiment includes a flat, substantially rectangular casing (310). The casing (310) is suspended from a ceiling of a room. A suction grille (312) is provided in a center of a lower surface (310a) of the casing (310), and the suction grille (312) has an inlet (313). An outlet (314) is formed in a center of a front surface (310b) of the casing (310). When viewed from the front surface (310b), a nozzle receiver (400) is arranged at a right end portion of the lower surface (310a) of the casing (310).

Figure 31:
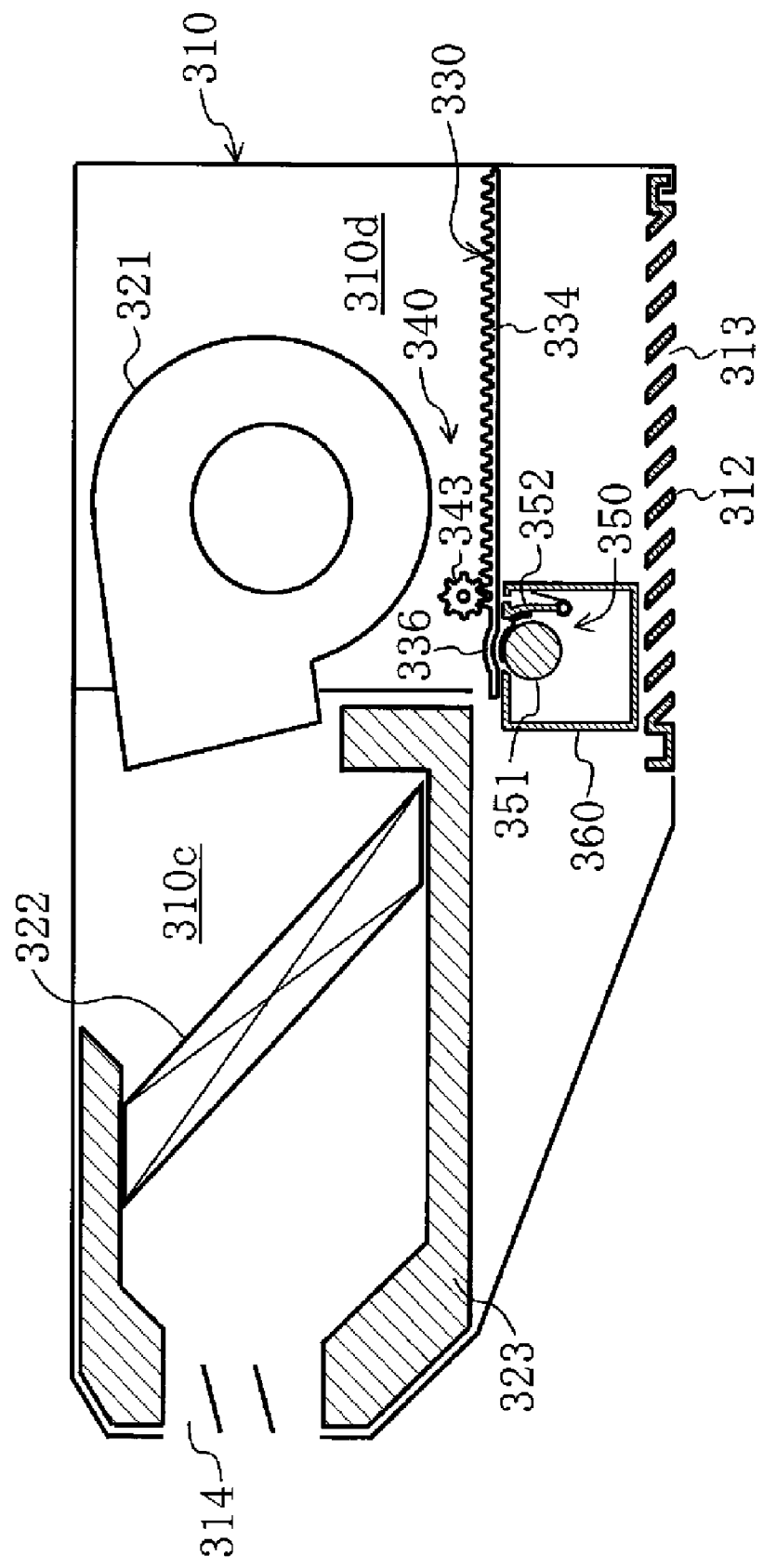
FIG. 31 is a vertical cross-sectional view taken along the line passing the center of the indoor unit.
Figure 32:
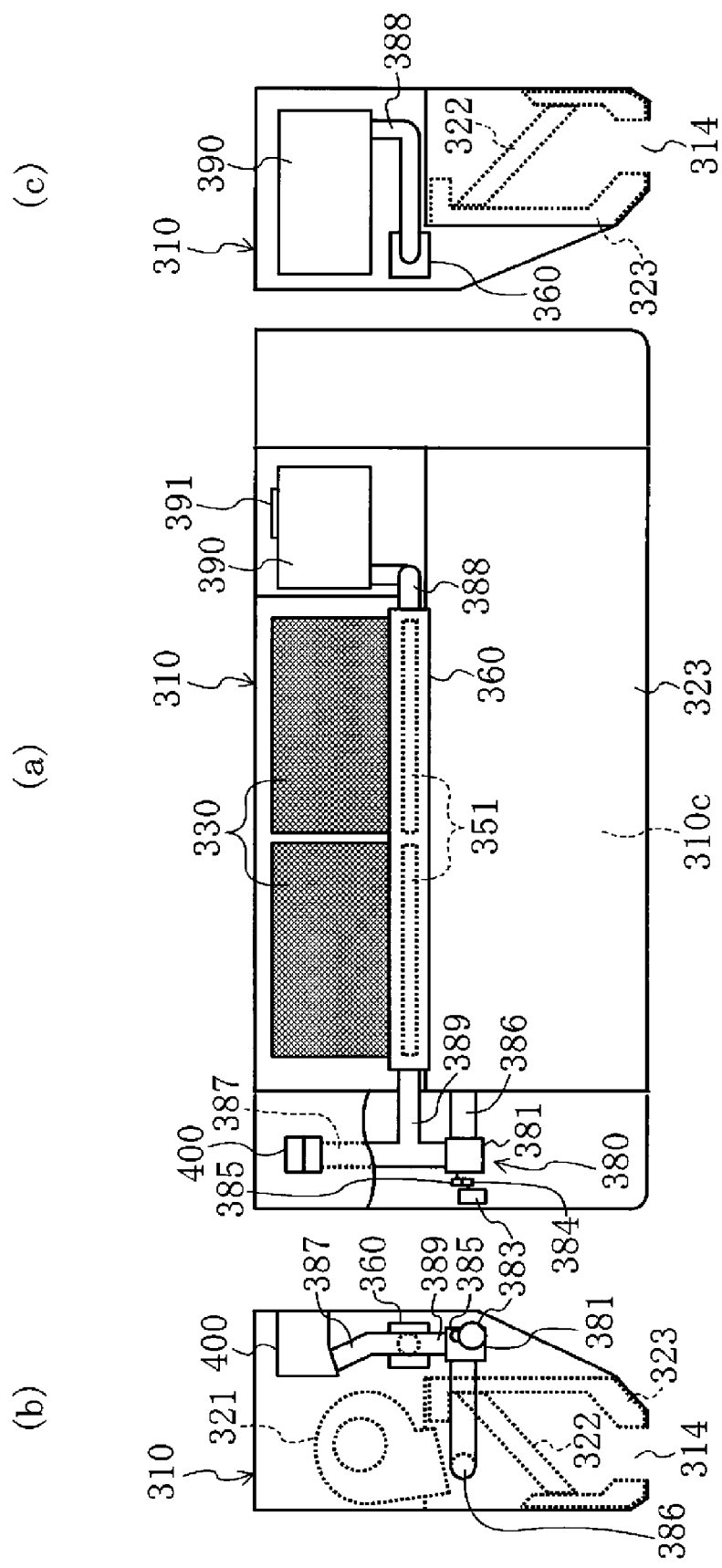

As shown in FIGS. 31 and 32, the casing (310) contains an indoor fan (321), an indoor heat exchanger (322), a drain pan (323), an air filter (330), a filter drive means (340), a dust removing means (350), a dust container (360), a dust transfer means (380), and a dust collection box (390). Space inside the casing (310) is divided into an air sucking room (310d) communicating with the inlet (313), and an air blowing room (310c) communicating with the outlet (314).

The indoor fan (321) is a so-called sirocco fan, and is arranged above the inlet (313). An inlet side of the indoor fan (321) communicates with the air sucking room (310d), and an outlet side communicates with the air blowing room (310c). Although not shown, the indoor fan (321) includes a fan motor and an impeller.

The indoor heat exchanger (322) is configured as a cross-fin type fin-and-tube heat exchanger, and is placed in the air blowing room (310c). The indoor heat exchanger (322) is inclined toward the outlet side of the indoor fan (321) in the direction of the air blowing from the indoor fan (321). Heat exchange is performed between the indoor air (blowing air) sent from the indoor fan (321) and a refrigerant circulating in the indoor heat exchanger (322).

The drain pan (323) is arranged below the indoor heat exchanger (322) in the air blowing room (310c). The drain pan (323) receives drainage generated by condensation of moisture in the indoor air because of heat exchange between the refrigerant and the indoor air in the indoor heat exchanger (322).

As shown in FIGS. 33 to 36, the dust container (360) is arranged in the air sucking room (310d) immediately above the inlet (313). The dust container (360) is in the shape of a narrow rectangular parallelepiped, and is arranged to extend in the lateral direction of the casing (310) (left-right direction in FIG. 32(a)). Two brush receiving openings (363) are formed in an upper surface of the dust container (360) (see FIG. 35). Each of the brush receiving openings (363) is in the shape of a narrow rectangle extending in the longitudinal direction of the dust container (360). The two brush receiving openings (363) are aligned in the longitudinal direction of the dust container (360).

The dust removing means (350) is provided to remove the dust trapped on the air filter (330). The dust removing means (350) includes two pairs of a rotating brush (351) and a non-rotating brush (352), and a brush drive means (353).

Figure 35:
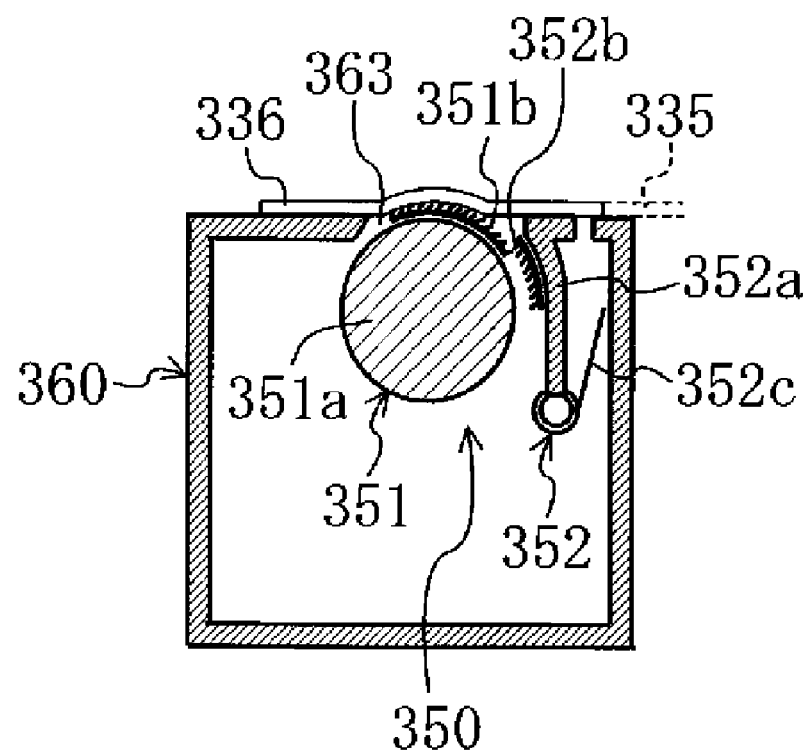
FIG. 35 is a vertical cross-sectional view illustrating a relationship between a dust container and a closure means of the air filter.

As shown in FIG. 35, the pairs of the rotating brush (351) and the non-rotating brush (352) are arranged in the brush receiving openings (363) of the dust container (360), respectively. The rotating brush (351) includes a shaft portion (351*a*), and a bristle portion (351*b*) attached to part of a circumferential surface of the shaft portion (351*a*). The non-rotating brush (352) includes a body (352*a*), a bristle portion (352*b*), and a spring (352*c*).

Figure 33:
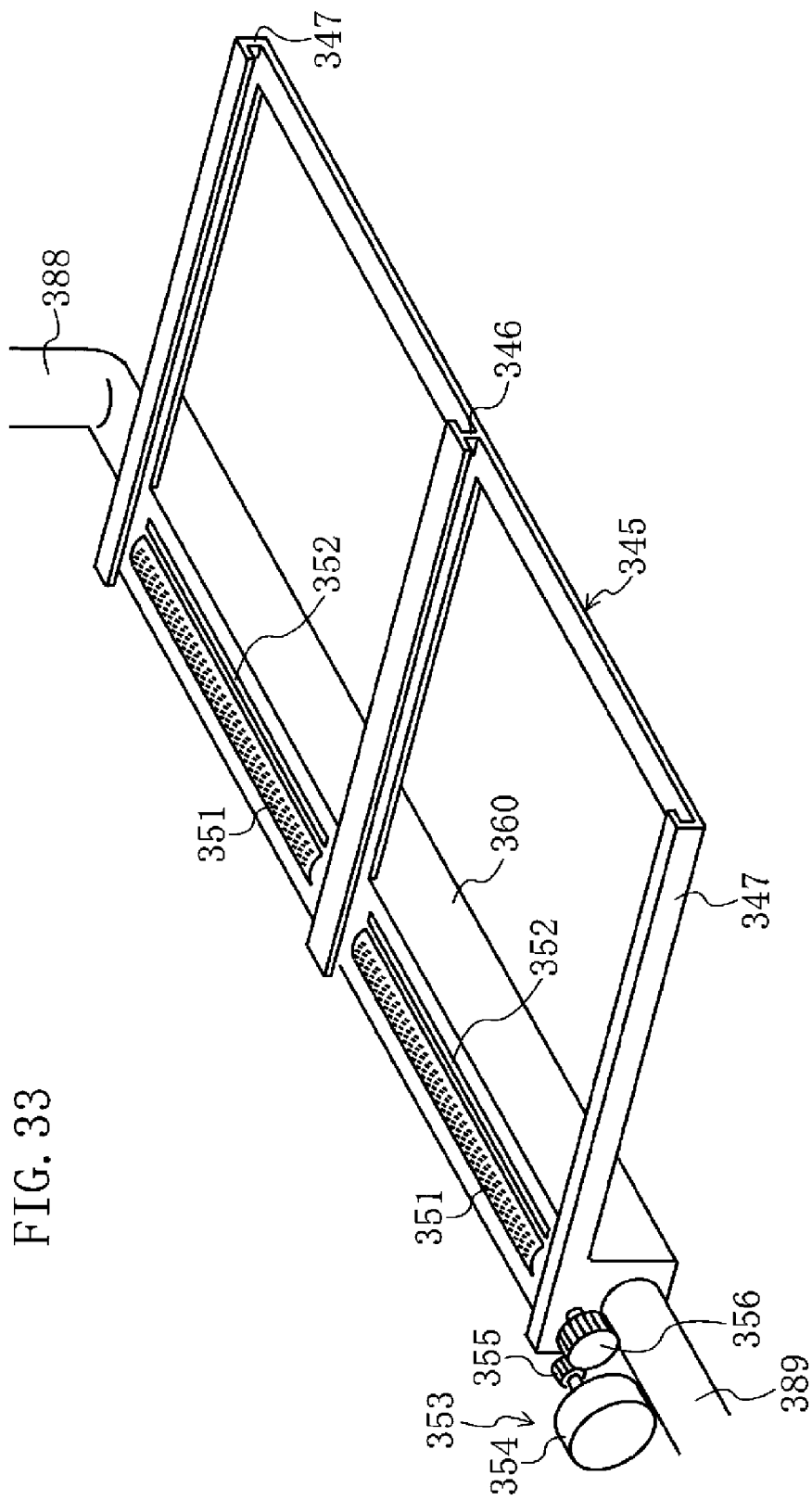
FIG. 33 is a perspective view illustrating a brush drive means and a filter guide as viewed from the back.

The rotating brush (351) is driven by the brush drive means (353) to rotate in a reversible manner. As shown in FIG. 33, the brush drive means (353) includes a brush drive motor (354), and a drive gear (355) and a driven gear (356) engaging with each other. The drive gear (355) is attached to a drive shaft of the brush drive motor (354), and the driven gear (356) is connected to the shaft portion (351*a*) of the rotating brush (351).

With the above-described configuration, the bristle portions (351*b*, 352*b*) of the rotating brush (351) and the non-rotating brush (352) are brought into contact with each other by rotating the rotating brush (351) by the brush drive means (353), thereby removing the dust from the bristle portion (351*b*) of the rotating brush (351). The dust removed from the rotating brush (351) is contained in the dust container (360).

Figure 34:
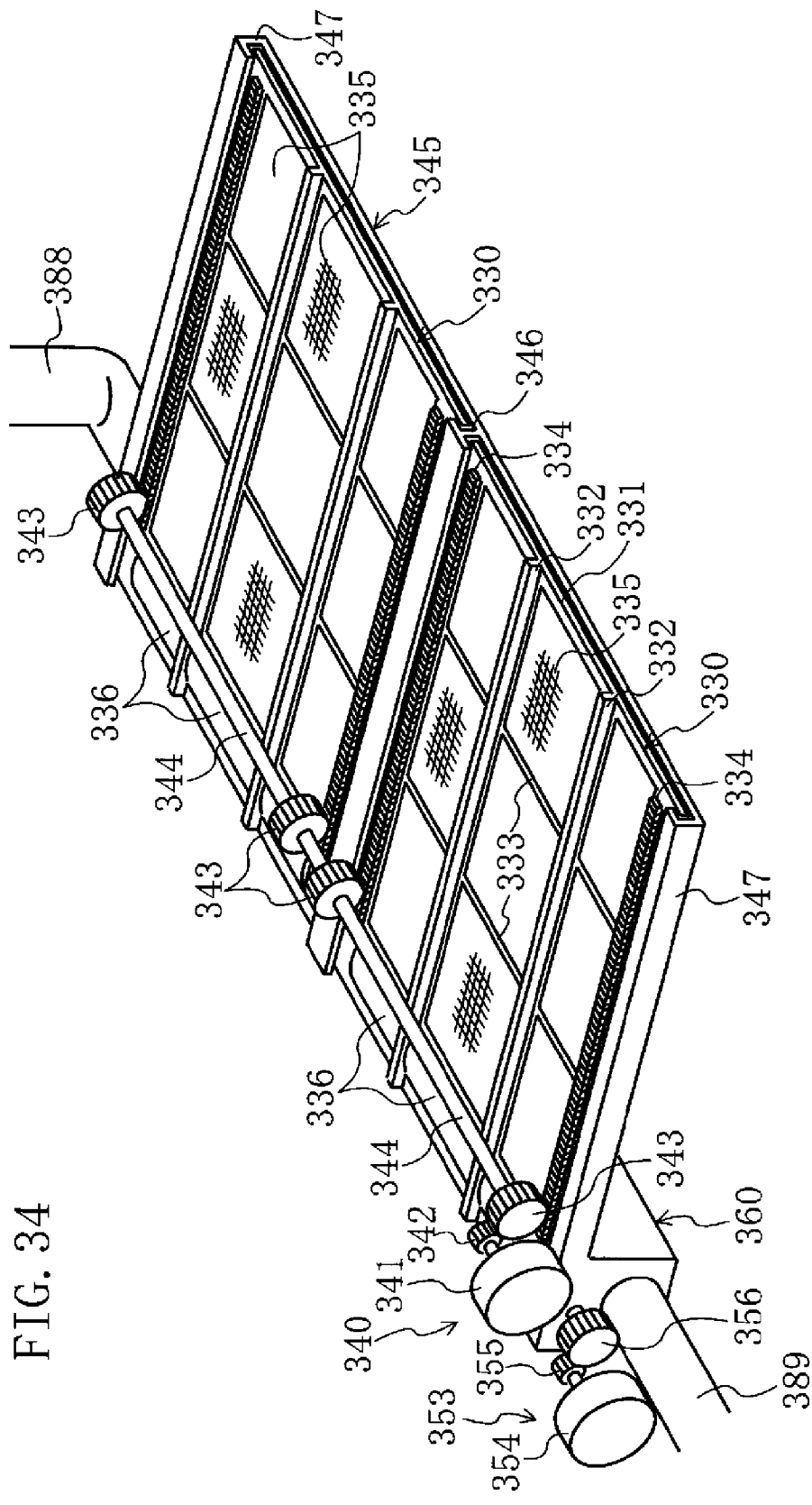
FIG. 34 is a perspective view illustrating a relationship between the filter drive means and the air filter as viewed from the back.

As shown in FIG. 34, two air filters (330) are provided in the present embodiment. Each of the air filters (330) includes a filter body (331) in the shape of a rectangular frame. Longitudinal ribs (332) and lateral ribs (333) are arranged inside the frame-shaped filter body (331) in the shape of a grid, thereby dividing the space inside the frame into rectangular rooms, and a sheet-shaped mesh member (335) is attached to each of the rooms.

The filter body (331) includes racks (334) attached to lateral ends thereof (the ends in the extending direction of the lateral ribs (333)). Each of the racks (334) extends substantially in the longitudinal direction of the filter body (331) (the extending direction of the longitudinal ribs (332)). The rack (334) engages with a driven gear (343) of a filter drive means (340) described later. The filter body (331) further includes a closure means (336) arranged at one of the longitudinal ends thereof. The closure means (336) extends substantially in the lateral direction of the filter body (331). The closure means (336) is made of, for example, a resin sheet, and unlike the mesh member (335), it does not allow the air to pass through. As described later in detail, the closure means (336) is provided to close the brush receiving opening (363) of the dust container (360).

The filter drive means (340) is provided to slide the air filter (330), and includes a filter drive motor (341), a drive gear (342), four driven gears (343), and a filter mount (345). The drive gear (342) is connected to a drive shaft of the filter drive motor (341), and engages with one of the four driven gears (343). The four driven gears (343) correspond to the racks (334) of the air filters (330), respectively. The four driven gears (343) are coupled to each other through a single driven axis (344), thereby rotating together through the driven axis (344).

As shown in FIG. 33, the filter mount (345) is a rectangular frame provided with two laterally aligned openings, and is integral with the dust container (360) as it is cantilevered from an upper end portion of the side surface of the dust container (360). The positions of the openings in the filter mount (345) correspond to the pairs of the rotating brush (351) and the non-rotating brush (352). A single center guide rail (346) and two peripheral guide rails (347) are formed on an upper surface of the filter mount (345). With the edges of the air filters (330) inserted in the guide rails (346, 347) as shown in FIG. 34, the guide rails (346, 347) function as a guide for slide movement of the air filters (330).

Figure 36:
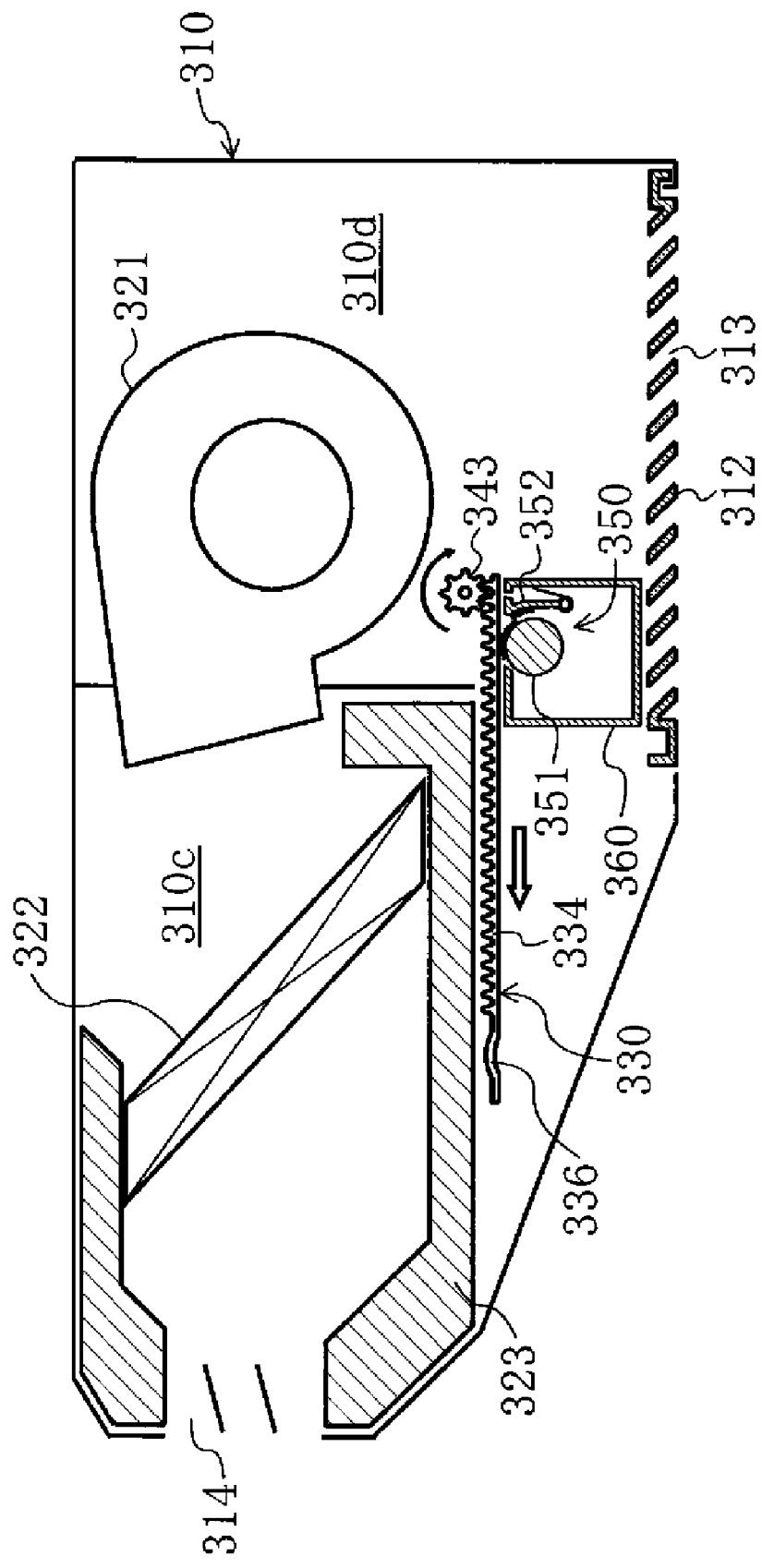
FIG. 36 is a vertical cross-sectional view taken along the line passing the center of the indoor unit.

As shown in FIG. 35, in the dust container (360), the closure means (336) of the air filter (330) can cover the rotating brush (351) and the non-rotating brush (352), and can close the brush receiving opening (363). Further, as shown in FIG. 36, when the filter drive means (340) drives the air filter (330) to slide, the mesh member (335) of the air filter (330) comes into contact with the bristle portion (351*b*) of the rotating brush (351), thereby removing the dust on the mesh member (335).

As shown in FIGS. 32, 33, 34 and 37, the dust transfer means (380) includes a damper box (381), an entrance duct (386), a suction duct (387), a transfer duct (388), and a connection duct (389).

The entrance duct (386) communicates with the air blowing room (310*c*) at one end, and communicates with the damper box (381) at the other end. The connection duct (389) is connected to the damper box (381) at one end, and is connected to an end of the dust container (360) at the other end. One end of the transfer duct (388) is connected to the other end of the dust container (360), and the other end of the transfer duct (388) is connected to the dust collection box (390). The dust collection box (390) has a larger volume than the dust container (360), and includes an exhaust port (391). Although not shown, the exhaust port (391) is provided with a filter.

The suction duct (387) is connected to the middle of the connection duct (389) at one end, and is connected to the nozzle receiver (400) at the other end. The structure of the nozzle receiver (400) will not be described below because it is the same as that described in the fourth embodiment.

Figure 37:
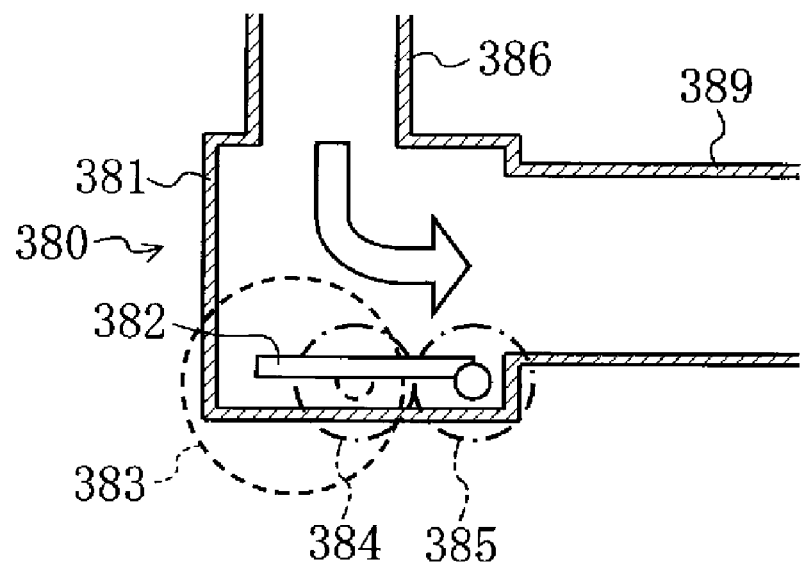
FIG. 37 is a cross-sectional view illustrating the structure of a major part of a dust transfer means.
Figure 37:
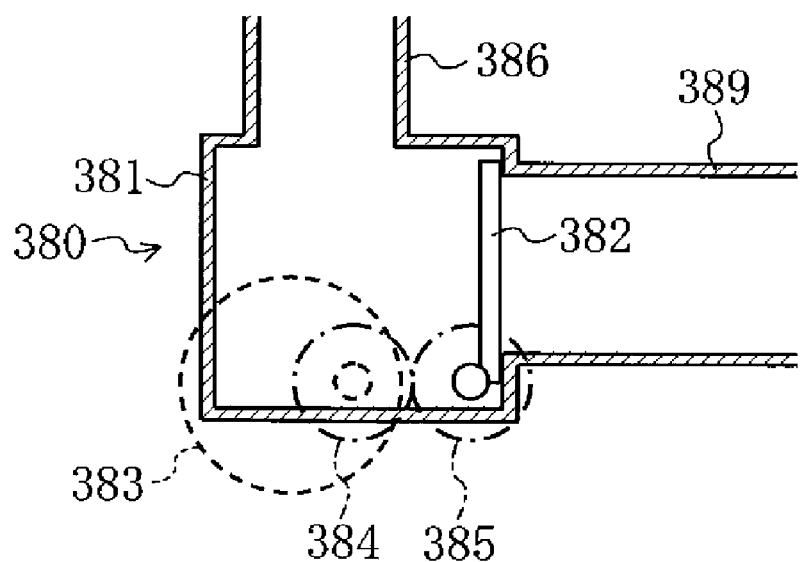
Figure 38:
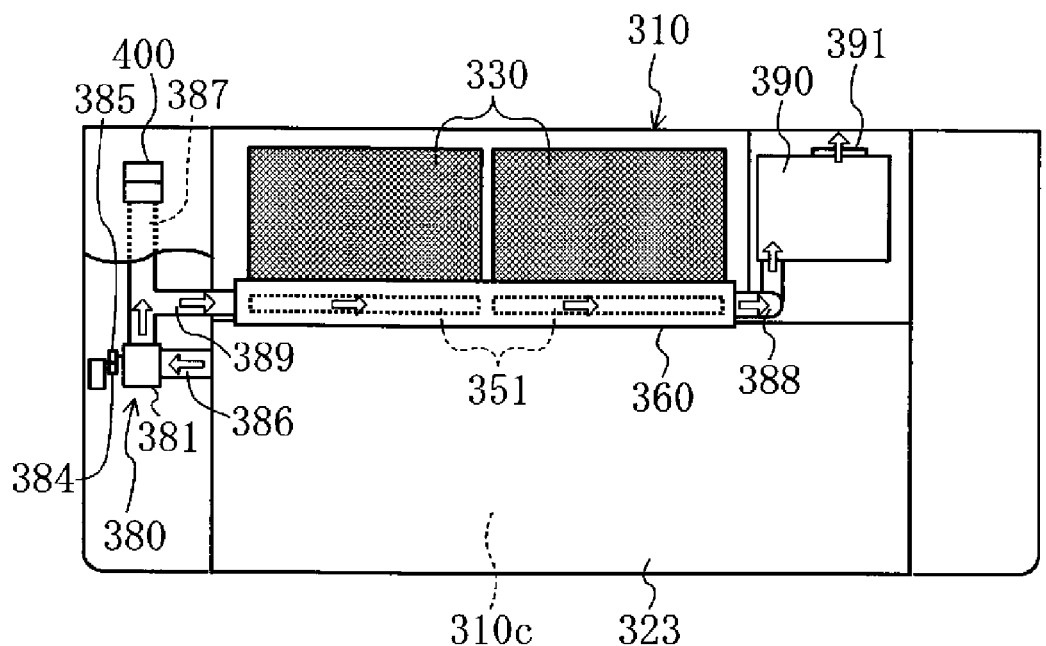
FIG. 38 is a lateral cross-sectional view of the indoor unit as viewed from the bottom, illustrating a flow of air during filter cleaning operation.
Figure 39:
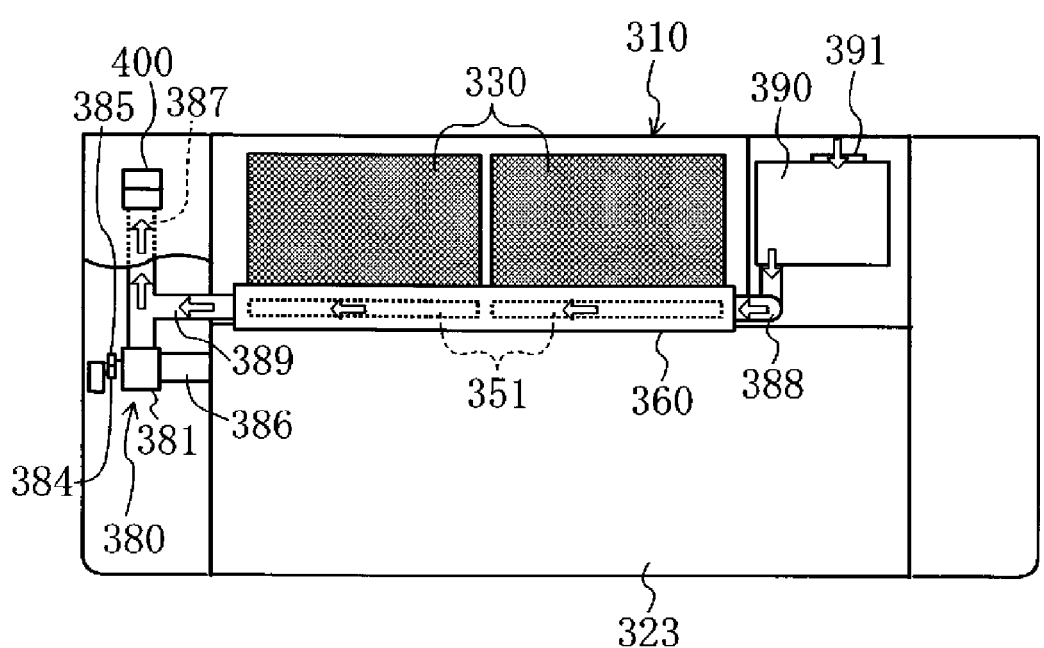
FIG. 39 is a lateral cross-sectional view of the indoor unit as viewed from the bottom, illustrating the flow or air during filter cleaning operation.

As shown in FIG. 37, the damper box (381) contains a damper (382) for opening/closing the junction between the damper box (381) and the connection duct (389). The dust transfer means (380) includes a damper drive motor (383) for driving the damper (382) to open/close, and a drive gear (384) and a driven gear (385) engaging with each other. The drive gear (384) is attached to a drive shaft of the damper drive motor (383), and the driven gear (385) is attached to a rotation axis of the damper (382). In this configuration, the rotation of the damper drive motor (383) is transmitted to the rotation axis of the damper (382), thereby switching the damper (382) between the opened state (see FIG. 37(*a*)) and the closed state (see FIG. 37(*b*)).

<Filter Cleaning Operation>

The indoor unit of the present embodiment is also configured to be able to switchably perform normal operation of cooling/heating the room, and filter cleaning operation of cleaning the air filter (330).

First, in the normal operation, the air filter (330) is stopped in the state shown in FIG. 35. Then, the brush receiving openings (363) of the dust container (360) are closed by the closure means (336) of the air filters (330), and the damper (382) in the damper box (381) is closed. Therefore, the air blowing from the indoor fan (321) does not enter the dust container (360) through the damper box (381). The dust in the dust container (360) does not flow out of the brush receiving openings (363).

In the filter cleaning operation, "dust removal operation," "brush cleaning operation," "dust transfer operation," and "dust discharge operation" are switchably performed.

First, in the "dust removal operation," the air filters (330) are allowed to slide with the indoor fan (321) stopped. This brings the mesh member (335) of each of the air filters (330) into contact with the bristle portion (351b) of the rotating brush (351), thereby removing the dust on the mesh member (335).

In the "brush cleaning operation," the indoor fan (321) remains stopped, and the rotating brush (351) rotates to bring the bristle portion (351b) of the rotating brush (351) into contact with the bristle portion (352b) of the non-rotating brush (352), thereby removing the dust trapped on the rotating brush (351). Specifically, the rotating brush (351) rotates in the clockwise direction by a predetermined rotation angle in the state shown in FIG. 35. Then, the rotating brush (351) rotates in the counterclockwise direction. As a result, the dust trapped on the bristle portion (351b) of the rotating brush (351) is removed by the bristle portion (352b) of the non-rotating brush (352) inclined to the direction corresponding to the direction of rotation. In this case, the non-rotating brush (352) is pushed outward due to the contact between the rotating brush (351) and the non-rotating brush (352). The spring (352c) biases the non-rotating brush (352) toward the rotating brush (351). This makes it possible to press the non-rotating brush (352) to the rotating brush (351) with a suitable pressure without separating the brushes (351, 352), thereby reliably removing the dust trapped on the non-rotating brush (352).

Then, after the dust is trapped on the non-rotating brush (352), the rotating brush (351) rotates in the clockwise direction again by a predetermined rotation angle, thereby removing the dust trapped on the bristle portion (352b) of the non-rotating brush (352). Specifically, since the bristles of the bristle portion (352b) of the non-rotating brush (352) are inclined toward the rotation direction of the rotating brush (351), the dust trapped on the bristle portion (352b) is reliably removed by the bristle portion (351b) of the rotating brush (351).

By the "brush cleaning operation" described above, the dust trapped on the bristle portion (351b) of the rotating brush (351) is contained in the dust container (360).

In the "dust transfer operation," the air filters (330) are stopped in the state shown in FIG. 35. The damper (382) in the damper box (381) is opened (the state shown in FIG. 37(a)). The indoor fan (321) is driven in this state. Then, as indicated by an arrow in FIG. 38, the air blowing from the indoor fan (321) is brought into the damper box (381) from the air blowing room (310c) through the entrance duct (386), and enters the dust container (360) through the connection duct (389). As a result, the dust in the dust container (360) is transferred to the dust collection box (390) together with the air through the transfer duct (388). This allows the dust in the dust container (360) to accumulate in the dust collection box (390). The air entered the dust collection box (390) is discharged from the exhaust port (391). Also in the "dust transfer operation," the brush receiving openings (363) of the dust container (360) are closed by the closure means (336) of the air filters (330) (see FIG. 35). Therefore, the dust in the dust container (360) does not flow out of the brush receiving openings (363).

In the "dust discharge operation," the air filters (330) are stopped in the state shown in FIG. 35 in the same manner in the "dust transfer operation." The damper (382) in the damper box (381) is closed (the state shown in FIG. 37(b)). In this state, the user inserts a hose of a cleaner into the nozzle receiver (400). Then, as indicated by an arrow in FIG. 39, the dust in the dust collection box (390) is sucked into the cleaner sequentially through the transfer duct (388), the dust container (360), and the suction duct (387) in this order. In this case, the dust in the dust container (360) is also sucked into the cleaner. Also in the "dust discharge operation," the dust passing through or being contained in the dust container (360) does not flow out of the brush receiving openings (363).

Figure 40:
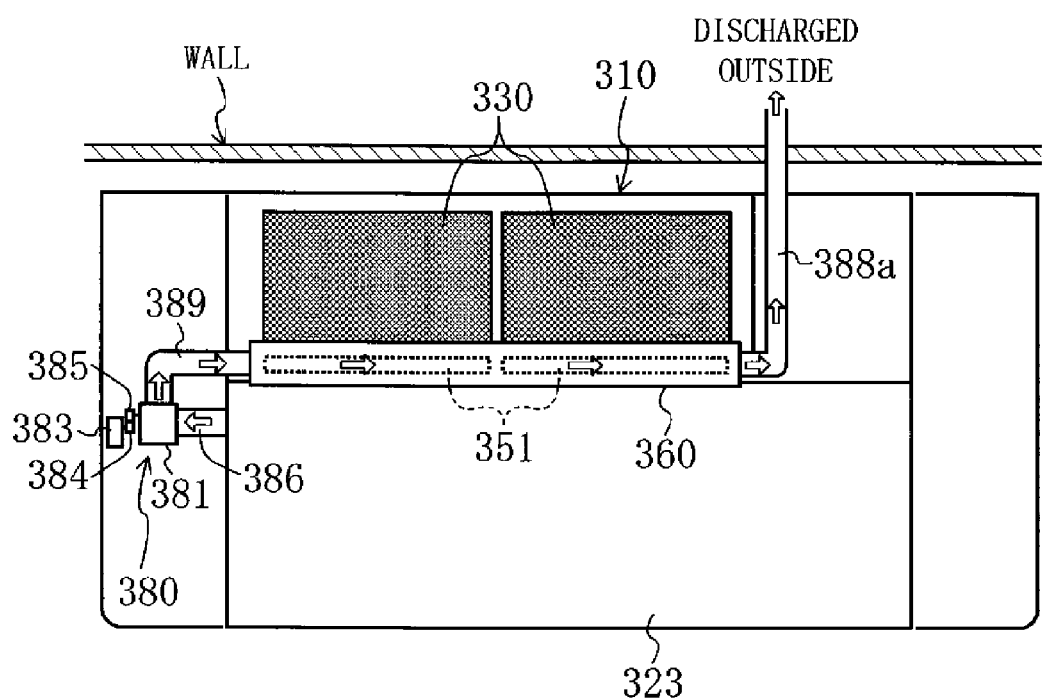
FIG. 40 is a lateral cross-sectional view of the indoor unit according to a modified example of the third embodiment as viewed from the bottom.

FIG. 40 shows a possible modified example of the fifth embodiment. Specifically, the dust collection box (390) may be omitted from the fifth embodiment, and the transfer duct (388a) may be configured to communicate with the outside. In this case, the dust in the dust container (360) is directly transferred and discharged to the outside together with the air in the "dust transfer operation." This can save the user's labor in discharging the dust. In this modified example, the nozzle receiver is no longer necessary.

Advantages of Fifth Embodiment

According to this embodiment, the above-described configuration is employed in the so-called ceiling-suspended indoor unit. Therefore, the dust trapped on the air filter (330) can be removed, and accumulated in the dust collection box (390), and the dust in the dust collection box (390) can be collected by the nozzle of the cleaner through the nozzle connector (400).

Other Embodiments

The above-described embodiments may be modified in the following manner.

In the first embodiment, the dust removed by the air filter (40) is temporarily contained in the dust container (60), and the dust is transferred to the dust collection box (90) outside the casing body (26) by the dust transfer means (70) to keep the dust in the dust collection box (90). Then, the dust in the dust collection box (90) is collected through the collection duct (77). However, the dust collection is not limited to the above-described manner. For example, as shown in FIGS. 41 and 42, the dust transfer means (70) and the dust collection box (90) may be omitted, and the dust may directly be collected from the dust container (60).

Figure 41:
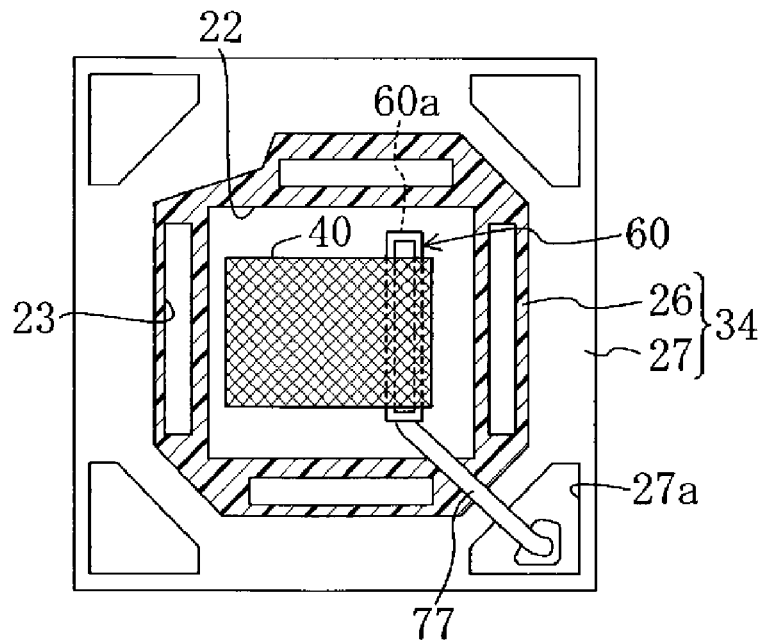
FIG. 41 is a view corresponding to FIG. 17(a) illustrating an air conditioner of another embodiment.

Specifically, as shown in FIG. 41, an end of the collection duct (77) may be connected to a duct connecting opening (63) formed in one of surfaces of the dust container (60) at the lengthwise ends thereof, and the other end of the collection duct (77) may be arranged in the opening (27a) at the corner of the decorative panel (27).

In FIG. 41, the other end of the collection duct (77) is arranged in the opening (27a) at the corner of the decorative panel (27). However, the position of the other end of the collection duct (77) is not limited thereto. As shown in FIG. 42, the other end of the collection duct (77) may be arranged in the inlet (22).

Figure 42:
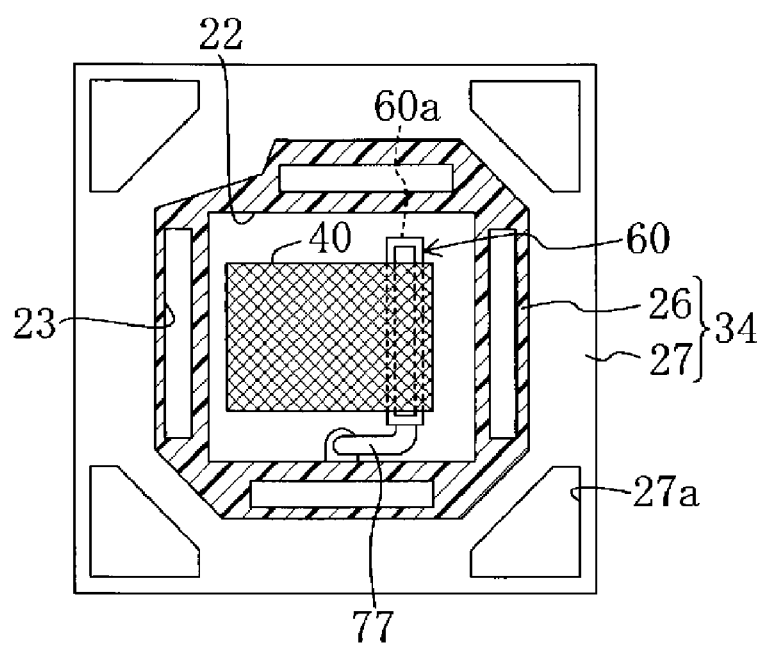
FIG. 42 is a view corresponding to FIG. 17(a) illustrating the air conditioner of another embodiment.

In the structure shown in FIGS. 41 and 42, the structure of the duct connector connected to the other end of the collection duct (77) is the same as that described in the embodiments described above.

In the structure shown in FIGS. 41 and 42, an air vent (60a) may preferably be formed in a surface of the dust container (60) opposite the surface where the duct container (60) is connected. The air vent (60a) makes it possible to provide smooth air flow to the collection duct (77) in the dust container (60) when the dust is sucked by the cleaner (95), etc., thereby facilitating the suction and the collection of the dust.

In the embodiments described above, the damper (72, 382), etc., is driven as the air filter (40, 330) moves, and the dust removed from the air filter (40, 330) by the rotating brush (51, 351) is discharged out of the dust container (60, 360) by the air blowing from the indoor fan (39, 321). However, instead of this configuration, any configuration can be employed as long as the dust trapped on the air filter (40, 330) is removed, and the removed dust is discharged out of the dust container (60, 360).

In the first and second embodiments, the nozzle connector (78, 131) is tapered with a cross-sectional area of a path formed therein increasing toward the inside of the room. However, instead of this configuration, the inside of the nozzle connector may be curved in such a manner that the cross-sectional area of the path increases toward the inside of the room.

In the first embodiment, the nozzle connector (78) and the collection duct (77) are connected and fixed, the collection duct (77) and the dust collection box (90) are connected and fixed, the dust collection box (90) and the discharge duct (74) are connected and fixed, and the discharge duct (74) and the casing body (26) are connected and fixed. However, instead of this configuration, the connections may be configured to be detachable as shown in FIGS. 43 to 45.

Figure 43:
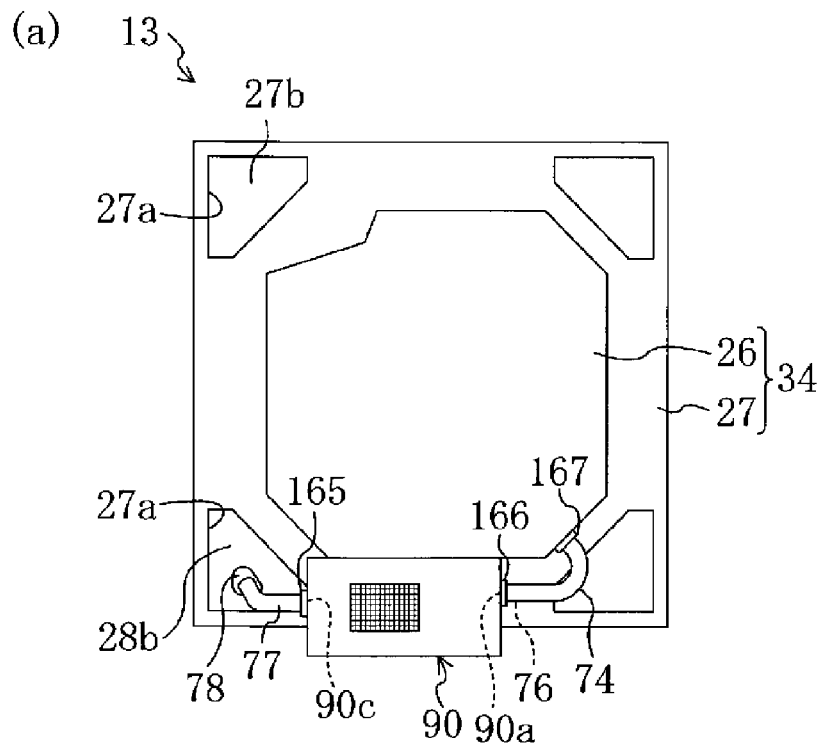
FIG. 43 is a view corresponding to FIG. 2 illustrating an air conditioner of still another embodiment.
Figure 43:
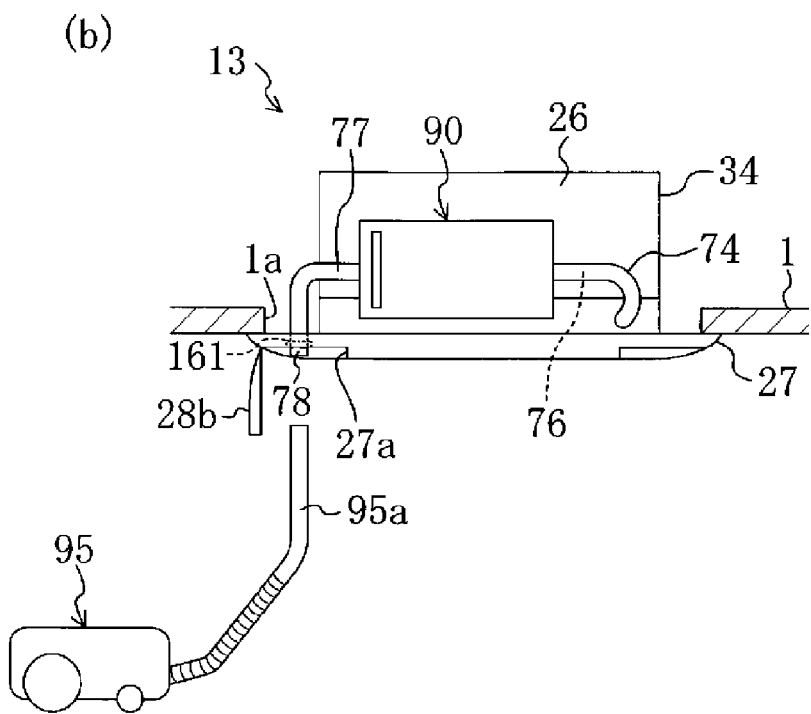
Figure 44:
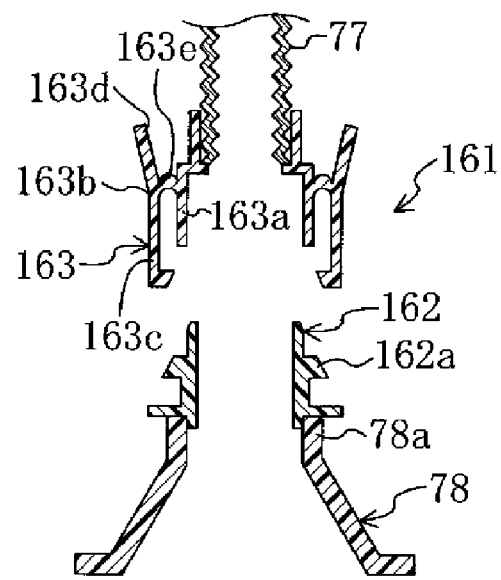
Figure 44:
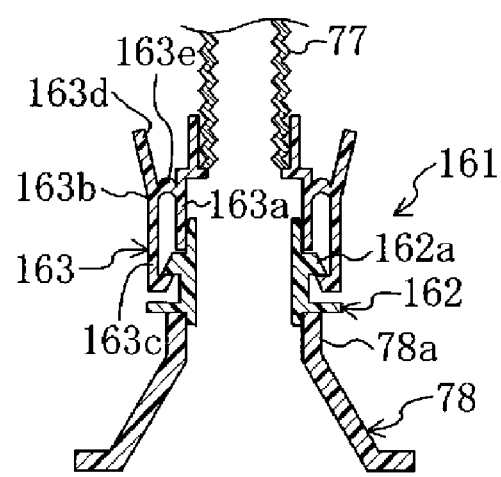
Figure 45:
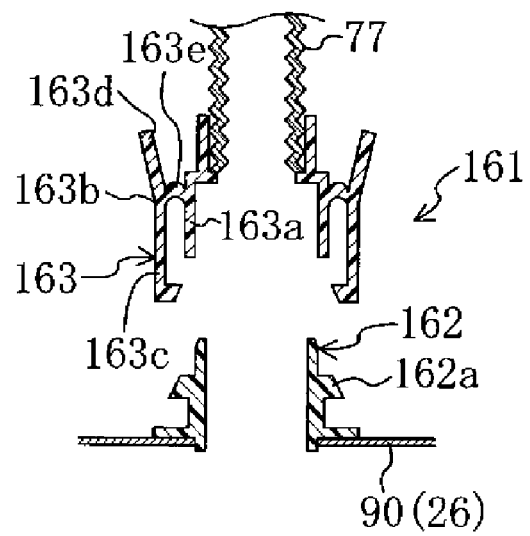
FIG. 45 is a view corresponding to FIG. 44 illustrating a junction between a dust collection box or a casing body and a duct.
Figure 45:
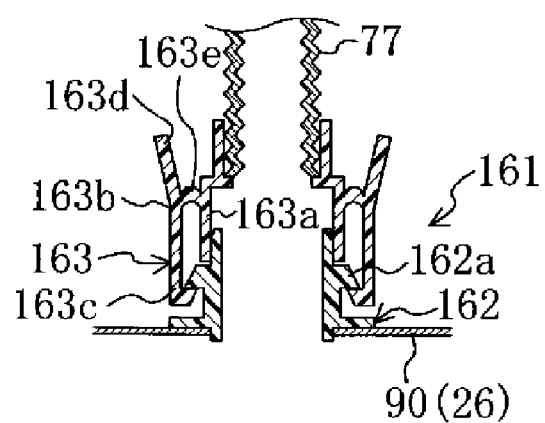

Specifically, as shown in FIGS. 43 and 44, a first connector portion (162) is provided on the nozzle connector (78) at a junction (161) between the nozzle connector (78) and the collection duct (77), and a second connecting portion (163) is provided on the corresponding end of the collection duct (77), thereby engaging the first connecting portion (162) and the second connecting portion (163).

The first connecting portion (162) is provided with a flange portion (162a) extending from an outer circumferential surface of a substantially cylindrical member along the entire circumference, and an engagement portion (163c) of the second connecting portion (163) described later engages with the flange portion (16 2a). An outer diameter of one end of the first connecting portion (162) is smaller than an inner diameter of an upper portion (78a) of the nozzle connector (78), and the one end of the first connecting portion (162) is fitted in the upper portion (78a) of the nozzle connector (78).

The second connecting portion (163) includes a body (163a) comprised of a substantially cylindrical member having a larger diameter than the first connecting portion (162), and a nail (163b) is integrally formed on the outer circumferential surface of the body. The nail (163b) includes a cylindrical engagement portion (163a) extending in the axial direction of the collection duct (77) to engage with the flange portion (162a) of the first connecting portion (162), a lever portion (163d) protruding in the direction opposite the engagement portion (163c), and an elastically deforming portion (163e) elastically connecting the engagement portion (163c) and the lever portion (163d) to the body (163a) at a middle portion thereof. The lever portion (163d) is shaped to extend radially outward toward the distal end thereof. With this configuration, the elastically deforming portion (163e) deforms as the lever portion (163d) moves radially inward, thereby displacing the engagement portion (163c) extending in the direction opposite the lever portion (163d) radially outward. When the lever portion (163d) returns to the original position, the engagement portion (163c) returns to the original position due to a restoring force of the elastically deforming portion (163e).

In engaging the engagement portion (163c) of the second connecting portion (163) with the flange portion (162a) of the first connecting portion (162), the engagement portion (163c) abuts the flange portion (162a), and then the elastically deforming portion (163e) elastically supporting the engagement portion (163c) is elastically deformed, thereby displacing the engagement portion (163c) radially outward. Thus, the engagement portion (163c) and the flange portion (162a) are engaged (see FIG. 44(b)). In detaching the second connecting portion (163) from the first connecting portion (162), the lever portion (163d) is deformed radially inward, thereby moving the engagement portion (163c) radially outward, and separating the engagement portion (163c) from the flange portion (162a) of the first connecting portion (162). Thus, the engagement portion (163c) and the flange portion (162a) are disengaged.

With this configuration, the collection duct (77) can easily be attached to and detached from the nozzle connector (78), thereby improving the workability of installation and maintenance of the indoor unit (13) and the dust collection box (90).

In applying the connection structure described above to a junction (165) between the collection duct (77) and the dust collection box (90), a junction (166) between the dust collection box (90) and the discharge duct (74), and a junction (167) between the discharge duct (74) and the casing body (26), the first connecting portion (162) may be provided on the dust collection box (90) or the casing body (26), and the second connecting portion (163) may be provided on the duct (77, 74) as shown in FIG. 45.

In the structure described in the second and third embodiments in which one end of the collection duct (77) is arranged in the inlet (22) of the casing body (26), the above-described connection structure may be applied to a junction with the duct (77). As shown in FIGS. 41 and 42, the above-described connection structure may be applied to a junction between the collection duct (77) and the casing body (26), or a junction between the collection duct (77) and the nozzle connector (78) in the configuration where the collection duct (77) is directly connected to the dust container (60).

In the fourth embodiment, the UV coating is applied to the room-facing surfaces of the lid members (172). However, not only to these surfaces, the UV coating may be applied to the other constituents to which the nozzle (95a) of the cleaner (95) abuts, e.g., the cover portion (111b), the nozzle abutment (121a), the lid members (142), etc., of the first and third embodiments.

Figure 46:
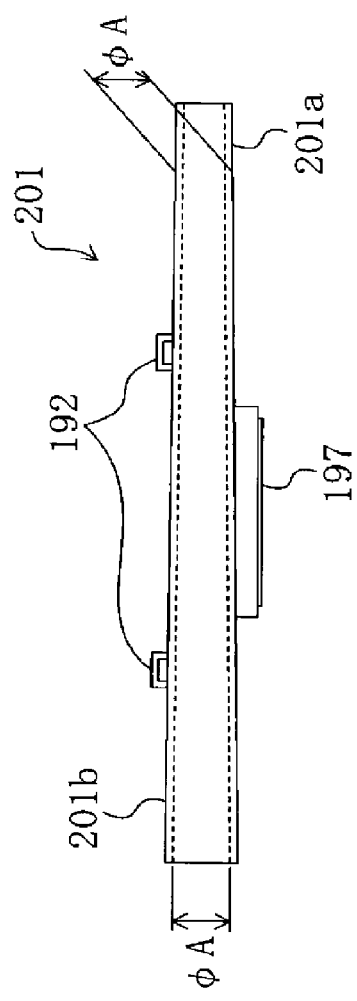
Figure 46:
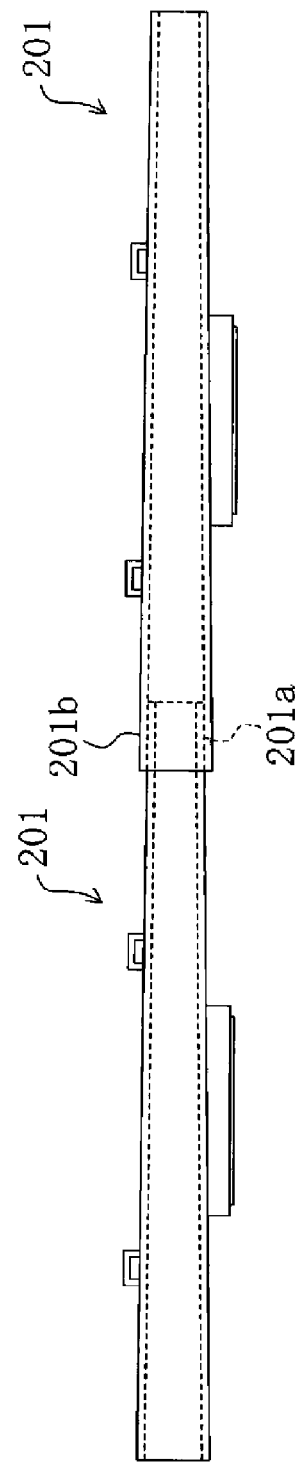

In the fourth embodiment, the extension nozzle (191) has the tapered proximal end (191b). However, as shown in FIG. 46, the distal end may be tapered. Specifically, a distal end (201a) of the extension nozzle (201) may be tapered to such a degree that an outer diameter thereof is equal to or smaller than an inner diameter of a proximal end (201b), so as to be able to connect to the proximal end (201b) of the other extension nozzle (201) as shown in FIG. 46(b). Specifically, a tip end of the distal end (201a) of the extension nozzle (201) is provided with a coupling having an outer diameter similar to the inner diameter ($\phi$A) of the proximal end (201b). Inserting the coupling into the proximal end (201b) of the other extension nozzle (201) connects the extension nozzles (201), thereby lengthening the nozzle of the cleaner (95) to a further degree. Thus, even when the indoor unit (13) is arranged at a high position, the dust can be collected by the cleaner (95). In an example shown in FIG. 46, the extension nozzle (201) is entirely tapered from the proximal end (201b) to the distal end (201a). However, the extension nozzle may be configured in different ways. For example, the distal end (201a) may be provided with a stepped portion having an outer diameter equal to the inner diameter of the distal end (201b) as a coupling.

The above-described embodiments are directed to the so-called in-ceiling indoor units, and ceiling-suspended indoor units. In addition to these indoor units, the structures of the embodiments (dust removal from the air filter, dust transfer, dust collection, etc.) may be applied to general home-use air conditioners.

INDUSTRIAL APPLICABILITY

As described above, the present disclosure is useful for an indoor unit of an air conditioner arranged on a ceiling, and has the functions of removing dust on an air filter, and of containing the removed dust.

DESCRIPTION OF REFERENCE CHARACTERS

10 Air conditioner
13 Indoor unit
22, 313 Inlet
26 Casing body (casing)
27 Decorative panel (room panel)
27a Opening
28, 101, 111 Cover
28b, 101b, 111b Cover portion (cover)
29, 312 Suction grille
34 Casing
37, 322 Indoor heat exchanger
39, 321 Indoor fan
40, 330 Air filter
50, 350 Dust removing means
60, 360 Dust container (dust containing part)
60a Air vent
77 Collection duct (duct collection path, flexible duct)
78, 131, 151 Nozzle connector
79 Push lock
80 Sealing member
90, 390 Dust collection box
95 Cleaner
95a Nozzle
95b Body engagement (engagement)
102 Spring (biasing means)
113 Motor (drive means)
121 Cover
121a nozzle abutment (nozzle connector)
121b Hole
122 Dust cover (cover)
141d Communication hole
142 Lid member (cover)
143 Spring (biasing means)
152 Valve
154 Valve element
155 Spring (biasing means)
172 Lid member (cover)
178 Nozzle guide (guide)
178a Recess
181 Piston connector
181b Hole
181d Abutment
186 Valve element (valve)
186a Protrusion
191,191' Extension nozzle of a cleaner
191a Distal end
191b Proximal end
192 Insertion part
195 Extension tube
196 Tape (nozzle engagement)
197 Extension nozzle engagement (second nozzle engagement)
198 String insertion part (second insertion part)
199 String (ring-shaped member)
201 Extension nozzle of a cleaner
201a Distal end
201b Proximal end
310 Casing
310a Lower surface (room panel)
387 Suction duct (dust collection path)
400 Nozzle receiver

The invention claimed is:

1. An air conditioner, comprising:
an indoor unit including
a casing,
an indoor heat exchanger in said casing,
an indoor fan in said casing for sucking air from inside of a room, and blowing the air to the inside of the room, and
an air filter in said casing arranged on an inlet side of the indoor fan;
a dust remover for removing dust trapped on the air filter;
a dust containing part for containing the dust removed by the dust remover;
a dust collection path as a transfer path for transferring the dust in collecting the contained dust;
a nozzle connector for arranging a nozzle of a cleaner at a predetermined position where suction of the contained dust is allowed provided at a downstream outlet of the dust collection path, the nozzle connector configured to be slidable in a direction from the outside of the casing to the inside of the casing; and
a valve for switching between a communication position and a discommunication position between a space inside the nozzle connector and the dust collection path having a position upstream of the nozzle connector, the valve including
a mechanical link to the nozzle connector, and
a spring biasing the valve in the discommunication position, wherein
the mechanical link is actuated by movement of the nozzle connector to switch the valve between the communication position and the discommunication position between the space inside the nozzle connector and the dust collection path, and
the valve moves in said direction from the outside of the casing to the inside of the casing to switch to the communication position.

2. The air conditioner of claim 1, wherein
the nozzle connector is arranged inside the casing, and inside a room-facing surface of a room panel arranged on a room-facing side of the casing.

3. The air conditioner of claim 1, wherein
the nozzle connector is arranged at a corner of a room panel arranged on a room-facing side of the casing.

4. The air conditioner of claim 1, wherein
the nozzle connector is arranged in an inlet of the casing formed on the inlet side of the indoor fan.

5. The air conditioner of claim 1, wherein
a suction grille having a grille portion formed in a center thereof to allow the air to pass through is arranged in an inlet of the casing formed on the inlet side of the indoor fan, and
the nozzle connector is arranged outside the grille portion of the suction grille.

6. The air conditioner of claim 1, wherein
an open/close mechanism is provided in a dust collection path extending from the dust containing part to a room panel arranged on a room-facing side of the casing so as to communicate or discommunicate the dust collection path with the inside of the room.

7. The air conditioner of claim 6, wherein
the nozzle connector is arranged at a corner of the room panel arranged on the room-facing side of the casing, and a corner cover is arranged to cover a room-facing side of the nozzle connector as the open/close mechanism.

8. The air conditioner of claim 6, wherein
a room-facing side of the air filter is covered with a suction grille, and the nozzle connector is arranged in the inlet of the casing formed on the inlet side of the indoor fan, with the room-facing side thereof being covered with the suction grille as the open/close mechanism.

9. The air conditioner of claim 6, wherein
the open/close mechanism is configured to be rotatable about one end thereof as a rotation center, and is configured to be able to engage with a push lock at the other end thereof, the engagement between the other end and the push lock being released upon application of a pressing force to the open/close mechanism from the inside of the room.

10. The air conditioner of claim 6, wherein
the open/close mechanism is configured to be rotatable about one end thereof as a rotation center in such a manner that the open/close mechanism is opened when pushed from the inside of the room.

11. The air conditioner of claim 10, wherein
a biasing member for biasing the open/close mechanism to a closed state provided at the one end of the open/close mechanism.

12. The air conditioner of claim 6, wherein
the open/close mechanism is configured to be slidable.

13. The air conditioner of claim 6, further comprising:
a drive mechanism for opening and closing the open/close mechanism.

14. The air conditioner of claim 1, further comprising:
a dust collection box for accumulating the dust contained in the dust containing part, wherein
the dust collection path is connected to the dust collection box.

15. The air conditioner of claim 14, wherein
a duct comprising the dust collection path, and the dust transfer path extending from the dust containing part to the dust collection box is detachably connected to the dust collection box.

16. The air conditioner of claim 1, wherein
the dust collection path is directly connected to the dust containing part in the casing, and
an air vent is foamed in the dust containing part to oppose a junction with the dust collection path.

17. The air conditioner of claim 16, wherein
a duct comprising the dust collection path is detachably connected to the casing.

18. The air conditioner of claim 1, wherein
the nozzle connector is formed with a cross-sectional area of a dust path formed therein increasing toward the inside of the room.

19. The air conditioner of claim 1, wherein
the nozzle connector protrudes toward the inside of the room with its cross-sectional area decreasing toward the inside of the room, and a hole through which the dust can pass is provided at a protruding end of the nozzle connector.

20. The air conditioner of claim 19, wherein
the nozzle connector is formed in the shape of a dome protruding toward the inside of the room.

21. The air conditioner of claim 19, wherein
the space inside the nozzle connector communicates with the dust collection path through a communication hole, and
the valve includes a valve element configured to move together with the nozzle connector, thereby closing the communication hole when the nozzle connector is at a lowermost position on the room-facing side, or opening the communication hole when the nozzle connector is inside of the lowermost position in the casing.

22. The air conditioner of claim 21, further comprising:
a biasing member for biasing the nozzle connector toward the inside of the room.

23. The air conditioner of claim 19, wherein
the valve is configured to open toward the nozzle connector.

24. The air conditioner of claim 23, wherein
the valve element is rotatably supported at an upper portion thereof, and includes a protrusion protruding toward the nozzle connector, and
the nozzle connector includes an abutment abutting the protrusion from the inside of the room.

25. The air conditioner of claim 19, wherein
a guide is arranged to surround the nozzle connector so as to position the nozzle of the cleaner in the hole of the nozzle connector.

26. The air conditioner of claim 25, wherein
the guide includes a plurality of ribbed members arranged to surround the nozzle connector.

27. The air conditioner of claim 25, further comprising:
a closure member for covering the room-facing side of the nozzle connector, wherein
the closure member is configured to be rotatable about one end thereof as a rotation center so as to be opened when pushed from the inside of the room, and
the guide includes a recess for receiving the closure member in the open state.

28. The air conditioner of claim 10, wherein
a UV coating is applied to a room-facing surface of the closure member.

29. The air conditioner of claim 1, wherein
a flexible duct comprises the dust collection path, and
the flexible duct and the nozzle connector are detachably connected.

30. An extension nozzle of a cleaner attached to an end of a nozzle of a cleaner, the nozzle being brought into contact with the nozzle connector of the air conditioner of claim 19 at an end thereof, wherein
the end is formed in such a manner that an opening in the end overlaps with the hole of the nozzle connector as viewed in plan, when the end pushes the nozzle connector toward the inside of the casing with an outer circumference thereof abutting the guide arranged to surround the nozzle connector.

31. The extension nozzle of claim 30, wherein
the nozzle connector is in the shape of a dome protruding toward the inside of the room, and
the opening in the end abutting the nozzle connector is in the shape of a perfect circle.

32. The extension nozzle of claim 30, wherein
the end is bent substantially in the shape of L.

33. The extension nozzle of claim 30, wherein
a distal end of the end is configured in such a manner that an extension tube bent substantially in the shape of L can be attached thereto.

34. The extension nozzle of claim 30, wherein
a coupling having an outer diameter similar to an inner diameter of a proximal end is provided at a distal end of the end.

35. The extension nozzle of claim 30, further comprising:
a nozzle engagement for attaching the extension nozzle detached from the end of the nozzle of the cleaner to the nozzle to be parallel with the nozzle.

36. The extension nozzle of claim 35, wherein
the nozzle engagement is a tape wound around the nozzle.

37. The extension nozzle of claim 36, wherein
an insertion part through which the tape passes is provided on an outer circumferential surface of the extension nozzle.

38. The extension nozzle of claim 37, wherein
a portion of the tape passing through the insertion part is narrower than an internal dimension of the insertion part, and the other portion of the tape is wider than the internal dimension of the insertion part.

39. The extension nozzle of claim 35, wherein
a second nozzle engagement capable of engaging with an engagement provided on an outer circumferential surface of the nozzle is provided on an outer circumferential surface of the extension nozzle.

40. The extension nozzle of claim 30, wherein
a second insertion part is formed on an outer circumferential surface of the extension nozzle, and
a ring-shaped member a portion of which passes through the second insertion part is provided.

41. An air conditioner, comprising:
an indoor unit including
  a casing,
  an indoor heat exchanger in said casing,
  an indoor fan in said casing for sucking air from inside of a room, and blowing the air to the inside of the room, and
  an air filter in said casing arranged on an inlet side of the indoor fan;
a dust remover for removing dust trapped on the air filter;
a dust containing part for containing the dust removed by the dust remover;
a dust collection path as a transfer path for transferring the dust in collecting the contained dust;
a nozzle connector for arranging a nozzle of a cleaner at a predetermined position provided at a downstream outlet of the dust collection path, the nozzle connector having a dome shape protruding toward the inside of the room and configured to be slidable in a vertical direction of said room;
a spring biasing the nozzle connector in a direction from inside the casing to outside the casing;
an abutment extending outward from a distal end of the nozzle connector; and
a valve for switching communication and discommunication between a space inside the nozzle connector and the dust collection path having a position upstream of the nozzle connector, the valve including
  a protrusion extending toward the nozzle connector, the protrusion receiving force from the abutment and actuated by vertical movement of the nozzle connector, wherein
the force received by the protrusion from the abutment switches the valve from a discommunication state to a communication state between the space inside the nozzle connector and the dust collection path.

* * * * *